(12) United States Patent
Ohtani et al.

(10) Patent No.: US 6,591,104 B2
(45) Date of Patent: Jul. 8, 2003

(54) METHOD FOR HANDOVER

(75) Inventors: Tomoyuki Ohtani, Ichikawa (JP);
Motoshi Tamura, Tokyo (JP); Akiko Nakashima, Kokubunji (JP); Hisashi Shimizu, Kokubunji (JP); Takaaki Satoh, Yokohama (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 10/164,247

(22) Filed: Jun. 5, 2002

(65) Prior Publication Data

US 2002/0151306 A1 Oct. 17, 2002

Related U.S. Application Data

(62) Division of application No. 09/125,924, filed on Aug. 25, 1998.

(30) Foreign Application Priority Data

Dec. 26, 1996 (JP) ............................................. 8-348900

(51) Int. Cl.[7] ................................................. H04Q 7/20
(52) U.S. Cl. ....................... 455/436; 455/101; 455/437; 370/331
(58) Field of Search ................................. 455/436, 442, 455/439, 438, 437, 101, 502; 370/331, 332, 333, 503, 509, 510, 512

(56) References Cited

U.S. PATENT DOCUMENTS

| | | | |
|---|---|---|---|
| 4,670,899 A | 6/1987 | Brody et al. | |
| 4,811,380 A | 3/1989 | Spear | |
| 5,258,980 A | 11/1993 | Maebara et al. | |
| 5,267,261 A | 11/1993 | Blakeney, II et al. | |
| 5,293,380 A | * 3/1994 | Kondo | ....................... 370/337 |
| 5,379,446 A | 1/1995 | Murase | |
| 5,519,710 A | 5/1996 | Otsuka | |

(List continued on next page.)

FOREIGN PATENT DOCUMENTS

| | | |
|---|---|---|
| EP | 0 522 772 A2 | 6/1992 |
| JP | 63-38334 A | 2/1988 |

(List continued on next page.)

OTHER PUBLICATIONS

Ys O. T. et al. "Connection architecture and protocols to support efficient handoffs over an ATM/B–ISDN personal communications network," Journal of Special Topics in Mobile Networks and Applications, vol. 1, No. 2, Oct. 1, 1996.

*Primary Examiner*—Vivian Chin
*Assistant Examiner*—Charles N. Appiah
(74) *Attorney, Agent, or Firm*—Brinks Hofer Gilson & Lione

(57) ABSTRACT

Disclosed is a mobile communication system including a network constituted of at least one switching center and a plurality of base stations, and a mobile station which communicates with the base stations simultaneously. The system permits varying transmission delay between the switching center and the base stations according to the type of services available to the mobile station. The object of the present invention is to propose a communication which permits varying transmission delay according to the type of service currently employed, and to promptly recover a synchronization state even if an out-of-sync state happens. To attain the object, a memory means (mobile switching center processor 32) stores transmission delay characteristics corresponding to services which are available to the mobile station. Furthermore, a communication timing setting means (diversity handover trunk 34) determines the timing of communication for the base stations according to the transmission delay characteristic selected according to the service.

2 Claims, 45 Drawing Sheets

U.S. PATENT DOCUMENTS

| | | | |
|---|---|---|---|
| 5,539,744 A | | 7/1996 | Chu et al. |
| 5,790,528 A | | 8/1998 | Muszynski |
| 5,809,092 A | | 9/1998 | Gontsch |
| 5,828,659 A | * 10/1998 | Teder et al. ............... 370/328 |
| 5,850,607 A | | 12/1998 | Muszynski |
| 5,901,354 A | | 5/1999 | Menich et al. |
| 6,307,840 B1 | * 10/2001 | Wheatley, III et al. ..... 370/252 |
| 6,470,188 B1 | * 10/2002 | Ohtani et al. ............... 455/503 |

FOREIGN PATENT DOCUMENTS

| | | |
|---|---|---|
| JP | 4-14915 A | 1/1992 |
| JP | 4-502845 A | 5/1992 |
| JP | 5-328428 A | 12/1993 |
| JP | 6-501139 A | 2/1994 |
| JP | 406078359 A * | 3/1994 |
| JP | 6-169484 A | 6/1994 |
| JP | 6-338847 A | 12/1994 |
| JP | 407255079 A * | 10/1995 |
| JP | 8-65201 A | 3/1996 |
| JP | 8-154271 A | 6/1996 |
| JP | 8-195974 A | 7/1996 |
| JP | 8-280056 A | 10/1996 |
| JP | 9-502850 A | 3/1997 |
| JP | 409187055 A | 7/1997 |
| WO | 92/02088 A1 | 2/1992 |
| WO | 95/08899 A1 | 3/1995 |
| WO | 95/32594 A1 | 11/1995 |
| WO | 96/01534 A2 | 1/1996 |
| WO | 96/07252 A1 | 3/1996 |

* cited by examiner

FIG. 4

CONNECTION MANAGEMENT TABLE

| CALL IDENTIFIER | NUMBER OF DHO BRANCHES | BRANCH ID = 1 | BRANCH ID = 2 | ... | BRANCH ID = N | | NETWORK SIDE CONNECTION |
|---|---|---|---|---|---|---|---|
| 1 | 2 | VP = 1<br>VC = 32<br>CID = 32 | VP = 2<br>VC = 32<br>CID = 40 | | | | VP = 3<br>VC = 32<br>CID = 42 |
| 2 | 3 | VP = 1<br>VC = 32<br>CID = 40 | VP = 3<br>VC = 33<br>CID = 36 | | VP = 4<br>VC = 32<br>CID = 50 | | VP =<br>VC =<br>CID = |
| — | | | | | | | |

FIG. 5

MSC-BS TRANSMISSION DELAYS BY SERVICE TYPES MANAGEMENT TABLE (UNIT = ms)

| SERVICE TYPE / TARGET BS | (a-1) MS~MSC CONTROL SIGNAL | (a-2) VOICE | (a-3) DATA COMMUNICATION 1 | ... | (a-n) SERVICE n |
|---|---|---|---|---|---|
| (b-1) BS 1 | 80 | 30 | 50 | | |
| (b-2) BS 2 | 85 | 38 | 55 | | |
| ... | — | — | — | | |
| (b-n) BS n | 75 | 25 | 45 | | |
| (b-max) MAXIMUM | 90 | 40 | 60 | | |

FIG. 6

QUALITY DEGRADATION AND OUT-OF-SYNC PARAMETERS

| PARAMETER | SERVICE TYPE | (a-1) MS~MSC LINK FOR AFFILIATED CONTROL SIGNALS | (a-2) VOICE | (a-3) DATA COMMUNICATION 1 | ... | (a-n) SERVICE n |
|---|---|---|---|---|---|---|
| QUALITY DEGRADATION MEASUREMENT PARAMETER | MEASUREMENT PERIOD (ms) | 1000 | 1000 | 0 | | |
| | THRESHOLD FOR ANNOUNCEMENT REPORT $_{FER}$ | 10 | 10 | 10 | | |
| OUT-OF-SYNCHRONIZATION DETECTION PARAMETER | NUMBER OF SUCCESSIVE OUT-OF-SYNC FRAMES REPORT $_{SOUT}$ | 2 | 2 | 2 | | |

FIG. 7

TRAFFIC INFORMATION TABLE

| SERVICE TYPE / TRAFFIC INFORMATION | (a-1) MS~MSC CONTROL SIGNAL | (a-2) VOICE | (a-3) DATA COMMUNICATION 1 | ... | (a-n) SERVICE n |
|---|---|---|---|---|---|
| CELL INTERVAL (ms) | 40 | 10 | 10 | | |
| NUMBER OF CELLS | VARIABLE | 1 | 3 | | |

FIG. 23

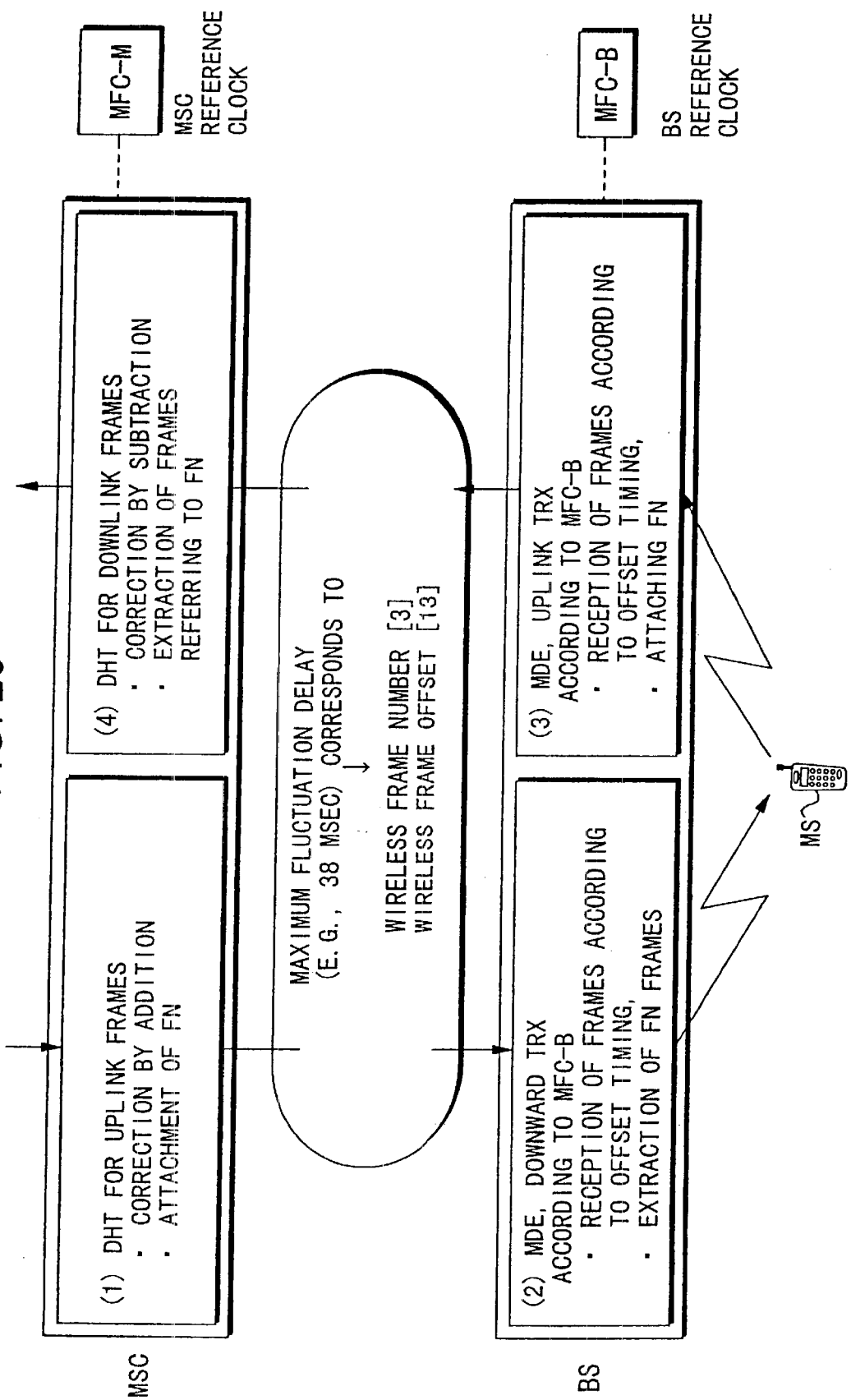

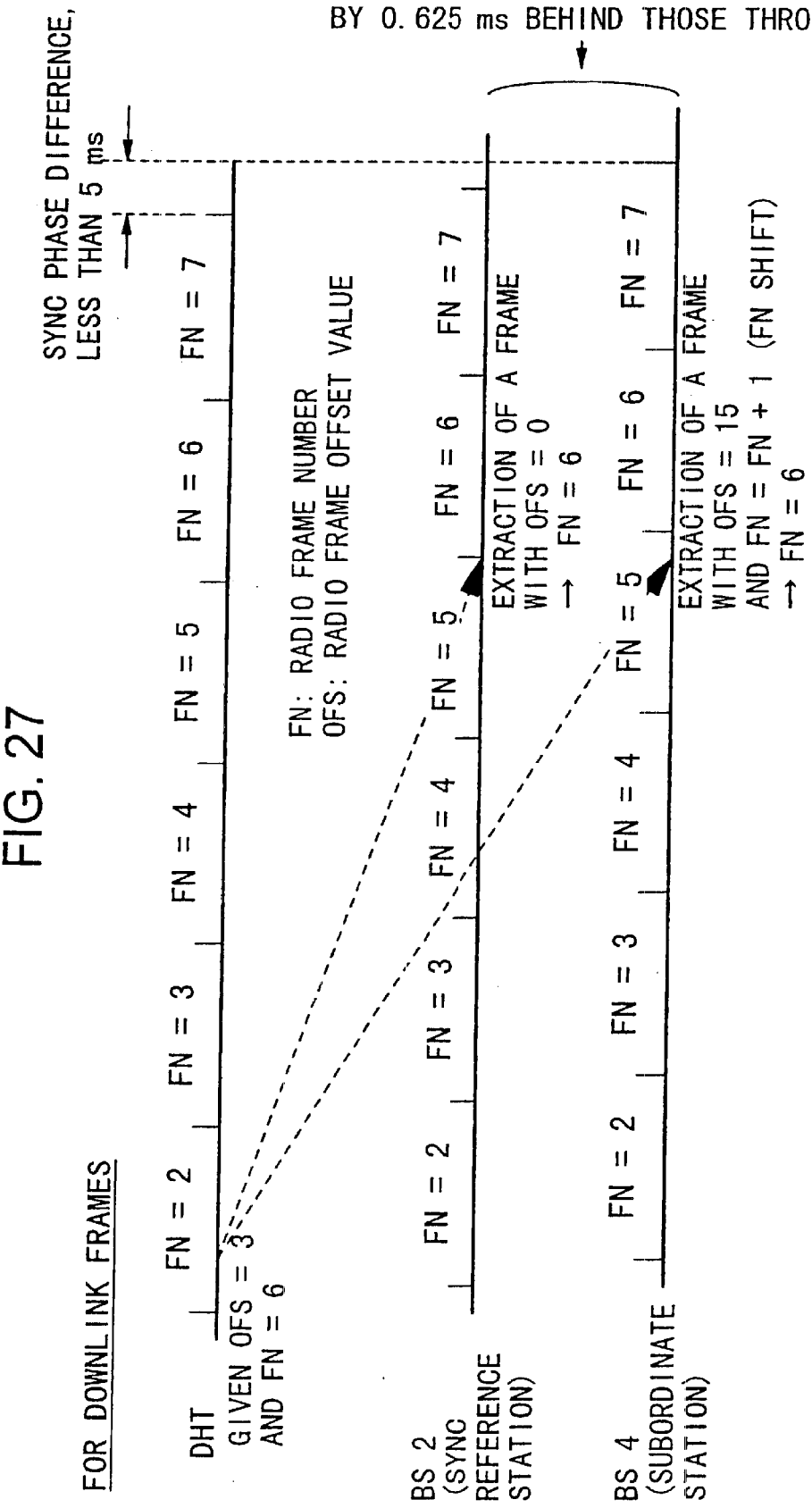

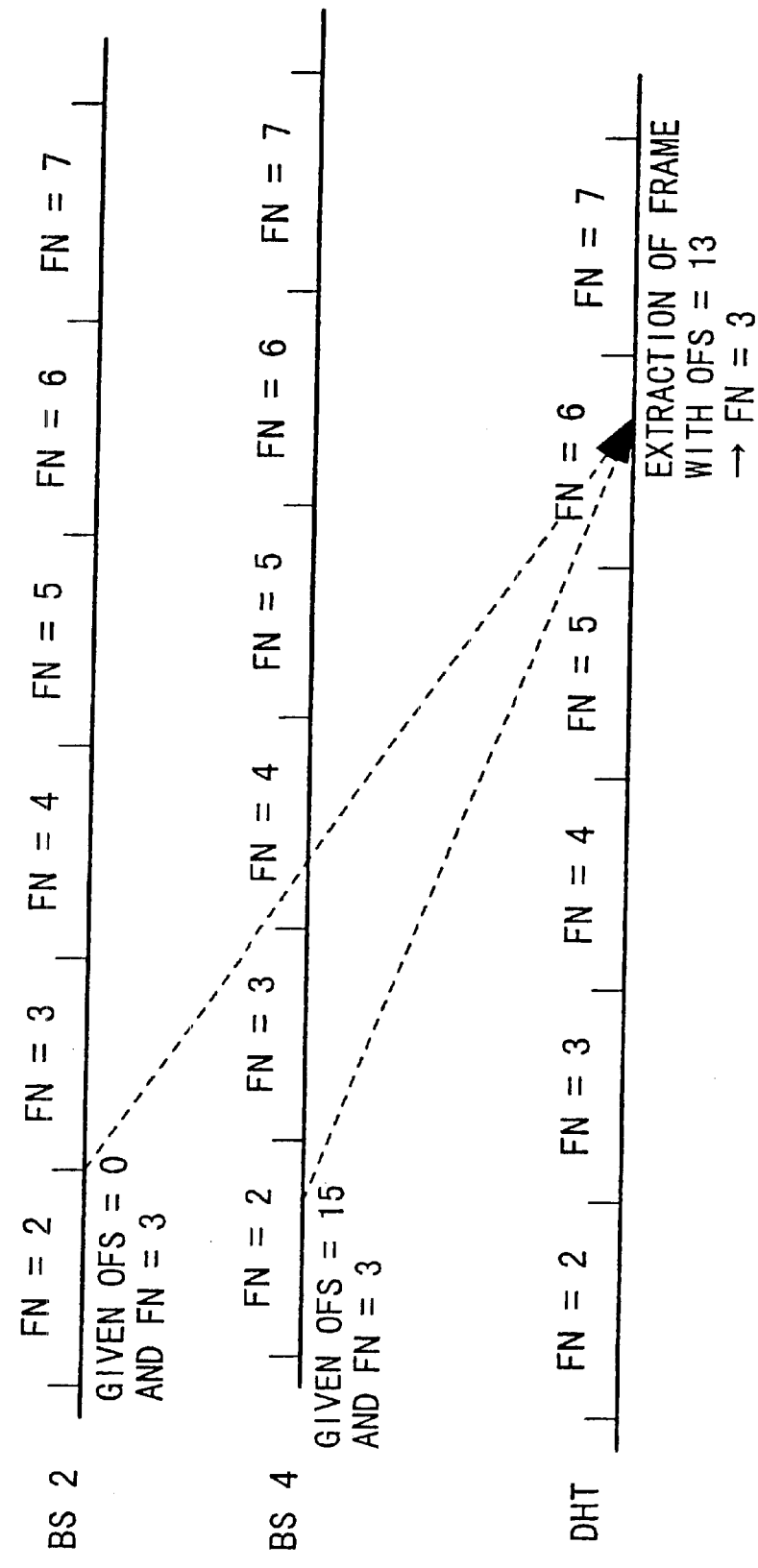

FIG. 29

| | | CALCULATION OF TIMING PARAMETERS |
|---|---|---|
| (1) DELIVERY TO DHT | | DELIVERED AT THE TIMING OF OFS = [16] (FIXED) − [13] (CORRECTED) = [3] |
| (2) EXTRACTION AT BS | SYNC REFERENTIAL BS | FN = [2] (REFERENTIAL CLK) + [3] (CORRECTED) + [1] (OFFSET ODD) = [6] GIVEN AT CLK = [2] |
| | | EXTRACTION AT TIMING OF OFS = [0] (FIXED) |
| | | EXTRACTION OF FRAME WITH FN = [6] (REFERENTIAL CLK) AT REFERENTIAL CLK = [6] |
| | SUBORDINATE BS | EXTRACTION AT TIMING OF OFS = [0] (FIXED) − [1] (SYNCHRONIZATION DIFFERENCE) = [−1] + [16] (FN SHIFT) = [15] |
| | | EXTRACTION OF FRAME WITH FN = [5] (REFERENTIAL CLK) + [1] (FN SHIFT) = [6] AT REFERENTIAL CLK = [5] |

DOWNLINK FRAME

FIG. 30

| | | CALCULATION OF TIMING PARAMETERS |
|---|---|---|
| (3) DELIVERY TO BS | SYNC REFERENTIAL BS | EXTRACTION AT TIMING OF OFS = [0] (FIXED) <br><br> FN = [3] (REFERENTIAL CLK) GIVEN AT REFERENTIAL CLK = [3] |
| | SUBORDINATE BS | DELIVERY AT TIMING OF OFS <br> = [0] (FIXED) − [1] (SYNCHRONIZATION DIFFERENCE) <br> = [−1] + [16] (FN SHIFT) = [15] <br><br> DELIVERY OF FRAME WITH FN <br> = [2] (REFERENTIAL CLK) + [1] (FN SHIFT) <br> = [3] AT REFERENTIAL CLK = [5] |
| (3) EXTRACTION AT DHT | | EXTRACTION AT TIMING OF OFS = [13] (CORRECTION) <br><br> EXTRACTION OF FRAME WITH FN <br> = [6] (REFERENTIAL CLK) − [3] (CORRECTION) <br> = [3] AT REFERENTIAL CLK = [6] |
| UPLINK FRAME | | |

FIG. 32

FN SLIDE PROCESSING PARAMETER MANAGEMENT TABLE

| PARAMETER | SERVICE TYPE | (a-1) MS~MSC LINK FOR AFFILIATED CONTROL SIGNALS | (a-2) VOICE | (a-3) DATA COMMUNICATION 1 | ... | (a-n) SERVICE n |
|---|---|---|---|---|---|---|
| FOR UPLINK FRAME | FN SLIDE UNIT | 2 | 1 | 4 | | 1 |
| | FN SLIDE MAXIMAL WIDTH | 10 | 5 | 16 | | 3 |
| FOR DOWNLINK FRAME | FN SLIDE UNIT | 2 | 1 | 4 | | 1 |
| | FN SLIDE MAXIMAL WIDTH | 10 | 5 | 16 | | 3 |

FIG. 39
CASE 1
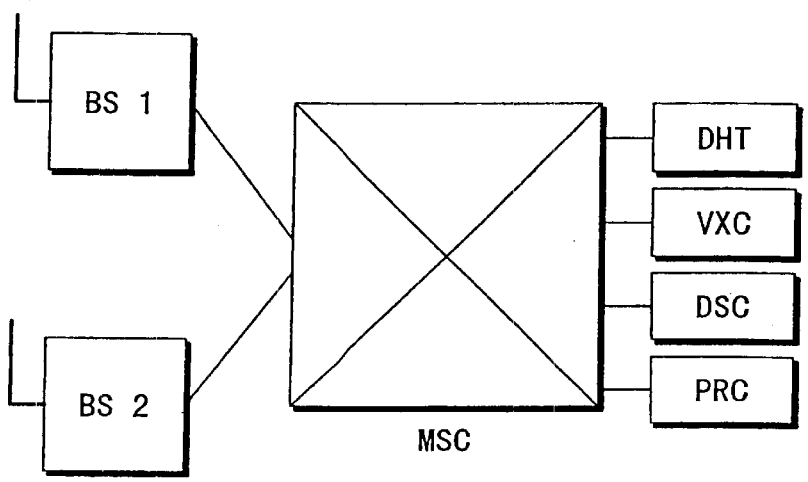
CASE 2
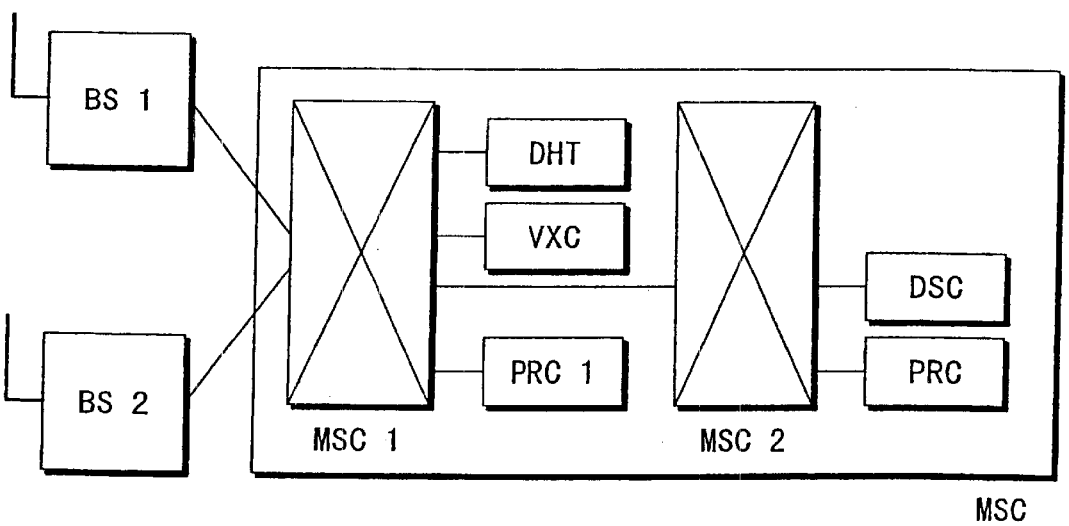
※ MSC 1 CAN BE LOCATED ADJACENT TO BS

METHOD FOR HANDOVER

This application is a divisional application based on application Ser. No. 09/125,924, filed on Aug. 25, 1998.

FIELD OF THE INVENTION

The present relates to a method for handover, which is suitably used for a mobile communication system.

TECHNICAL BACKGROUND

A diversity handover communication technique, wherein a mobile station moves across the boundary between cell sites of different base stations while continuing to communicate with the base stations, is described in Japanese patent application No. 6-106953. This application states a method in which a base station creates reliability information based on the state of radio frames received from a mobile station, and attaches the reliability information to each radio frames. Then, a diversity selection process is carried out in the communication network.

Japanese patent application No. 6-210193 discloses another diversity handover method in which when communication is made between a mobile station and a superior system, frame identification information is used, to prevent the occurrence of skipping or overlapping of frames during diversity selection of the frames due to the difference in delay of frame transmission through different base stations, and thus secure diversity handover is ensured.

However, these methods have following problems.

(1) In the method disclosed in Japanese Patent Application No. 6-210193, when a mobile station (MS) makes a communication through a mobile switching center (MSC), frame identification numbers are used to absorb differences in delay arising during the passage of frames through different base stations, and maximal-ratio combining or diversity selection of resulting frames is achieved. For MS to absorb differences in delay of downlink frames, it is necessary for MS to have a buffer with a considerably large capacity. This makes it difficult to reduce the size of a responsible terminal. Further, as this method requires frame identification information to be exchanged between different radio zones, the communication system it promises to realize will be inefficient because it will be not able to effectively exploit the capacity allowed to radio routes.

(2) In the conventional frame receiving systems, there was no attention paid for the difference in delay of frame transmission according to the type of involved service, and thus sets a fixed maximal transmission delay independent of the type of service currently involved. Accordingly, even when a transmission mode is introduced which allows different transmission delays according to the type of service (for example, Type 5 or Type 2 of ATM), a receiver must respond with a fixed, too long delay to frames of service which does not require such a long delay.

(3) The conventional frame receiving system regards as fixed the maximal transmission delay arising as a result of the passage of frames through nodes and links, and thus it can not meet the situation where an unexpected transmission delay arises owing possibly to changes in transmission state or in traffic. It causes disconnection of the communication in the presence of such delay.

(4) In the conventional handover process, as communication quality is solely determined by the transmission condition through the radio link, it can be monitored by the radio receiver connected to the link. However, in diversity handover, communication quality is obtained as the outcome of maximal-ratio diversion or diversity selection of frames from all branches involved in the handover, and thus it can not be monitored only by a radio receiver.

Maximum ratio combining of frames is a technique whereby MS receives downlink frames from a plurality of BSs, and combines received signals in such a way as to improve communication quality by site diversity effect. This technique is also utilized by a single BS which combines uplink frames from MSs incoming through a plurality of TRXs.

Namely, in handover involving a plurality of sectors in a zone governed by a BS (intracellular, inter-sector diversity handover), combining of uplink radio frames is performed by the BS according to maximal-ratio combining.

On the other hand, diversity selection is applied to combining of uplink radio frames in diversity handover involving a plurality of BSs. Uplink radio frames coming by way of a plurality of BSs are given reliability data different according to the routes they pass, and a diversity handover trunk chooses a frame having the best reliability information.

The reason why maximal-ratio combining is not applied for the combining of uplink radio frames in handover involving a plurality of BSs is to prevent transmission of a vast amount of information required for maximal-ratio combining through routes connecting the plurality of BSs and MSC, and thereby to prevent congestion of traffic. Diversity selection, as compared with maximal-ratio combining, does not require much reliability information for combining, although it allows only a low gain.

(5) With the conventional technique, when an out-of-sync (out-of-synchronization) state arises, BSs, whenever they detect it, inform of it to MSC processor through their own control links independently of each other. In diversity handover system, control is made such that the power required for transmission of uplink frames from MS becomes most efficient for a certain BS. Therefore, the other BSs which are not objects of power control may often inform MSC of out-of-sync states. Thus, a vast amount of control signals are transmitted through routes connecting BSs and MSC processor, and an overload is imposed on the processor.

DISCLOSURE OF INVENTION

Accordingly, it is a first object of the present invention to provide a method for handover, which recovers a sync state even if an out-of-sync state arises. Further, it is a second object to enable proper and effective quality control and informing of the out-of-sync state.

Therefore, in one aspect of the present invention, a method for handover utilizing a first transmission route which connects a diversity handover trunk with a mobile station by way of a first base station, and therewith causes a first delay time, and a second transmission route which connects the diversity handover trunk with the mobile station by way of a second base station and therewith causes a second delay time which is longer than the first delay time, the method comprising steps of:

communicating, by the diversity handover trunk, with the mobile station by way of the first base station with the first delay time intervened in communication;

receiving, by the mobile station, a signal through a radio channel of the second base station;

providing, by the mobile station, a handover trigger signal involving the second base station to the diversity handover trunk by way of the first base station;

changing the delay time in the first transmission route into the second delay time;

transmitting, the signal directed to the mobile station, through both of the first and second transmission routes; and receiving, by the mobile station, the signals provided through the first and second transmission routes for combining the signals or choosing either of the signals.

In another aspect of the present invention, a method for handover utilizing a first transmission route which connects a diversity handover trunk with a mobile station by way of a first base station, and therewith causes a first delay time, a second transmission route which connects the diversity handover trunk with the mobile station by way of a second base station and therewith causes a second delay time which is longer than the first delay time, and a control means which controls the diversity handover trunk, the method comprising the step of:

communicating, by the diversity handover trunk, with the mobile station by way of the first base station with a delay time intervened longer than or equal to the second delay time on the premise that it may communicate with the same mobile station by way of the second base station.

BRIEF DESCRIPTION OF THE DRAWINGS

FIG. 4 is a connection management table.

FIG. 5 is an MSC-BS delay time management table.

FIG. 6 is a diagram showing quality degradation measurement parameters and out-of-sync detection parameters.

FIG. 7 is a table representing traffic information managed by a MSC processor 32.

FIG. 23 is a diagram showing the states of handover branches classified by handover branch control.

Notes

1: Simultaneous control (addition, deletion or addition/deletion) of plural Brs is possible in response to a single request for DHO trigger from MS.

2: When MS determines the maximal connectable Brs to be 3, "deletion may turn into addition".

FIGS. 24a–d is a table showing, as another example, the correspondence of the handover trigger activated during mobile communication with the type of handover.

FIGS. 25a–d is a table showing, as another example, the correspondence of the handover trigger activated during mobile communication with the type of handover.

FIG. 26 is a diagram used for describing operations for calculating a radio frame offset number OFS and radio frame number FN.

FIGS. 27 and 28 form a timing chart showing procedures in various devices.

FIGS. 29 and 30 are tables representing examples of calculation procedures of timing-parameters.

Figure 31:
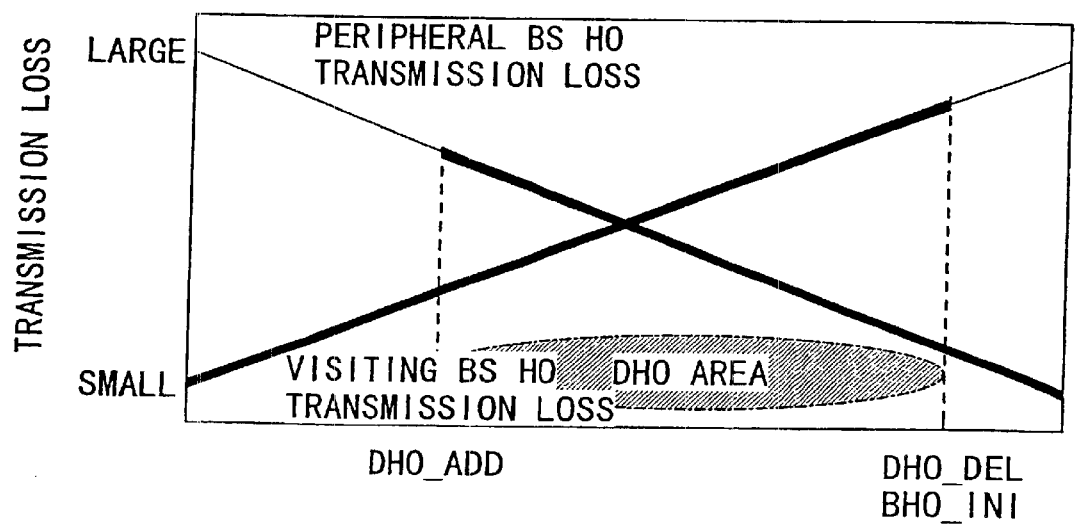

FIG. 31 is a diagram illustrating the operation of branch switching handover.

FIG. 32 is a diagram showing, as an example, a management table of parameters necessary for FN slide processing.

Figure 33:
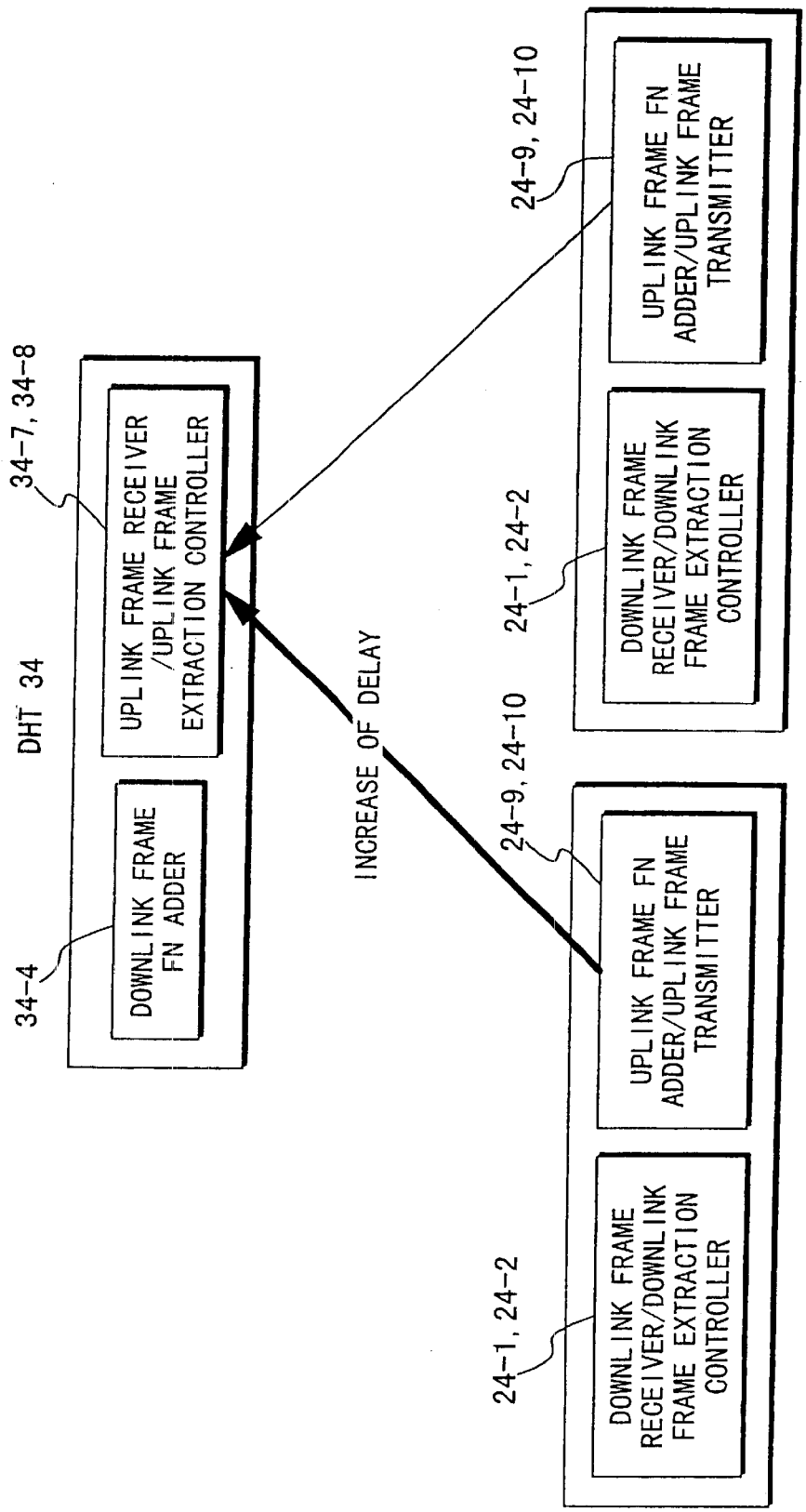
Figure 34:
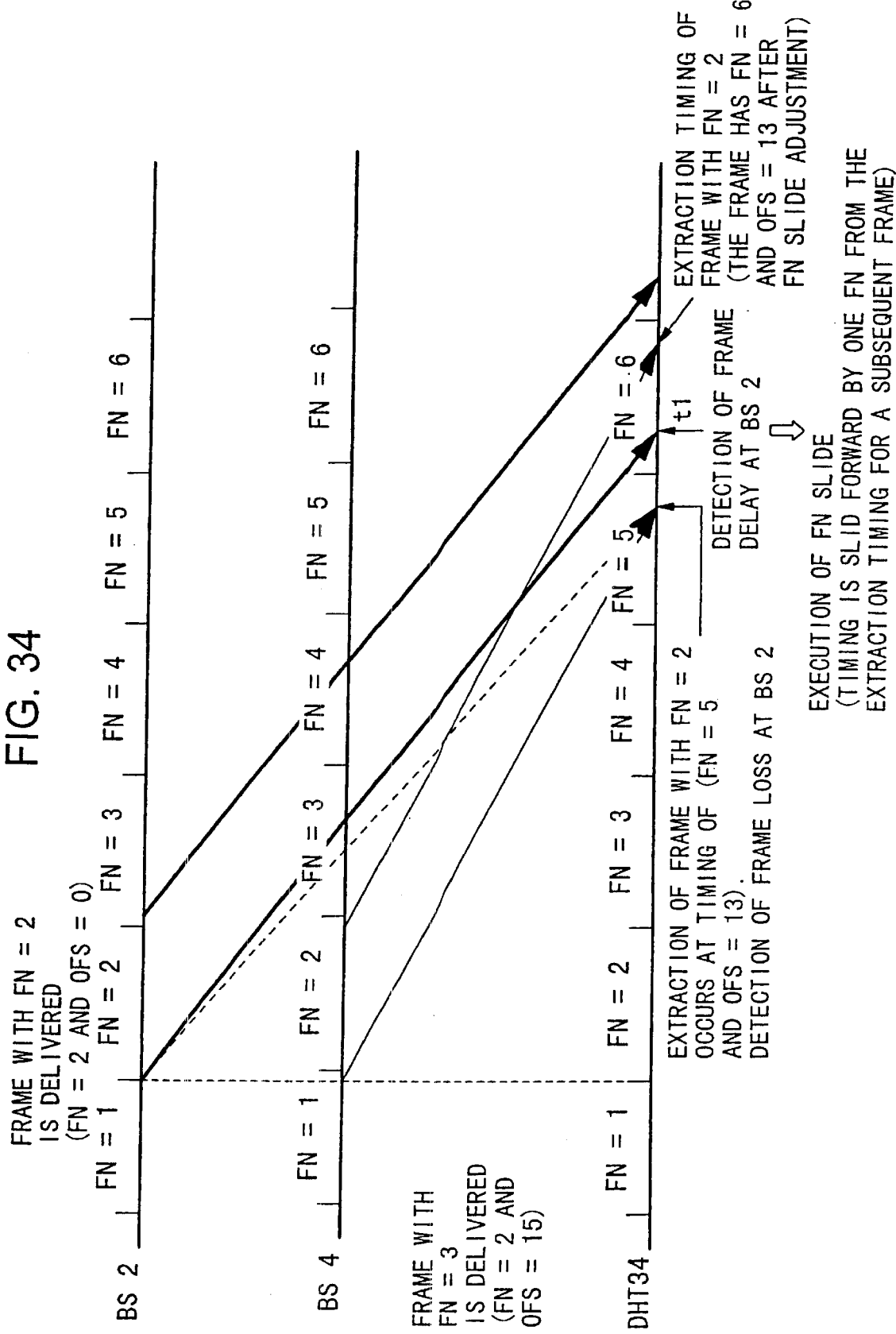

FIGS. 33 and 34 are diagrams illustrating the operation of uplink FN slide processing.

Figure 35:
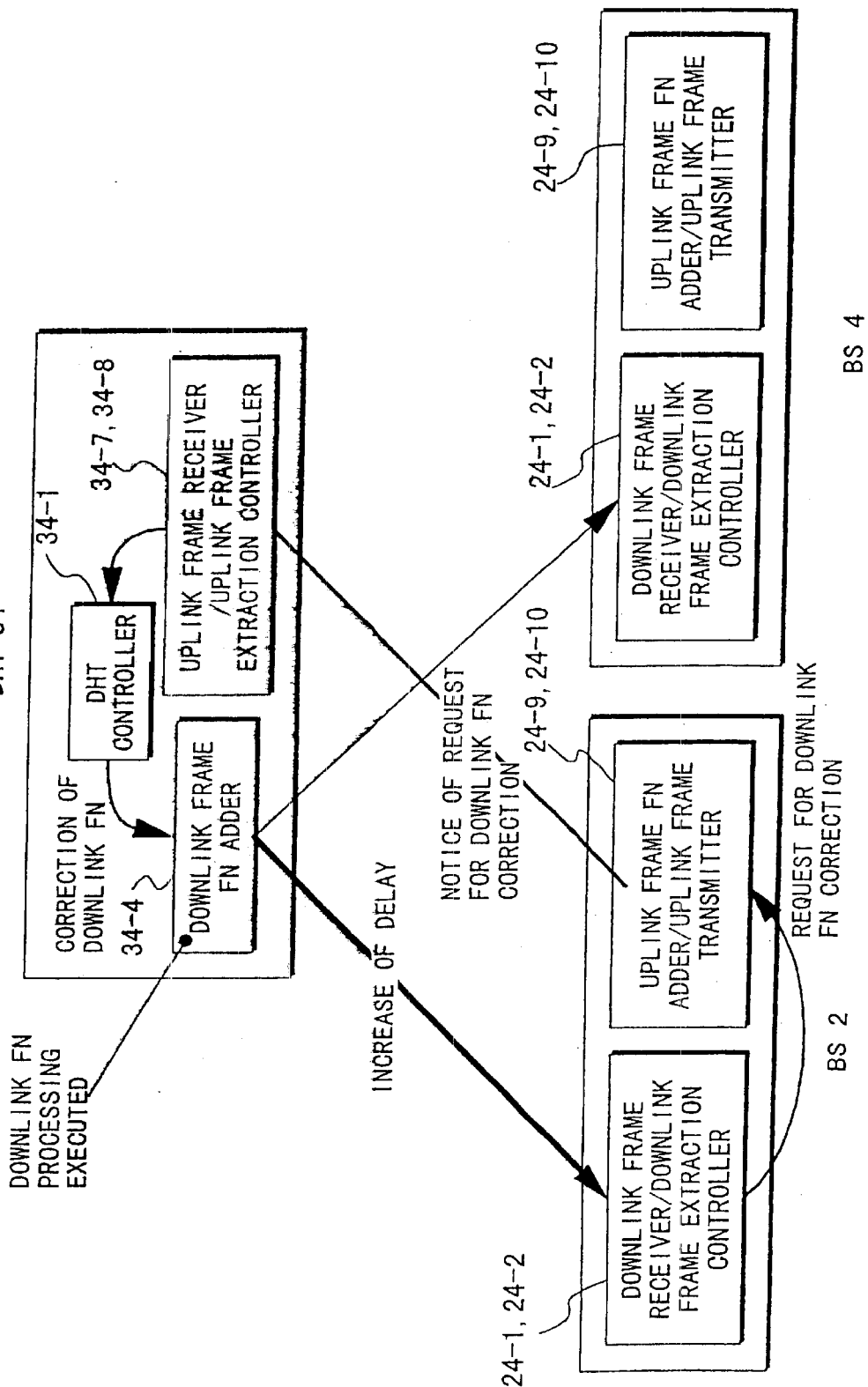
Figure 36:
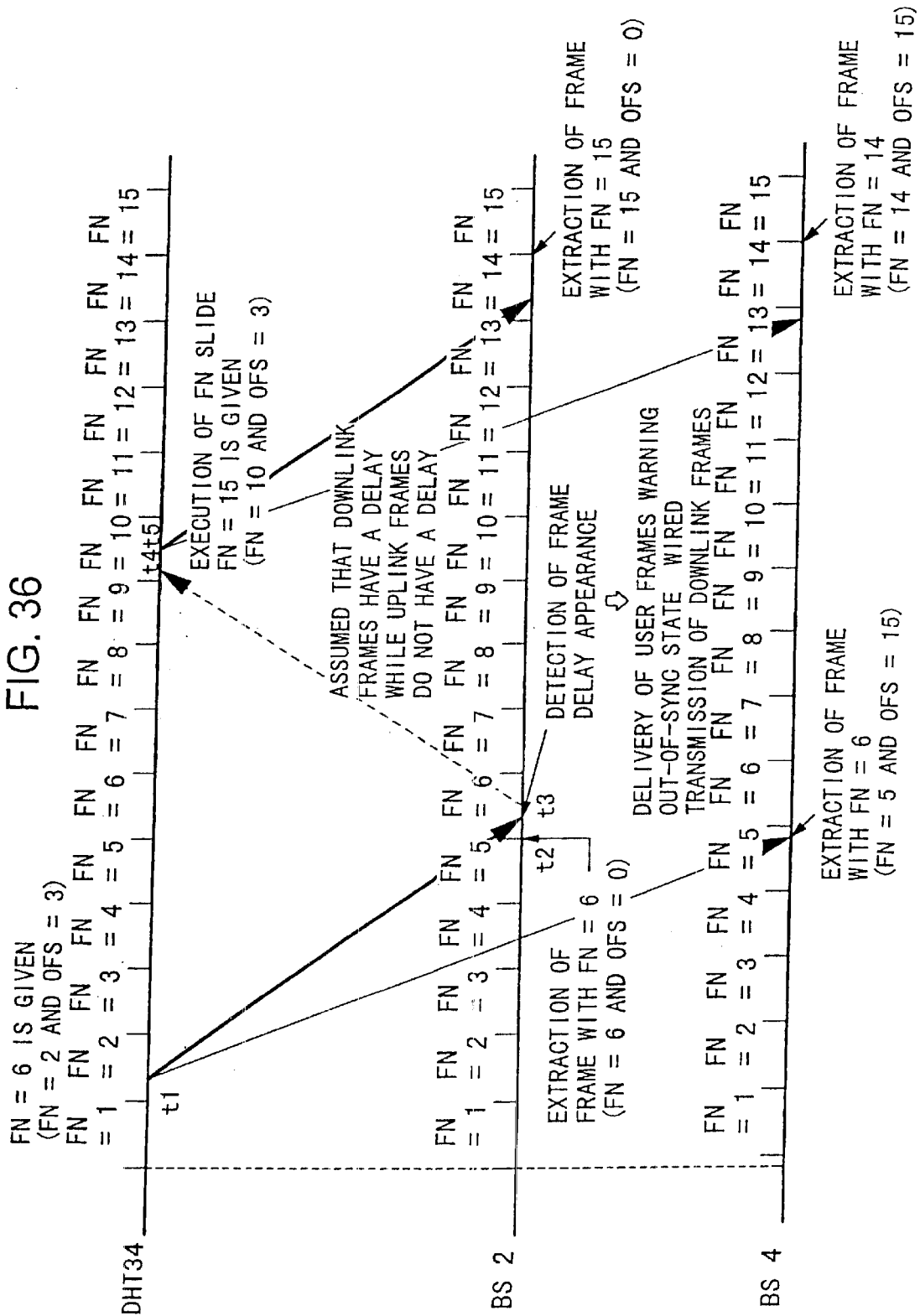

FIGS. 35 and 36 are diagrams illustrating the operation of uplink FN slide processing.

Figure 37:
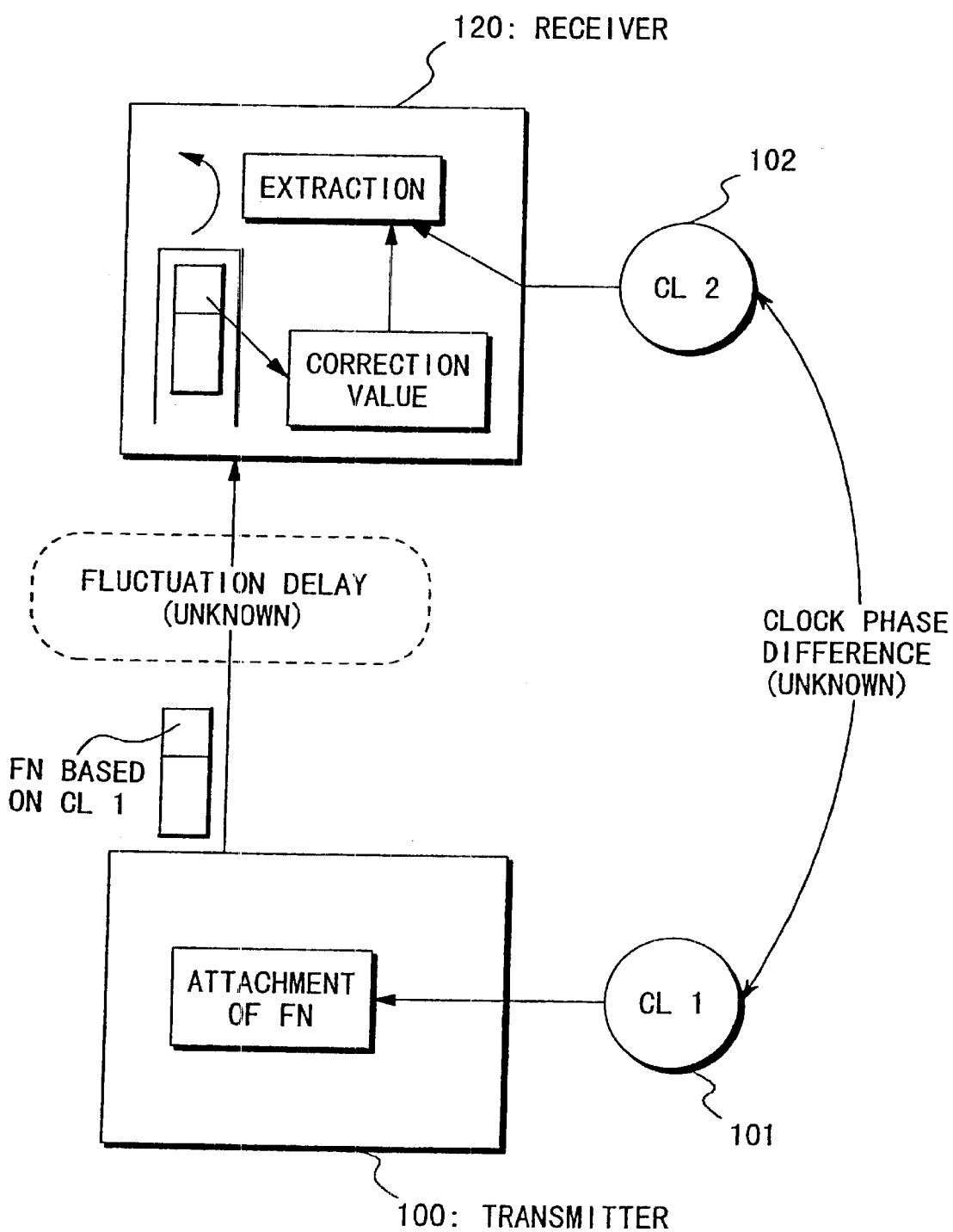
Figure 38:
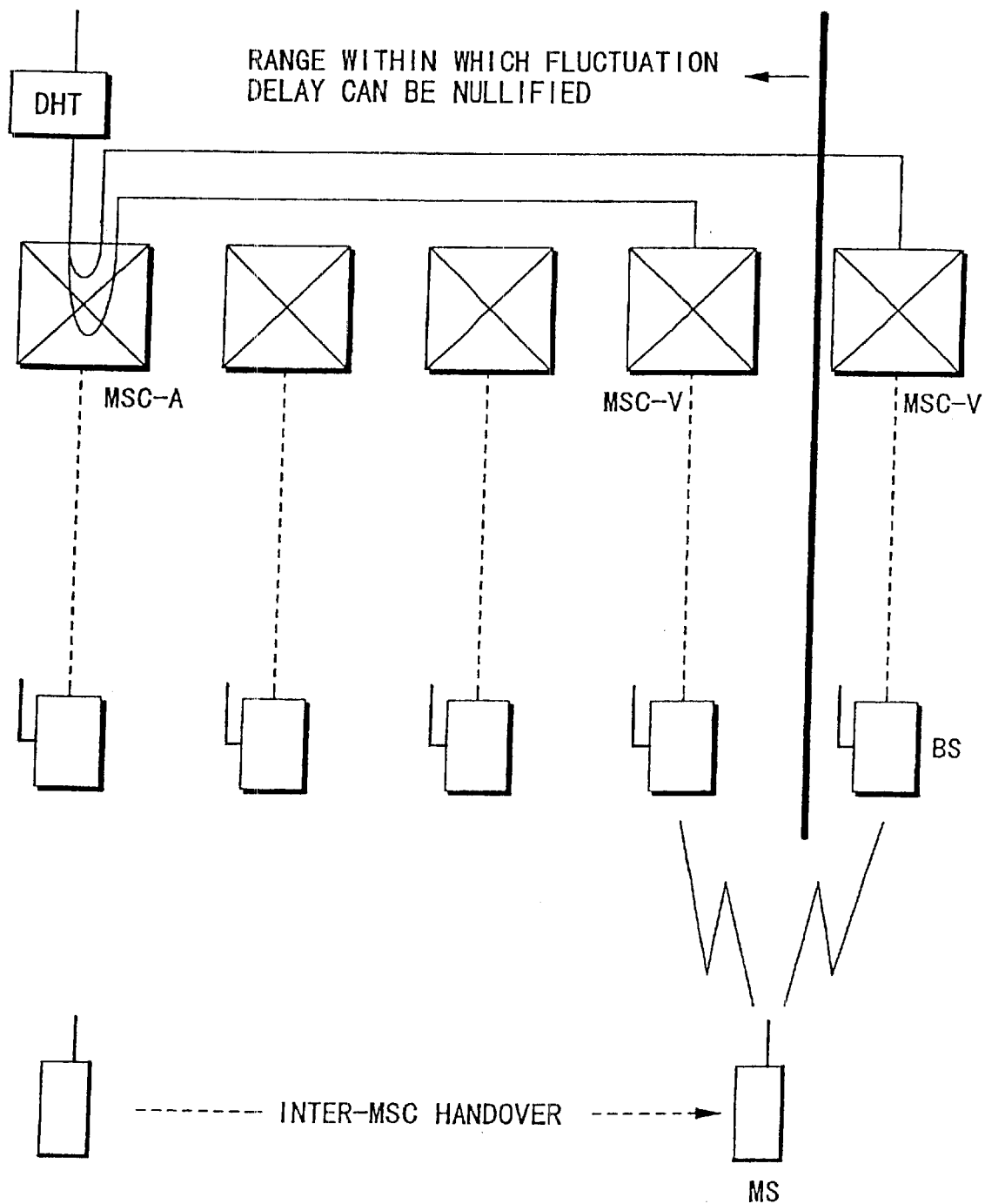

FIG. 37 is a diagram used for describing the operation of a modification of the embodiment;

FIG. 38 is a diagram illustrating the inter-MSC handover.

FIG. 39 is a block diagram showing the constitution of MSCs.

BEST MODE FOR CARRYING OUT INVENTION

1. Structure of an Embodiment

Below the structure of an embodiment of this invention will be described with reference to FIG. 1.

Figure 1:
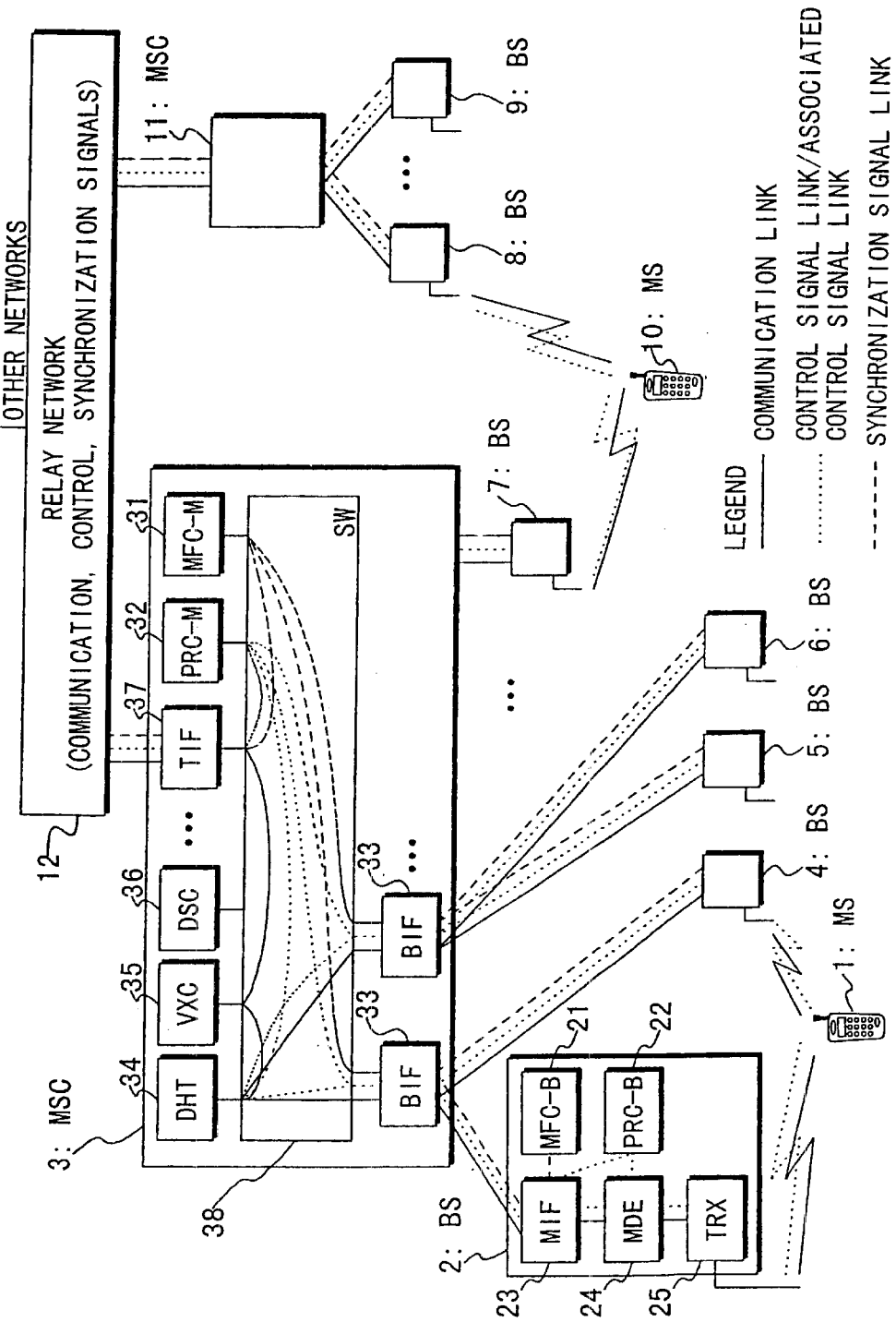
FIG. 1 is a block diagram showing a communication system according to an embodiment of the present invention.

In FIG. 1, symbols 1 and 10 represent mobile stations (MS); symbols 2 and 4–9 base stations; and symbols 3 and 11 mobile switching station (MSC), and they form nodes in a mobile communication system.

Within the base station 2, symbol 23 represents an MSC interface (MIF) installed in the BS, and form a communication link and a signal link with a BS interface (BIF) 33 installed in MSC 3. A radio frame synchronizer (MFC-B) 21 installed in the BS determines frame synchronization in BS 2, and provides an operation reference clock to every section in BS 2.

A transceiver (TRX) 25 transmits and receives radio frames to and from the mobile station 1. A modulator/demodulator (MDE) 24 modulates and demodulates the radio frames and corrects errors thereof. A base station processor (PRC) 22 controls elements of the base station 2 on the basis of a predetermined control program. Each of the other base stations 4–9 has the same structure as that of the base station 2.

Next, in the mobile switching center 3, a switching unit (SW) 38 is provided for switching transfer routes of frames in the mobile switching center 3. A frame synchronizer (MFC-M) 31 manages to synchronize frame operations in the mobile switching center 3 and provides reference clock pulses to elements in the mobile switching center 3 as similar to the frame synchronizer 21 of the base station 2. An MSC processor (PRC-M) 32 controls elements in the mobile switching center 3 as similar to the processor 22 of the base station 2.

In the embodying system, communication between the mobile stations 1 and 10 and the base stations 2 and 4–9 is carried out according to CDMA technique. In accordance with CDMA, it is possible for the mobile stations 1 and 10 to communicate with a plurality of base stations using with the same frequency band for a radio channel. Therefore it is possible to conduct diversity maximal-ratio combining process and diversity selection process in order to improve communication quality and to minimize the congestion in the radio channel.

This is a communication technique, with respect to downlink radio frames, an MS receives radio waves from a plurality of BSs simultaneously and applies the maximal-ratio combining to them, while with respect to uplink radio frames, a diversity handover trunk chooses the radio frames of BS which is in a better communication state with the MS.

Symbol 34 designates a diversity handover trunk (DHT) which executes frame sync adjustment and controls handovers across a plurality of BSs. DHT 34 absorbs fluctuations in uplink radio frames through a plurality of routes, and then makes a diversity selection.

Namely, DHT 34 waits frames up to a certain delay time set within the system, to transmit them, and the delay time is so set as to absorb delays in transmission of frames through individual routes.

Symbol 35 designates a high efficiency speech coder (VXC) which executes transcoding or others to speech user frames. A data service control system (DSC) 36 executes transcoding or others to data service frames. A relay network interface system 37 communicates various signals with a communication relay network, signal relay network, sync relay network, or the like not illustrated here.

Control signals provided by BS processor 22 of BS 2 to MSC processor 32 of MSC 3 are transmitted by way of BS processor 22, MSC interface 23 in BS, and BS interface 33 in MSC.

Control signals provided by MSC processor 32 to BS processor 22 are transmitted in the reverse order as above. Control signals provided by MS 1 to BS processor 22 is transmitted by way of BS 1, radio transceiver 25, BS modulator/demodulator 24 in order. Control signals provided by BS processor 22 to MS 1 is transmitted in the reverse order as above.

In addition, control signals provided by MS 1 to MSC processor 32 of MSC 3 is transmitted to MSC processor 32 by way of a radio transceiver 25, BS modulator/demodulator 24, interface 23 of BS, interface 33 of MSC, and diversity handover trunk 34. Furthermore, information provided by MSC processor 32 to MS 1 is transmitted in the reverse order as above.

2. Operation of the Embodiment
2.1. Synchronization Setting of Radio Frames

In each of the nodes (BSs 2 and 4–9, and MSCs 3 and 11) of the mobile communication network illustrated in FIG. 1, frame synchronizer 21 or 31 carries out synchronization adjustment for the frames in the corresponding node.

In the synchronization adjustment in the nodes, the allowable phase difference of radio frames is determined to be less than a half of an interval of the radio frames, which are transmitted between the mobile station 1 and the base station 2, in order to prevent a large transmission delay of radio frames. For example, if the radio frame interval is 10 msec, the allowable phase difference is less than 5 msec. As long as the phase difference is shorter than the allowable limit, all the involved nodes (BSs 2 and 4–9, and MSCs 3 and 11) can synchronize.

Frame synchronizers 21 and 31 deliver reference clock pulses to every element in their respective nodes. In the embodiment, the cycle of the reference clock pulses is 0.625 msec. A period equal to 16 times the reference clock cycle is called a radio frame clock unit (more specifically, it is equal to 0.625×16=10 msec).

In addition, a number is determined by each radio frame clock unit. The number, called frame number FN, is incremented from 0 to 63 in a cyclic manner. In a single radio frame clock unit, a number is determined by each clock pulse. The number, called radio frame offset number OFS, is incremented from 0 to 15 in a cyclic manner.

In FIG. 1, radio frame synchronization adjustment between different nodes is achieved using with wired communicating routes, since it is possible that the base stations may be situated where they can not receive radio wave. However, the radio frame synchronization adjustment may be achieved using with a certain wireless means such as GPS.

The "synchronization" and "phase difference", which are described in this specification, will be understood by the following explanation in comparison with commonly used clocks.

All clocks in the world tell passage of 24 hours in a day, and have the same cycle. However, when two clocks at two spots between which there is a time difference are compared, the indications of the clocks are different from each other. The time difference can be regarded as the "phase difference".

This difference is basically maintained at any time although some errors occur due to the precision of the clocks. Accordingly, it can be said that the two clocks "synchronize" with each other with a certain difference maintained.

2.2 Onset of Communication
2.2.1. Call Dispatch and Link Setting

When a call is dispatched from MS 1, or a call is dispatched from a station outside or within the network (not illustrated here) to MS 1, control signals are exchanged between MS 1, BS processor 22 and MSC processor 32, and communication resources which may be required according to the type of service are hunted and activated.

At the same time, communication links and associated control links to connect communication resources are established within the mobile communication system. Here the communication link, when used for speech communication, is a link connecting MS 1, radio transceiver 25, BS modulator/demodulator 24, interface 23 of BS, MSC interface system 33, diversity handover trunk 34, high efficiency speech coder 35 and relay interface system 37 in order.

On the other hand, the communication link, when used for data communication, is a link connecting the same elements as above except high efficiency speech coder 35 being replaced with a data service control system 36. The associated control link is a link connecting MS 1, radio transceiver 25, BS modulator/demodulator 24, interface 23 of BS, BS interface 33 of MSC, diversity handover trunk 34 and BS processor 32.

This associated control link which is installed to be attached to the communication link is utilized for setting the second call during the onset or progression of communication, setting radio routes between a MS and BS, and controlling handovers, radio transmission, and mobility.

Figure 17:
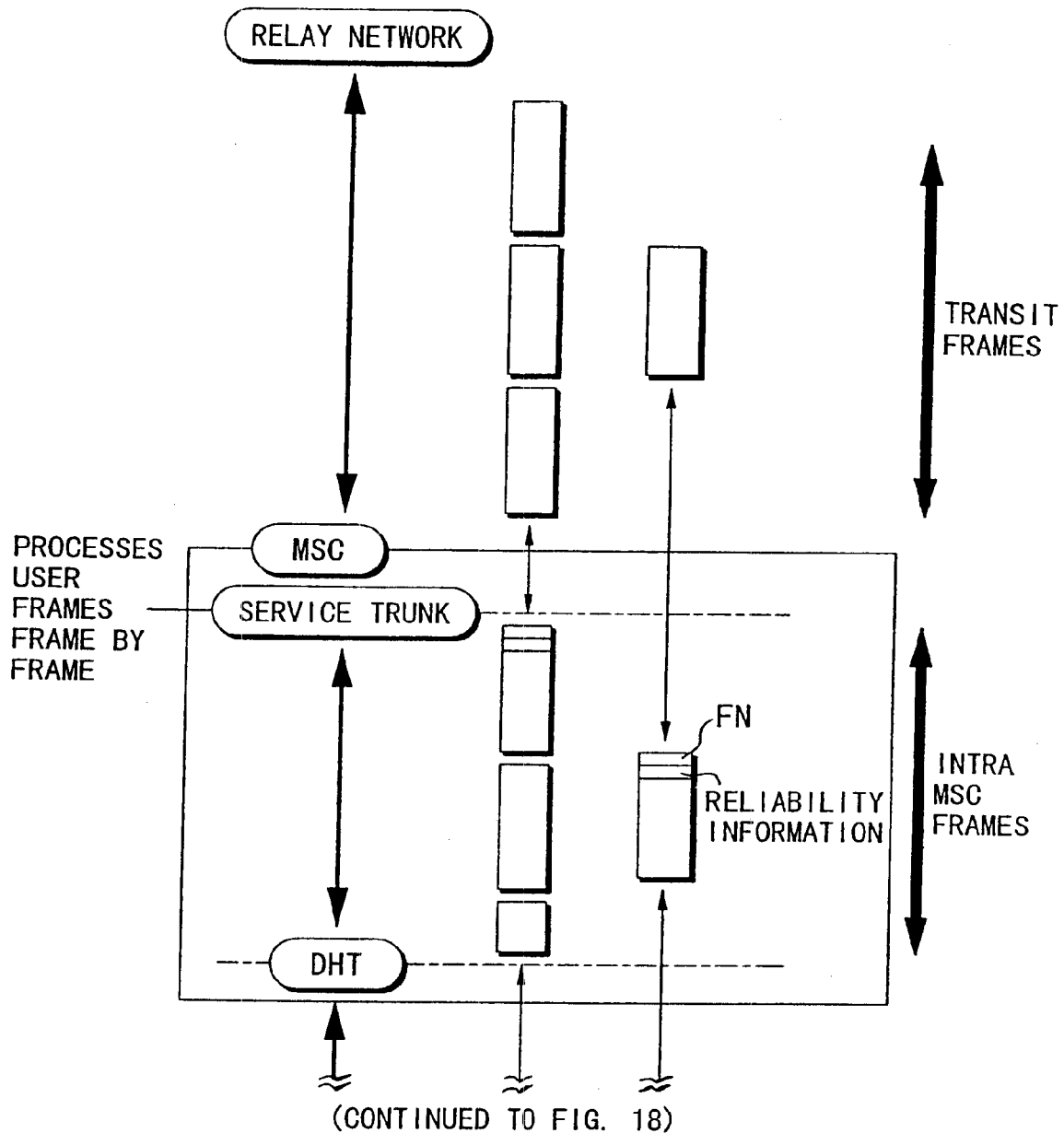
FIGS. 17 and 18 cooperate to form a diagram illustrating configurations of frames passing between individual nodes.
Figure 18:
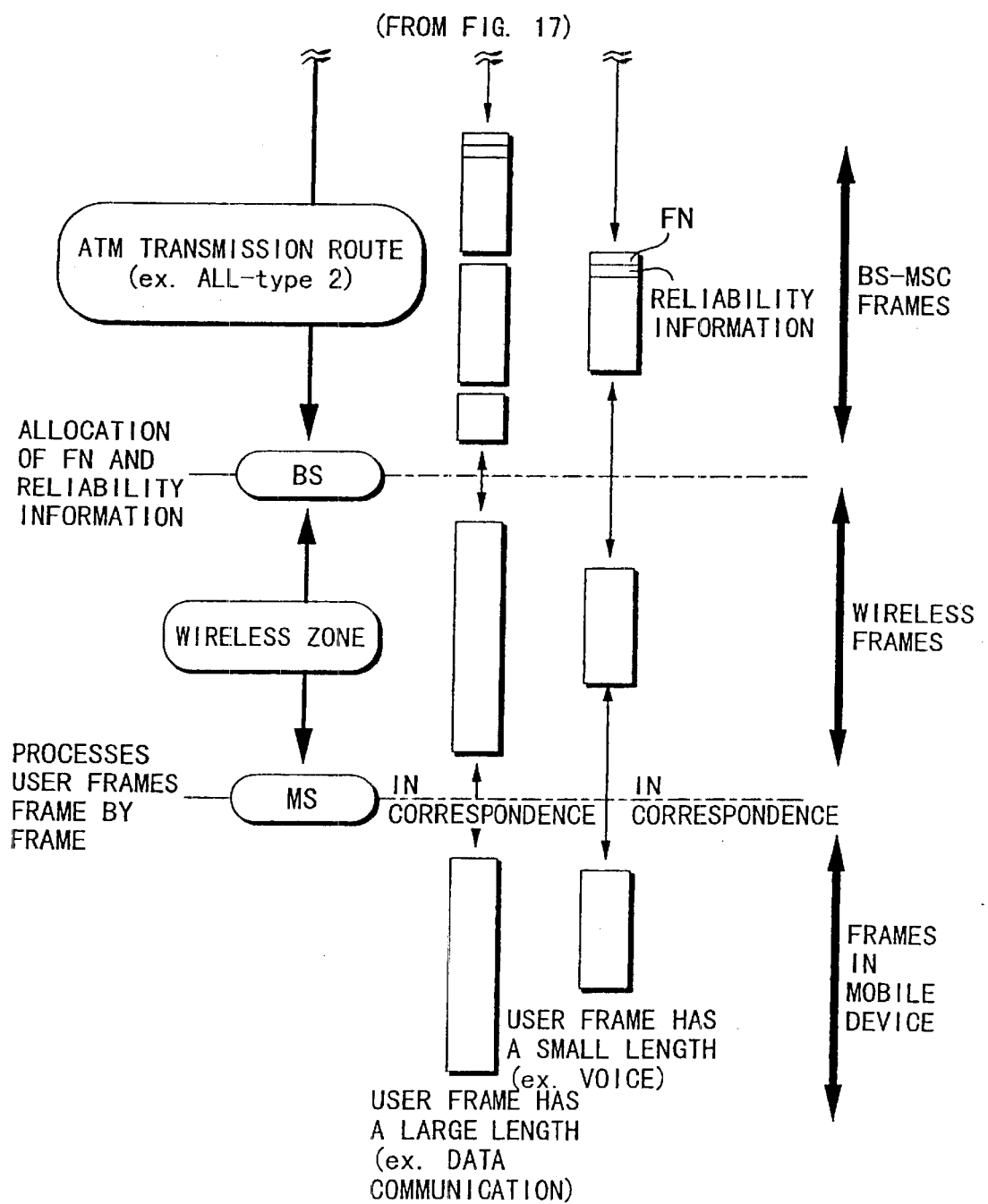

Referring to FIGS. 17 and 18, transmission frames of individual segments will be explained with attention being paid to their names and configurations. In this example, communication through wired routes between a BS and MSC takes place on the basis of AAL Type 2 of ATM (as specified in the ITU-T I.363.2 draft recommendation), but the mode proposed by this embodiment can be applied with the same profit to communications in packets and frame relays, and on other AAT Types of ATM.

Figure 19:
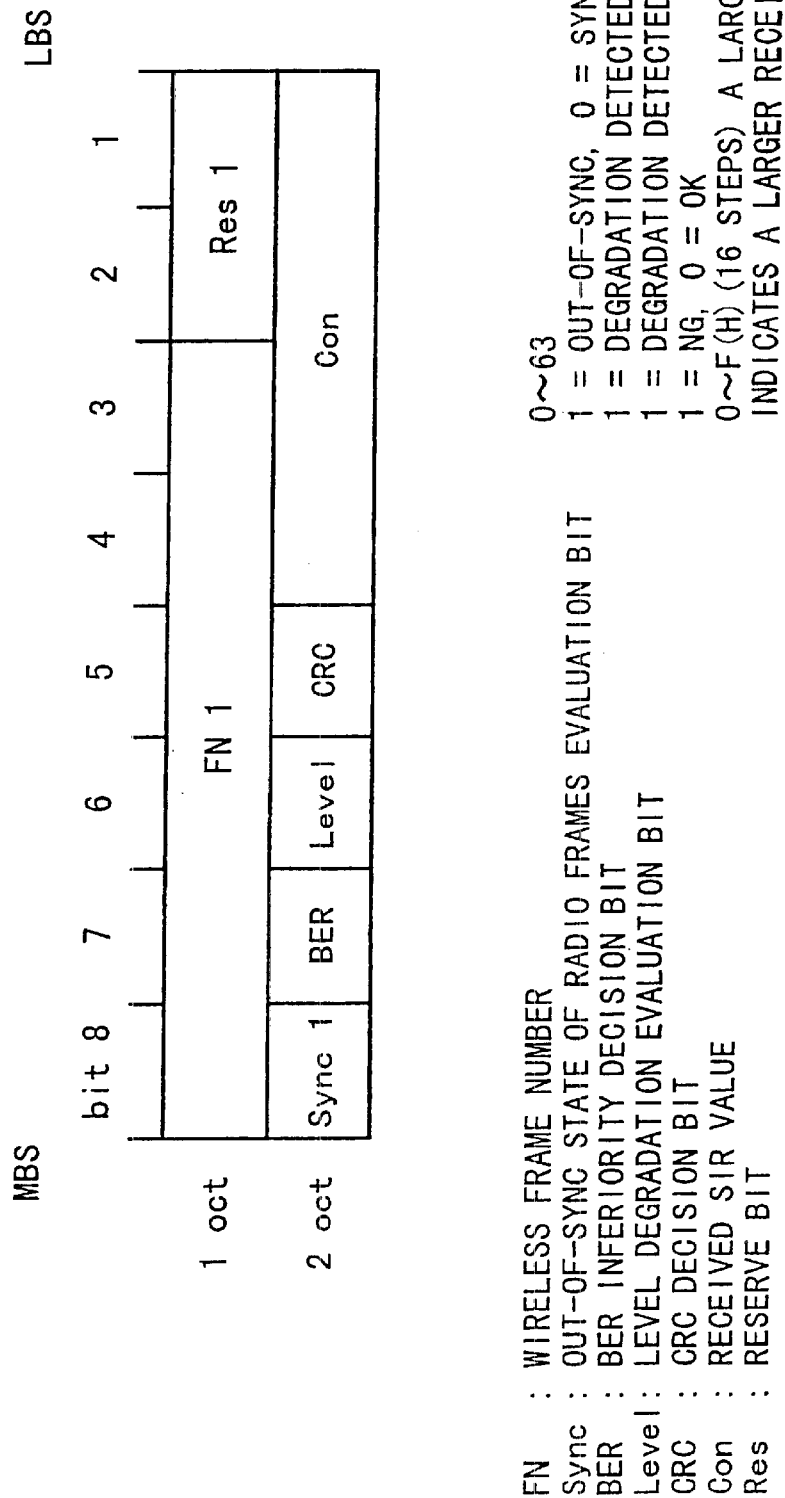
FIG. 19 is a diagram illustrating the operation necessary for the diversity selection treatment of user frame.

Explanation will be given taking, as an example, how uplink processing is achieved by individual systems. A user frame, after being divided into 10 msec units, undergoes encoding and modulation in an MS to be transmitted as a radio frame. The radio frame is received by a BS and, after being demodulated and decoded, is given radio frame numbers and reliability information. The detail of radio frame number FN and reliability information is shown in FIG. 19.

The transmission frame communicated between BS and MSC is called a BS-MSC frame. When communication between a BS and MSC takes place on the basis of Type 2 of ATM, radio frames comprising speech with a small user frame length (45 octet or less) and transmitted through a low speed radio route can be accommodated by one Type 2 CPS packet, while radio frames comprising data with a large user frame length (over 45 octet) and transmitted through a high speed radio route can not be accommodated by one Type 2 CPS packet, and divided into a plurality of BS-MSC frames for transmission. In one example, a radio frame is divided into three portions, each of which is transmitted as Type 2 CPS packets.

A diversity handover trunk receives wired frames, execute diversity selection of the frames per each BS-MSC frame, and sends the results, as the intra-MSC frames, to a service trunk such as the high efficiency speech coder 35 and data service control system 36. Intra-MSC frames are reconverted by the service trunk into user frames, processed as appropriate according to intended services, and transmitted as relay frames in a form adaptive to a subsequent relay network.

2.2.2 Parameter Setting

Figure 15:
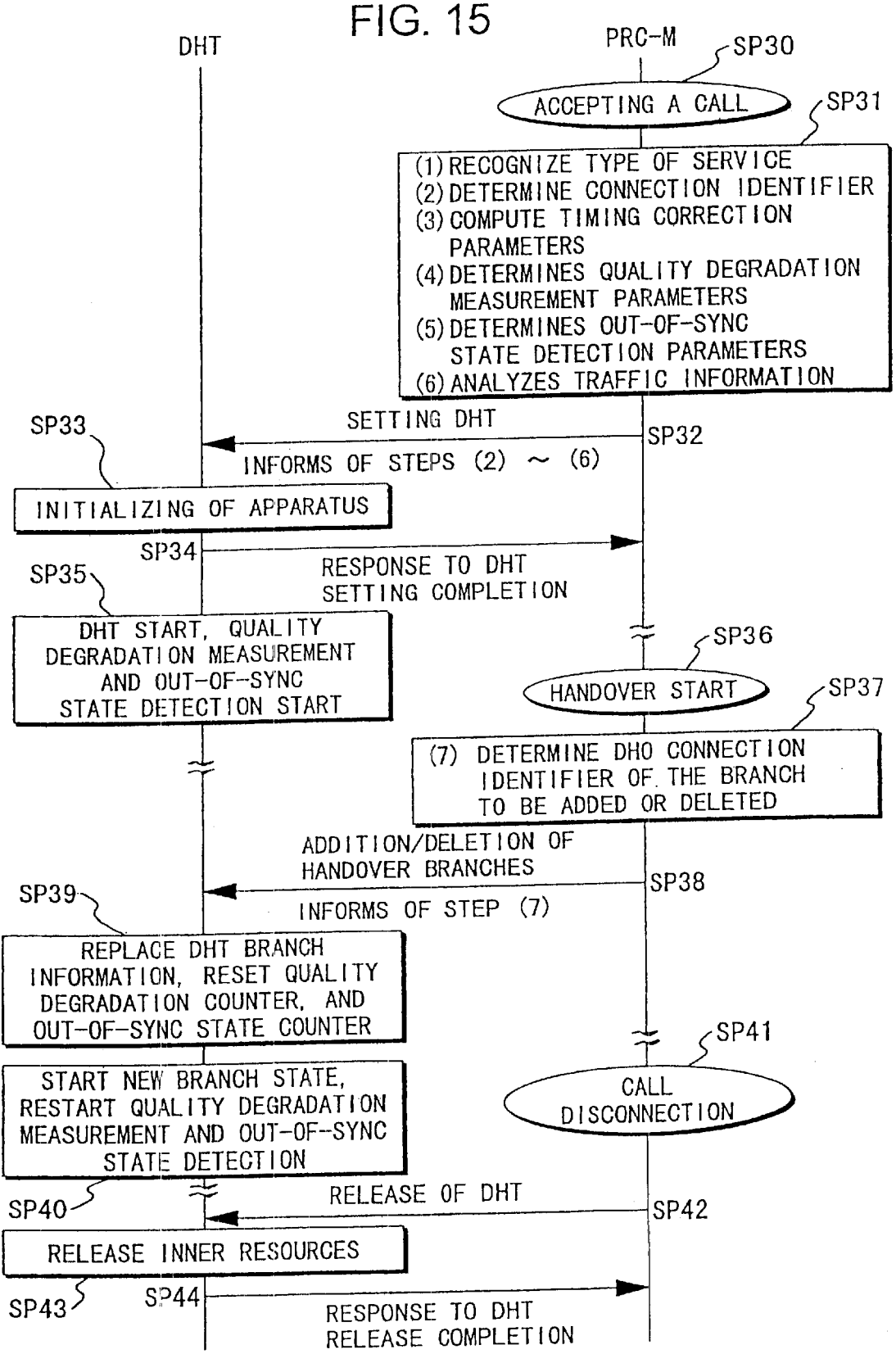
FIGS. 15 and 16 cooperate to form a sequence diagram representing an announcement and management procedure for announcing quality degradation and out-of-sync state at beginning and ending of communication.

Then, referring to FIGS. 2 and 15, the operation of diversity handover trunk 34 will be described in detail.

First, a communication controller 32-1 in the MSC processor 32 informs a DHT controller 34-1 in a hunted (inserted into the link) diversity handover trunk 34, of quality degradation parameters, out-of-sync detection parameters, timing correction parameters, DHO branch information, network-side connection identifiers, and traffic information.

Examples of quality degradation measurement parameters and out-of-sync detection parameters are shown in FIG. 6. Exemplified contents of traffic information are shown in FIG. 7. The quality degradation measurement parameters include the cycle of measurement of quality degradation and threshold value which should be announced as occurrence of degradation. Furthermore, the out-of-sync detection parameter is a number of successive non-synchronized cells. If the number is counted up, the out-of-sync state is recognized.

The traffic information carries the intervals of arrived cells and the number of received cells at a given timing when ATM is applied for communication through a wired route between a BS and a MSC. These parameters and data are managed by MSC processor 32 according to individual services. Furthermore, the timing correction parameter includes a correction value for uplink/downlink frame number, and a correction value for uplink/downlink frame offset number. These numbers are calculated based on an MSC-BS delay time management table shown in FIG. 5 stored in a memory 32-2. Each of the delay time values in FIG. 5 includes 5 msec, which is the maximum phase difference allowed for transmission between the MSC and the corresponding BS. Furthermore, if another MSC is inserted between each base station and mobile switching center 3, a delay caused by the insertion of the inserted mobile switching center should be included in each delay time value in FIG. 5.

Next, referring to FIG. 26, explanation will be given of the method how to compute the correction values for uplink/downlink radio frame numbers, and correction values of uplink/downlink radio frame offsets. Considering firstly downlink frames;

(1) DHT in an MSC allocates frame number FN after having added a maximal fluctuation delay to a reference clock timing created by MFC-M, and transmits the frames to a BS. The thus transmitted frames are received by BS; and (2) an MDE of BS converts the frames referring to frame number FN and in accordance with a reference clock timing created by MFC-B and offset timing, adjust them, and sends them to radio communication zones as a series of radio frame numbers.

On the other hand, considering the uplink radio frames;

(3) the radio frames are received by TRX of a BS in accordance with a reference clock created by MFC-B, and are given by MDE radio frame numbers FNs created by MDC-B, and transmitted to an MSC; and (4) The thus transmitted frames are received by DHT in the MSC which allocates frame number FNs after having added a maximal fluctuation delay to a reference clock timing created by MFC-M, and transmits the resulting frames to a subsequent system.

Next, an exemplified method for calculating the above parameters will be explained, assuming that the mobile station 1 executes diversity handover when the base stations 2 and 4 transmit voice frames to the mobile station 1. The MSC-BS delay time management table shown in FIG. 5 indicates that the BSs 1 and 2 (base stations 2 and 4) allow the delay time of 30 msec and 38 msec respectively for this case. Therefore, 38 msec should be selected as the maximum transmission delay.

Namely, to nullify the fluctuation of radio frames arriving from the base stations 2 and 4, the maximum transmission delay at an uplink frame extraction controller 34-8 is set at 38 msec. However, if execution of diversity handover is not limited to all the base stations, and if the fluctuation of radio frames should be nullified for all the base stations, the maximum transmission delay should be set at 40 msec that is the maximum value in the table.

38 msec approximately equal to three radio frame clock units (30 msec) and 13 radio frame offset units (8.125 msec). Accordingly, the correction number for uplink frame number and the correction number for uplink frame offset number are set at "3" and "13", respectively. The correction numbers for downlink frame number and downlink frame offset number are also set at "3" and "13", respectively.

However, if uplink and downlink lines have different delay characteristics, different values for the uplink and downlink lines may be stored in the MSC-BS delay time management table of FIG. 5. In this case, for the uplink and downlink lines, different correction numbers for radio frame numbers and frame offset numbers may be set according to this table.

Correction is achieved, with respect to the reference clock delivered from the synchronizer 31 of MSC, by subtracting the uplink radio frame number correction value and radio frame offset correction value from the clock. On the other hand, for the downlink radio frame number correction value and radio frame offset correction value, correction is achieved by adding those correction values to the reference clock.

The DHO branch information includes the number of lines connected to the diversity handover trunk 34, and connection identifiers. The network-side connection identifier refers to the connection identifier on the network side which is connected to the diversity handover trunk 34. These data are described in a connection management table shown in FIG. 4 and managed by the MSC processor 32, and are used for determining the number of connections and identifying frames when uplink frames are selected or when downlink frames are distributed to the base stations.

2.3. Processing to Downlink Frames in MSC 3

When downlink intra-MSC frames appropriately divided to conform to radio frame length are provided from the network 12 through the interface 37, the intra-MSC frames are received by a downlink frame receiver 34-2.

Then, in a downlink frame extraction controller 34-3, extraction of the intra-MSC frames thus received is executed. The timing for extraction corresponds with the timing corrected on the basis of the downlink radio frame offset correction value which is sent by DHT controller 34-1.

Namely, the intra-MSC frames are extracted according to the timing which is determined after the downlink frame offset correction value has been subtracted from "16". For example, if the downlink frame offset correction value is "13", the intra-MSC frame corresponding to the third reference clock pulse in one radio frame clock unit is extracted since 16−13=3.

Furthermore, the number of cells and the interval of cells to be extracted as intra-MSC frames are determined according to traffic information. The cell interval is basically n times the interval of radio frames wherein n is an integer. When intra-MSC frames are extracted by a downlink frame extraction controller 34-3, a downlink FN adder 34-4 adds radio frame numbers FN to the intra-MSC frames.

The radio frame number FN is obtained in the following manner. The corrected downlink frame number, "3" in the above example, and the corrected radio frame offset number, "1", are added to the radio frame number FN determined by the reference clock pulses provided by the MSC frame synchronizer 31. Then, the result is divided by "64" and the residue is the radio frame number FN.

Consequently, in this embodiment, the downlink frame receiver 34-2 executes a timing correction of the reference clock pulses on the basis of the corrected downlink frame offset number, while the downlink FN adder 34-4 executes a correction of radio frame clock units.

Then, the BS extracts the downlink frames according to the radio frame numbers FN determined by the reference clock pulses provided by BS radio synchronizer 21 with the radio frame offset correction value being set at "0". Therefore, the extraction of downlink frames in the BS is easily achieved.

Next, a downlink frame copier 34-5 make copies of intra-MSC frames based on DHO branch information, depicted in FIG. 4, provided by a DHT controller 34-1, so that the number of copies is equal to the number of branches involved in diversity handover. To the copies of the frames, which are BS-MSC frames, attached are connection identifiers corresponding to the branches, the connection identifiers being used for address information of user frames.

In the example depicted in FIG. 1, diversity handover is executed to the transmissions to the MS 1 through the BSs 2 and 4, so that the branch number is "2". Furthermore, if the intra-MSC frames and wired frames are contained in ATM cells to be transmitted, then all cells are copied once, and the connection identifier identifying the BS 2 is attached to either series of the original cells or series of copies while the connection identifier identifying the BS 4 is attached to the other series of the original cells or series of copies.

BS-MSC frames thus copied as appropriate are sent to a downlink frame deliverer 34-6. Then, BS-MSC frames are delivered based on the connection identifiers by way of interface 33 of MSC to individual wired branches, that is, to BSs 2 and 4.

2.4. Processing to Downlink Frames in BS

Next, with reference to FIG. 27, processing after the arrival of the BS-MSC frames to the BS 2 from the to-BS interface 33 of the MSC 3 will be described. The downlink BS-MSC frames are received by the to-MSC interface 23 of the BS 2, and then transferred through a downlink frame receiver 24-1 to a downlink frame extraction controller 24-2. In the downlink frame extraction controller 24-2, a downlink BS-MSC frame is extracted from the received BS-MSC frames according to the reference clock pulses provided by the BS radio frame synchronizer 21.

Extraction of BS-MSC frames at BS (BS 2 in above example) which acts as a reference for communication synchronization during the onset of communication takes place with the radio frame offset value OFS of reference clock being set to "0." If there are no BS-MSC frames that can be extracted according to above timing, waiting time is prolonged to the next timing (after "1" radio frame clock cycle) and extraction of BS-MSC frames is resumed.

On the other hand, in the subordinate BS 4 accommodating a branch which is added for diversity handover at the onset of communication or during communication, a processing is executed to put the timing of radio signal communication there with the timing of radio frames transmitted or received by master BS which acts as a reference for synchronization when communication with MSs is performed.

When involved communication nodes constituting a mobile communication network adjust synchronization phases using wired routes so that phase difference in synchronization would be less than 5 msec, for a given MS to execute a maximal-ratio combining processing, it is necessary to have a buffer with a sufficiently large capacity to nullify synchronization variations up to 5 msec, because radio frames coming from other MSs engaged in diversity handover have synchronization variations up to 5 msec.

However, enlargement of buffer size would conflict with contracted MS size, and thus it is necessary for the subordinate MS to adjust the radio frame offset value around "0" so that the sync errors, which otherwise would be 5 msec at maximum, may become about "0.625 msec" at maximum.

The radio frame synchronization phase difference between the master BS which acts as a reference for communication synchronization and the subordinate BS is determined when MS starts diversity handover. Namely, radio frames which are currently handled by MS, and radio frames from an announcement channel of the subordinate BS which are newly handled are compared so that the phase difference between the two may be checked.

The checked result is transferred, by way of MSC, to the subordinate BS. It is possible to finely adjust the radio frame offset value of the subordinate BS based on this measurement. When this fine adjustment exceeds the length of one radio frame clock unit, the radio frame number FNs of the same BS are shifted in association.

Figure 3:
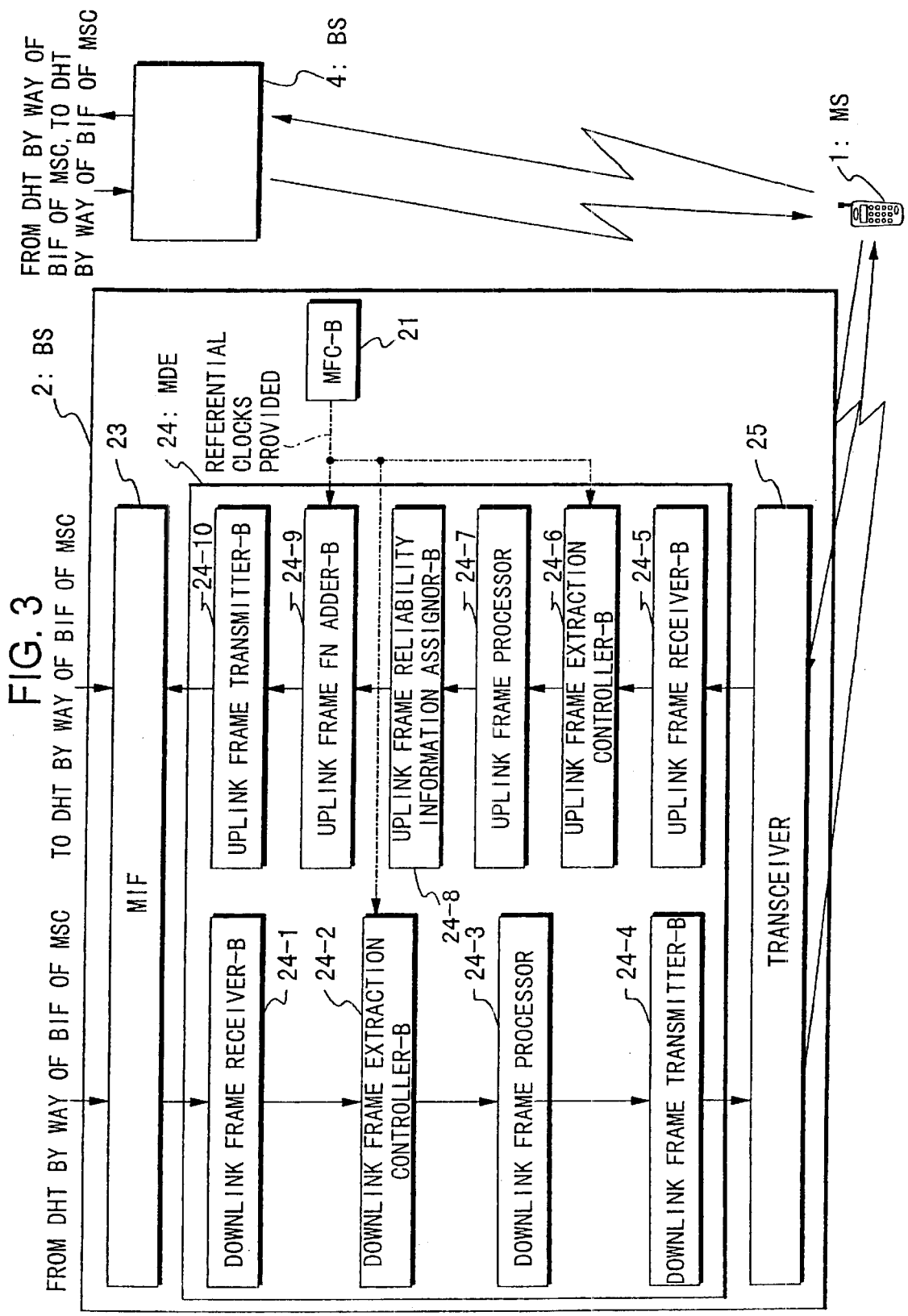
FIG. 3 is a block diagram showing important structural elements of a base station 2 of the system in FIG. 1.

Turn back to FIG. 3. BS-MSC frames thus extracted are provided to a down-frame processor 24-3, where encoding treatment for prevention of the entry of errors during transmission over radio link and modulation for radio transmission are executed, to establish radio frames. Then, thus established radio frames are transmitted, by way of the transceiver 25, to the zones of involved BSs.

When MS 1 is engaged in diversity handover, it receives radio frames from BSs 2 and 4. Then, it applies maximal-ratio combining to them, and tailors them into user frames.

The downlink frame receiver 24-1 monitors radio frame number FNs given to BS-MSC frames and stored in its buffer, and announces the appearance of "frame delay" when it detects a sufficiently long delay in the arrival of BS-MSC frames carrying radio frame number FNs to be extracted, in association with the downlink frame extraction controller 24-2. When such announcement is received, the BS delivers "a request for FN correction" to diversity handover trunk 34.

When the downlink FN correction request is provided to diversity handover trunk 34, the DHT controller 34-1 renews the downlink frame number correction value. The renewed downlink frame number correction value is transferred to a down-frame FN adder 34-4, and allocation of radio frame number FNs to subsequent BS-MSC frames is performed according to this renewed value. This is called downlink FN slide processing.

Below explanation will be given of the detail of downlink FN slide processing referring to FIG. 35.

This processing proceeds as follows to recover sync, once synchronization of frames has been lost: when frames arriving with a sufficiently long delay behind extraction timings at the downlink frame receiver 24-1 and downlink frame extraction controller 24-2 are detected successively, the radio frame number FNs given to those downlink frames by diversity handover trunk 34 are altered as appropriate to recover sync.

With this FN slide processing, it is necessary to prevent the discrepancy of the radio frame number FNs of a plurality of BSs and the information dispatched to radio link. To prevent such discrepancy, adjustment of FN slide lengths between different BSs or slide timing may be informed each other. In this example, however, the downlink FN slide processing is not performed by the downlink frame receiver 24-1 of individual BSs, but a BS which initially detects the appearance of delay informs of it to the diversity handover trunk of information source, to allow the downlink frame FN adder 34-4 of diversity handover trunk to execute the downlink slide processing. Then, detailed explanation will be given below of both of BS and diversity handover trunk.

2.4.1. Processes in Base Station

In BS, user frames carrying predetermined radio frame number FN are extracted from a buffer according to the reference clock provided by BS-MSC frame synchronizer 21. When user frames which arrive behind extraction timings are detected by the downlink frame receiver 24-1 and downlink frame extraction controller 24-2, downlink FN correction request information is generated. The downlink FN correction request information is sent by the uplink frame transmitter 24-10 by way of MIF 23 through a user signal route to DTH of MSC. Alternatively, the same information may be sent through a control signal route. For the latter case, when user frames which arrive behind extraction timings are detected, the downlink FN correction request is transmitted by way of MDE of BS to PRC-B 22, and the same request is sent to PRC-M 32 as control signals. Later, the downlink correction request is transferred, in MSC, from PRC-M32 to DHT controller 34-1 in DHT, and finally to the downlink FN allocator where the downlink slide processing is executed to produce a downlink FN correction request.

Advantages and disadvantages will be described below when the downlink FN correction request is sent to a diversity handover trunk as control signals or as user signals. When it is sent as control signals, execution of it may increase the delay time or a load inflicted upon the control processor. Alternatively, when it is sent as user signals, two possible situations exist: the downlink FN slide request is applied to uplink user frames received from some radio links, or it is sent as notice dedicated user frames.

For the former situation, the FN slide request, if applied to a series of packets in which user frames are interrupted at intervals, may be lost. While in the latter situation utilizing dedicated user frames for notice, it ensures the transfer of request at a high speed and with a necessary timing, though increasing traffic. The notice dedicated user frames are called "downlink wired out-of-sync notice user frames". The wired out-of-sync notice user frame is transmitted independently of uplink user frames. Further, the downlink wired out-of-sync notice user frame with downlink FN slide amount added thereto may be transmitted to a diversity handover trunk.

2.4.2. Function of Diversity Handover Trunk

For radio links, power control of signal transmission is performed on the premise that all branches belonging to wired links contribute to the synthetic gain of diversity handover. Accordingly, even when only one branch among a plurality of branches dispatches a downlink FN slide request, the downlink frame FN adder 34-4 uses it as a trigger to start downlink FN slide processing. When the downlink frame FN adder 34-4 receives downlink wired out-of-sync notice user frames or a downlink FN slide request, it corrects the downlink frame number correction value by a certain amount (or by the downlink FN slide notified). The downlink FN slide width corrected in one processing is limited to be equal to or less than a predetermined FN slide decrement value, regardless of how much width is detected as a delay. Further, the total FN slide width accumulated between the onset and end of a stretch of communication is limited to be equal to or less than the predetermined maximum width for downlink FN slide.

If the accumulated downlink FN slide width exceeds the maximum allowable downlink FN slide width, DHT controller 34-1 informs of it to MSC processor 32. Being thus informed of an alarm notice, MSC processor 32 gives a response, but MSC does not execute a downlink FN slide processing even if it has received meanwhile a downlink slide request from BS, until MSC processor 32 gives the response. Namely, during this interval, the alarm warning the maximum allowable downlink FN slide width being overridden is ignored.

Parameters necessary for the downlink FN slide processing are listed in an FN slide processing parameter management table stored in MSC processor 32, and arranged in such an order as to allow choosing of a slide width and maximal allowable width appropriate for a given service, because choice of these parameters affects the quality of service during communication. The downlink frame FN adder 34-4, after referring to the information in the table, executes the downlink FN slide processing. For example, when the service is concerned with voice communication, the FN slide width may be determined after due consideration has been given to the delay nullifying capacity and lost frame compensating capacity of VXC 35, while the maximal allowable slide width may be determined after consideration has been given to the effect of delay on voice.

When the service is concerned with data transmission, the effect due to frame loss can be minimized after due consideration has been given to the frame cycle, as long as the delay nullifying capacity of DSC 36 is properly considered and errors over a plurality of frames (for example, eight frames) are properly checked.

When FN slide width in one FN slide processing is determined to be equal to one FN slide width, and a delay in arrival at a receiving stations exceeding that width arises, FN slide processing is executed a number of times. During the period while the succeeding FN slide proceedings are executed, communication is not interrupted owing to the out-of-sync state of frames during the passage through the wired route. If diversity handover is maintained, then communication is possible through another branch in which no out-of-sync state exists in its wired route. One example of FN slide processing parameter management table is shown in FIG. 32.

The outline of steps necessary for downlink FN slide processing will be given with reference to FIG. 36. In FIG. 36 it is assumed that the synchronization phase difference between frames through diversity handover trunk 34 and those through BS2 is 0. BS 4 handles frames which have a synchronization phase difference from those handled by diversity handover trunk 34, and thus the reference clock of BS 4 is by one clock unit (OFS) behind the corresponding reference clock of BS 2. It is further assumed that the maximal fluctuation delay frames may undergo during the passage from diversity handover trunk 34 to BS is 38 msec (being equal to 23 line frame clocks (FN)+13 clock units (OFS)), being the same for BS 2 and BS 4

It is furthermore assumed that the downlink FN slide step width is "1" and the maximal downlink FN slide width is "5". Then, as the maximal fluctuation delay is 38 msec, a frame to be extracted in BS 2 under the condition of FN=6 and OFS=0 (at t2) corresponds with a frame dispatched from diversity handover trunk 34 at FN=2 and OFS=3 (at t1).

However, in the example shown in the figure, the pertinent frame is detected, in stead of time t2, at time t3 which is somewhat behind t2. On the other hand, in BS 4, a corresponding frame is detected at a right timing (FN=5, OFS=15). In the former case, BS 2 sends a downlink wired out-of-sync notice user frame to diversity handover trunk 34. This frame is received by diversity handover trunk 34 at a timing of FN=10 (at t4) (the wired out-of-sync notice user frame may be handled as soon as it is received, instead of its being handled as an ordinary frame according to its FN). Then, a slide processing is executed to determine what radio frame number FN is assigned to a frame coming immediately after t4. Namely, a frame transmitted at FN=10 and OFS=3 (at t5), which would be otherwise given FN=14, is given FN=15. Through these steps, a succeeding train of frames delivered from diversity handover trunk 34 to BS 2 recovers synchronization.

Next, a detailed explanation will be given of uplink frame processing, referring to FIGS. 28 and 30.

2.5. Uplink Frame Processing in Base Station

In FIG. 3, when MS 1 uplink frames transmits, with BSs engaged in diversity handover, the radio transceiver 25 receives the uplink frames and sends them to the a frame receiver 24-5 in its MDE. In an uplink frame extraction controller 24-6 of BS (BS 2 in above example) which acts as a synchronization reference during the onset of communication, radio frames are extracted with the radio frame offset value of reference clock being set to "0". If there are no frames that can be extracted according to above timing, waiting time is prolonged to the next timing (after "1" radio frame clock cycle) and extraction of frames is resumed.

In a subordinate BS, i.e., BS 4, radio frames are extracted at a timing after a radio frame offset value OFS corresponding to the synchronization phase difference (this is measured by an MS and broadcast by MSC) from frames of BS 2 has been adjusted with respect to the timing "0" of reference clock of BS 4. If the radio frame offset value OFS thus obtained after fine adjustment extends over adjacent radio frame clocks, the radio frame number FN to be assigned to it is shifted in association (FIG. 28). Adjustment processing required by these synchronization differences is the same with that seen in uplink frames.

Return to FIG. 3. Radio frames thus extracted are provided to an uplink frame processor 24-7, where encoding treatment for prevention of the entry of errors during transmission over radio zones and modulation for radio transmission are executed, to establish radio frames. In addition, the uplink frame processor 24-7 evaluates the received state of radio frames and scores it as a quality parameter. Then, an uplink frame reliability information assignor 24-8 assigns the score or quality parameter to BS-MSC frames.

These BS-MSC radio frames are provided to an uplink frame FN adder 24-9 where the BS-MSC frames are given radio frame number FNs. The radio frame number FN given here is equal to the FN of reference clock provided by the radio frame synchronizer 21 of BS.

In a subordinate BS, however, when the radio frame number FN is shifted as a result of fine synchronization adjustment for a given series of radio frames, shifted radio frame number FNs are given. BS-MSC frames with radio frame number FNs attached are provided, by way of an uplink frame transmitter 24-10, to MSC interface 23 of BS and further to MSC 3.

2.6. Uplink Frame Processing in MSC 3.

Figure 2:
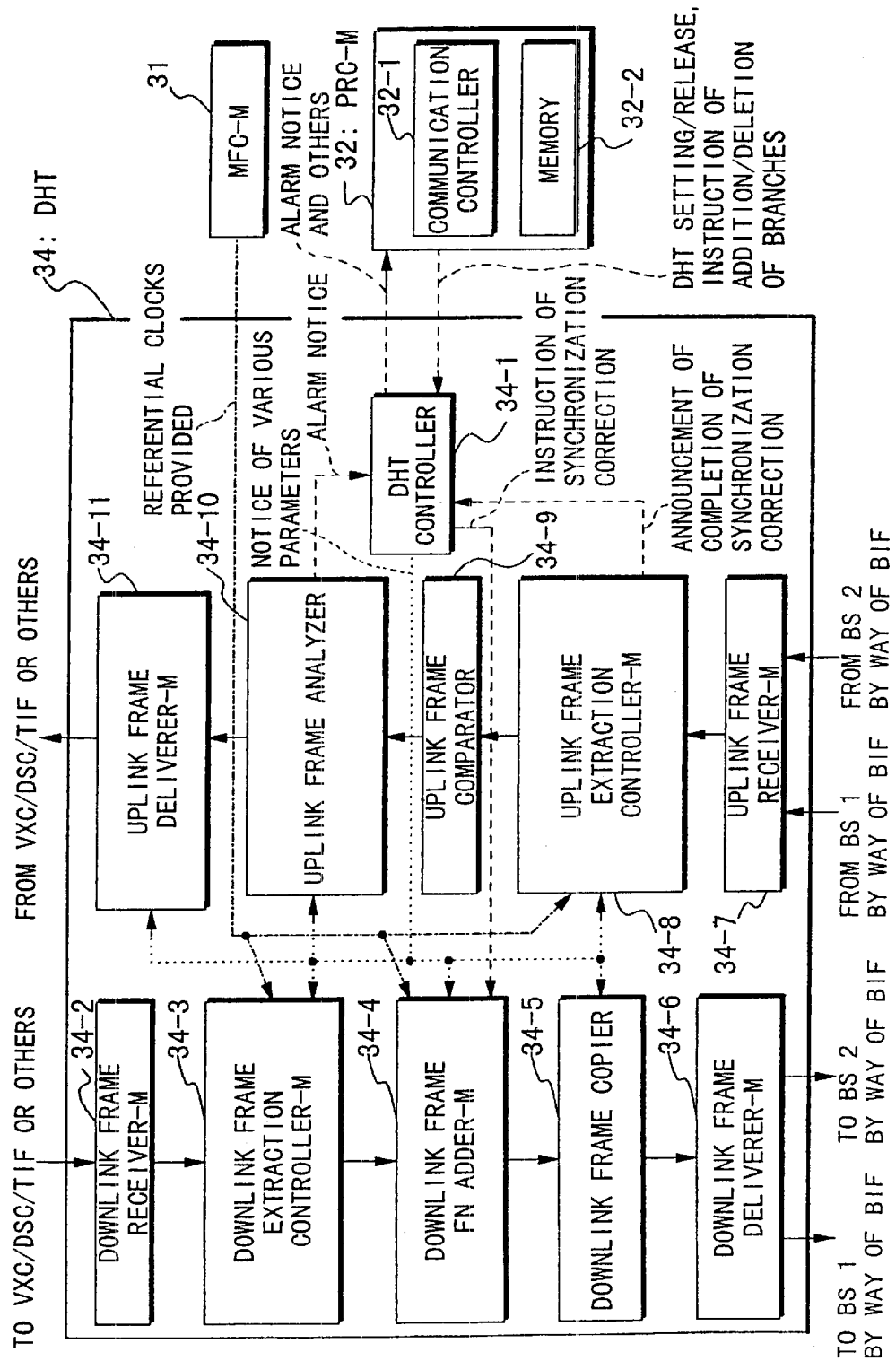
FIG. 2 is a block diagram showing important structural elements of a mobile switching center 3 of the system in FIG. 1.

Next, in FIG. 2, an uplink frame receiver 34-7 of diversity handover trunk 34 receives BS-MSC frames from BSs.

An uplink frame extraction controller 34-8 receives BS-MSC frames from the uplink frame receiver, extracts from them, based on DHO branch information (FIG. 4) provided by DHT controller 34-1, special frames which have the connection identifiers corresponding with active branches, and have radio frame number FNs which are obtained after the reference clock provided by MSC radio frame synchronizer 31 has been corrected according to the uplink frame number correction value, and sends them to an uplink frame comparator 34-9. When the received frame is a downlink wired out-of-sync notice user frame, it is delivered to DTH controller 34-1.

Extraction here is achieved according to the timing determined on the basis of an uplink radio frame offset correction value provided by DHT controller 34-1. This timing adjustment is introduced to allow extraction to take place, making allowance for a fluctuation delay generated during transmission between BS and MSC, and frame shifts possibly introduced in the processing performed by the uplink frame FN adder 24-9.

In above example, the timing of extraction performed by the uplink frame extraction controller 34-8 is equal to the timing if the uplink frame offset correction value is 13. Further, the frame number FN assigned to BS-MSC frames to be extracted are equal to the frame number FN of reference clock provided by MSC radio frame synchronizer 31 minus the downlink frame number correction value three provided by DHT controller 34-1 (FIG. 30).

MSC 3 monitors radio frame number FNs given to BS-MSC frames and stored in the buffer of uplink frame receiver 347. Whenever it detects a continuously recurring delay in the arrival of BS-MSC frames carrying radio frame number FNs to be extracted, it concludes that a frame delay occurs, dispatches a BS-MSC frame sync correction notice to DTH controller, and alters the uplink radio frame number correction value.

Through this process, radio frame number FNs assigned to subsequent frames are properly altered. This processing is called "uplink FN slide processing." The extraction frequency (the number of extracted cells and cell interval when BS-MSC frames are transmitted in ATM mode) of BS-MSC frames is determined according to traffic information provided by DTH controller 34-1.

Then, a detailed explanation will be given to uplink FN slide processing.

This processing is, when frames are detected by the uplink frame receiver 34-7 and uplink frame extraction controller 34-8 that arrive behind the extraction timing, to recover synchronization of those frames so that they may be transmitted from MSC to BS in an synchronization state.

For radio links, power control of signal transmission is performed on the premise that all branches belonging to wired zones contribute to the synthetic gain of diversity handover. Accordingly, even when only one branch among a plurality of branches receives delayed frames, this delay is used as a trigger for uplink FN slide processing. If two or more branches receive delayed frames, uplink FN slide processing is performed in accordance with frames with the largest delay.

Parameters used in uplink FN slide processing include an uplink FN slide width (uplink FN slide unit) which is given each time processing is performed regardless of the amount of detected delay, and the maximal FN slide width (maximal allowable FN slide width) that uplink FN slide units accumulated from the onset of communication to its end can take.

If accumulated uplink FN slide units exceed the maximal allowable uplink FN slide width, DHT controller 34-1 gives an alarm warning the maximal allowable uplink FN slide width being overridden, to MSC processor 32. Being thus informed of an alarm notice, MSC processor 32 gives a response, but MSC does not execute an uplink FN slide processing even if it has detected meanwhile a delay in frame transmission, until MSC processor 32 gives the response. Namely, during this interval, the alarm warning the maximal allowable uplink FN slide width being overridden is ignored.

Parameters necessary for the FN slide processing are listed in an FN slide processing parameter management table stored in MSC processor 32, being classified in terms of services. Thus, the uplink frame extraction controller 34-8 executes uplink FN slide processing after referring to the information there. One example of a table listing parameters necessary for FN slide processing is given in FIG. 32.

Steps required for uplink FN slide processing are outlined in FIGS. 33 and 34. In FIG. 34, thin solid lines indicate the flow of frames with a delay within the maximal allowable limit during the transmission from BS 4 to diversity handover trunk 34, while thick solid lines indicate the flow of frames whose delay exceeds the maximal allowable limit during the passage from BS 2 to diversity handover trunk 34.

The maximal fluctuation delay, synchronization errors of frames from involved BSs, and FN slide-parameters are set as follow. In BS 2 described in downlink FN slide process, the frame having the frame number FN=2 exceeds allowable limit. Therefore, if a normal control is executed, the frame of FN=3 will be extracted at the timing of FN=6 and OFS=13. However, in this case, the frame having the frame number FN=2 will be extracted, because FN is shifted by "1". If diversity handover is maintained, and if overlapped extraction of a frame of FN=2 is to be avoided, extraction of one frame is skipped and renewed extraction may starts from a frame of FN=3. Through this processing, it is possible for subsequent frames from BS 2 to diversity handover trunk 34 to resume synchronization.

Next, an uplink frame comparator 34-9 takes BS-MSC frames collected from BSs engaged in diversity handover, refers to reliability data attached to the radio frames, compares them, and executes the diversity selection. The detail of procedure will be explained with reference to FIG. 19.

FIG. 19 gives a radio frame number FN assigned to a BS-MSC frame in correspondence with a radio frame, and a list of reliability data. The reliability data include radio frame out-of-sync evaluation bit (Sync), CRC evaluation bit (CRC), received SIR value (Con), level degradation evaluation bit (Level), and BER inferiority decision bit (BER). Reserve bit (RES) is used to expand a given function. For example, this may be used to distinguish between a downlink wired out-of-sync notice user frame and an ordinary user frame.

Diversity selection achieved by the uplink frame comparator 34-9 takes place according to the received SIR value and CRC evaluation bit. To be more specific, of multiple BS-MSC frames whose CRC is OK, the one whose received SIR is the highest is chosen. When all candidate BS-MSC frames have CRC judged to be NG, their bit data may be compared, ranked in order of magnitude or submitted to calculation according to a certain evaluation function, and combined.

Figure 21:
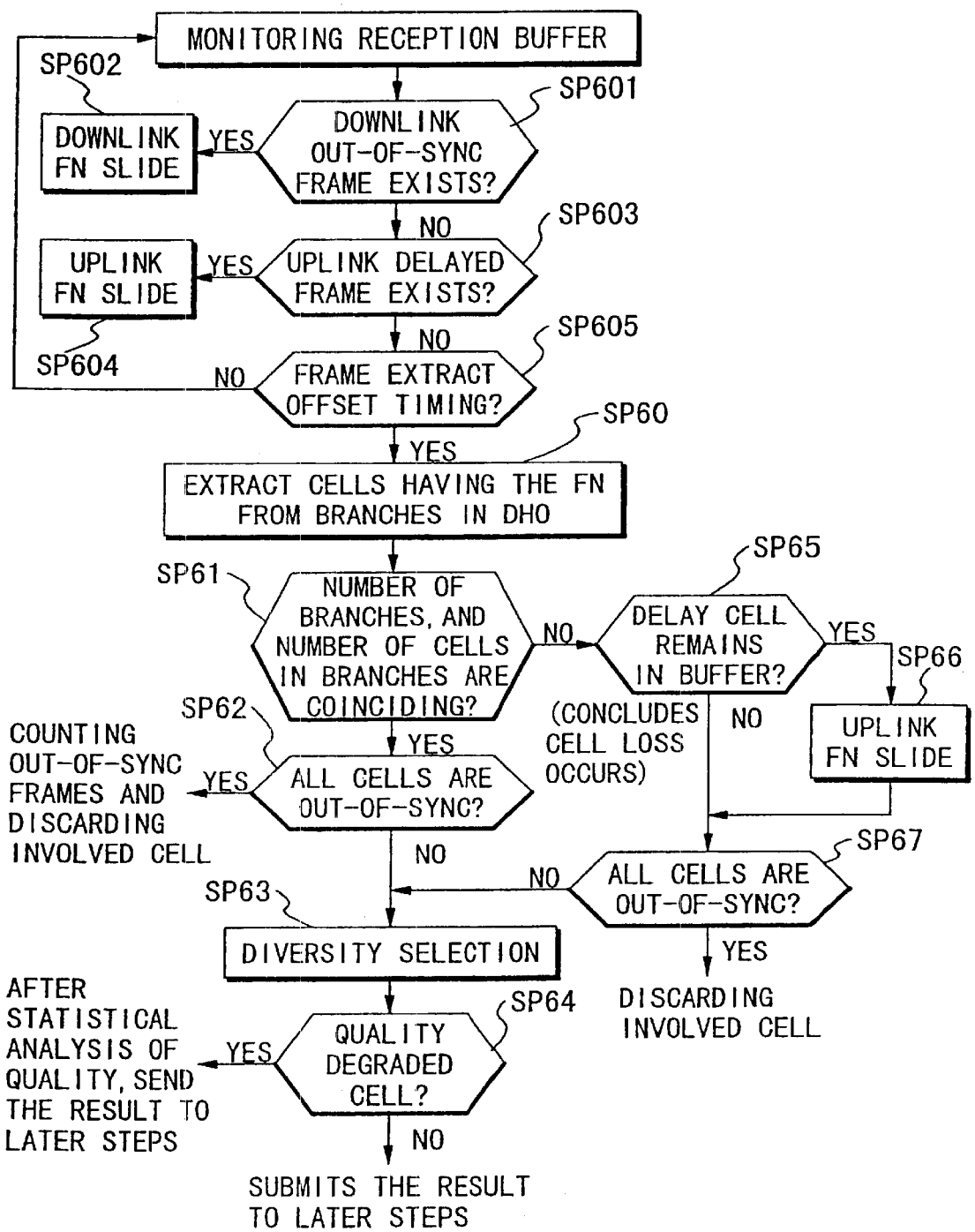
FIG. 21 is a flowchart representing an uplink transmission procedure.

However, when the reliability data of wired frames from all involved branches contain a radio frame out-of-sync evaluation bit, a processing necessary for meeting out-of-sync communication must be introduced. The basic steps necessary for selection process is shown in FIG. 21.

Then, an uplink frame analyzer 34-10 statistically calculates the transmission quality of radio frames after selection of frame by frame, and when it finds that a given frame is so degraded as to meet a standard FER (Frame Error Rate), it dispatches a quality degradation alarm signal to MSC processor 32. Quality degradation evaluation parameters (FIG. 6) are given from diversity handover trunk 34 when a call is generated.

The uplink frame analyzer 34-10 also monitors radio frame out-of-sync evaluation bits, and each time it finds that radio frame out-of-sync occurs N (N is a natural number) times in succession, it sends an alarm signal warning out-of-sync communication to PRC-M. The number of times at which out-of-sync wire frames occur in succession is provided by DHT controller. Here, referring to FIGS. 8–10, explanation will be given of a simple method of quality evaluation based on the use of an up-down counter.

Firstly, the basic working principle will be given with reference to FIG. 8. When N radio frames are received by one MSC from one or more BSs, and those radio frames contain M degraded frames, FER of the frames can be expressed as MIN.

Figure 8:
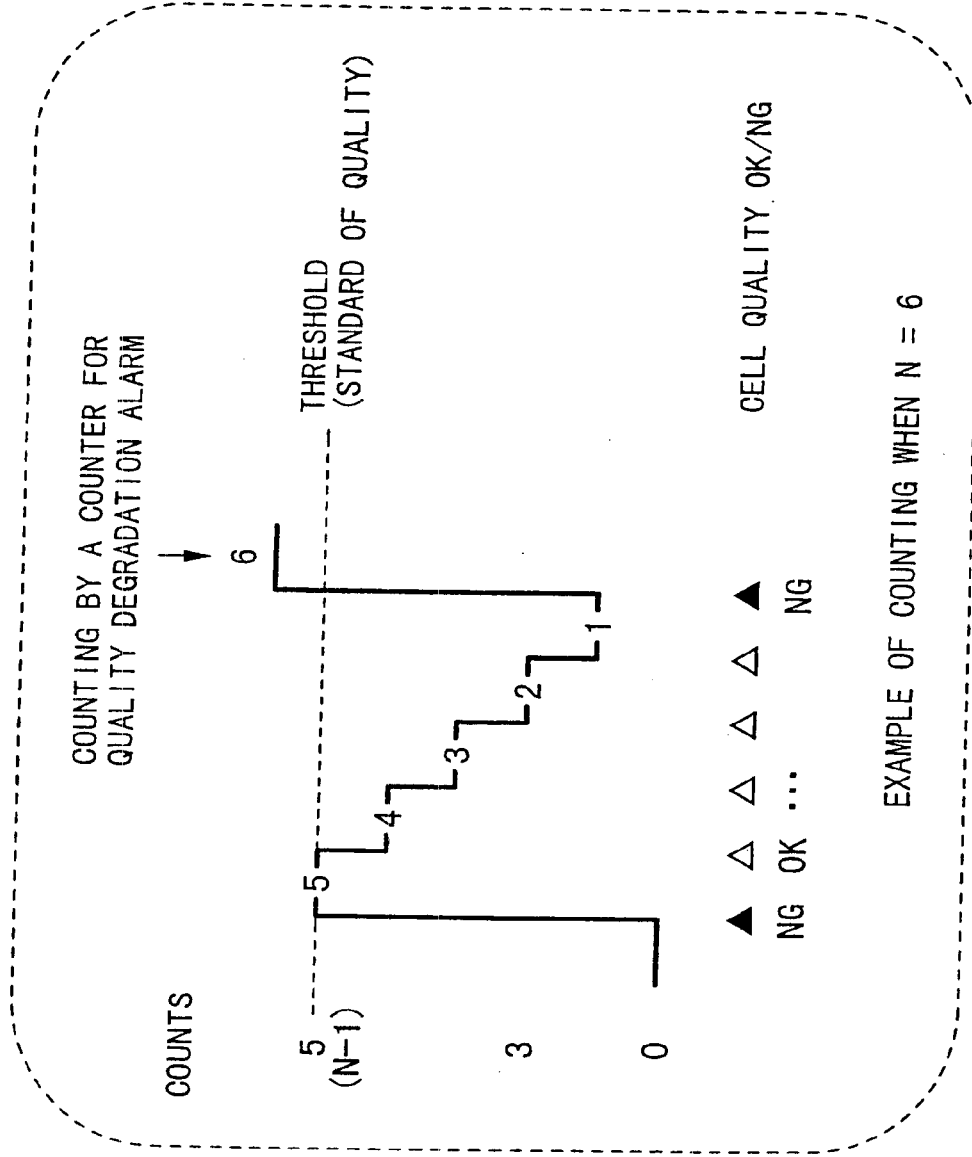
FIG. 8 is a diagram showing the operation necessary for the quality measurement by means of an up-down counter.

In FIG. 8, the FER quality measurement consists of checking, of N radio frames received, whether they contain two or more frames whose CRC is NG, and of, by so doing, ensuring that FEF of the radio frames is not more than $1/N$ (FER$\leq 1/N$). To ensure FER$\leq 1/6$ for N=6, the counter is given five each time it receives a frame whose CRC is NG, while its number is decreased by one each time it encounters with a frame whose CRC is OK.

A monitoring section checks that the number in counter does not exceed five, thereby ensuring FER$\leq 1/6$. When N is alterable, and FER should be within $10^{-4}$, N=1000 is introduced into the counter and monitoring may be performed in the same manner as above. If the quality standard is set to a high level, N will take a very large figure.

For example, when N=100,000 and a frame has a period of 10 ms, the required monitoring time will be about 16 minutes (10 ms×100,000=about 16 minutes). This will disrupt an effective monitoring even if the monitoring time is set far over an average holding time for communication. To meet this inconvenience, the counter is set to N=0 and is instructed to advance by one each time it receives a frame whose CRC is NG.

Figure 9:
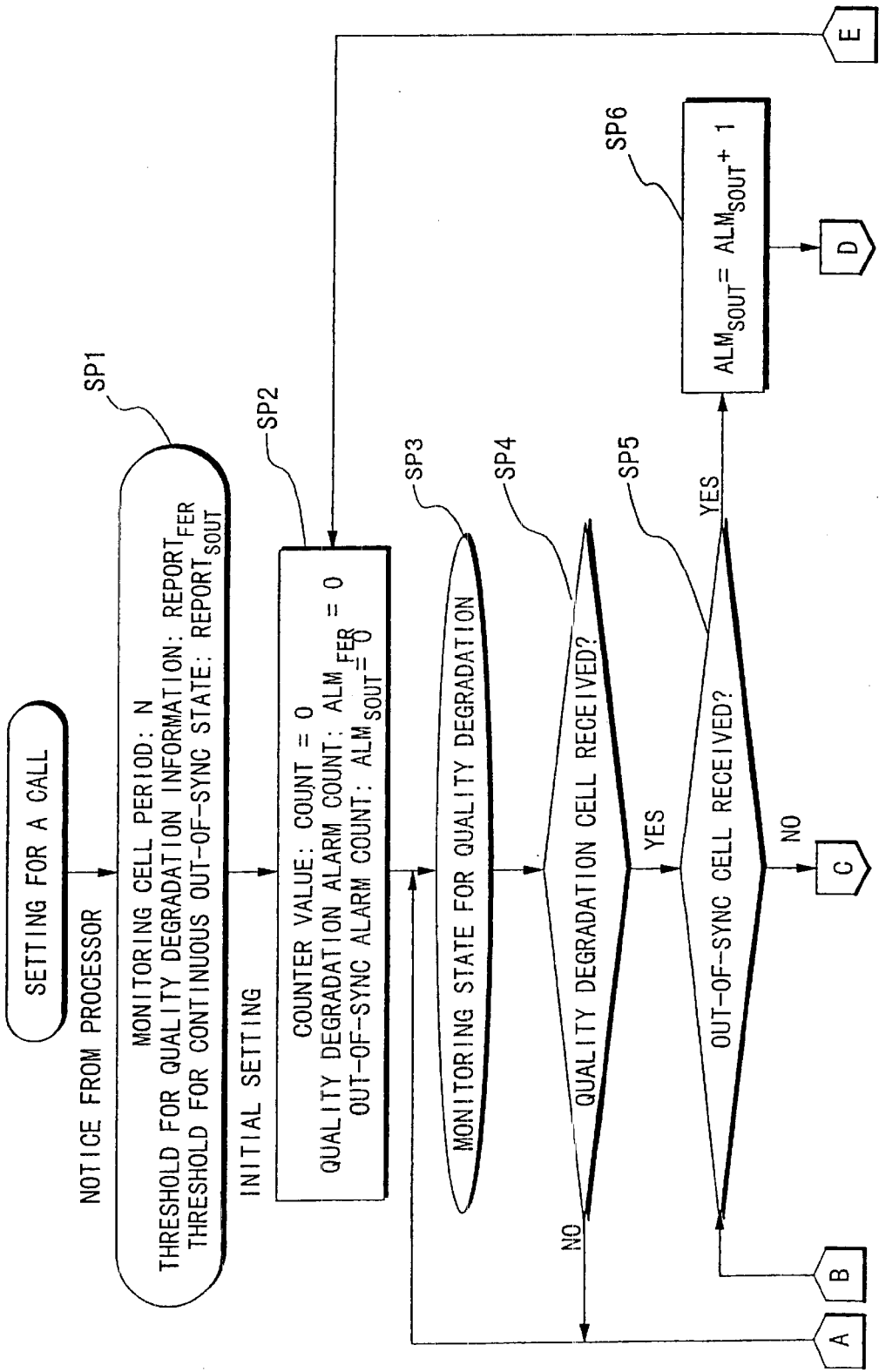
FIGS. 9 and 10 cooperate to form a flowchart representing the quality measurement operation using with the up-down counter.
Figure 10:
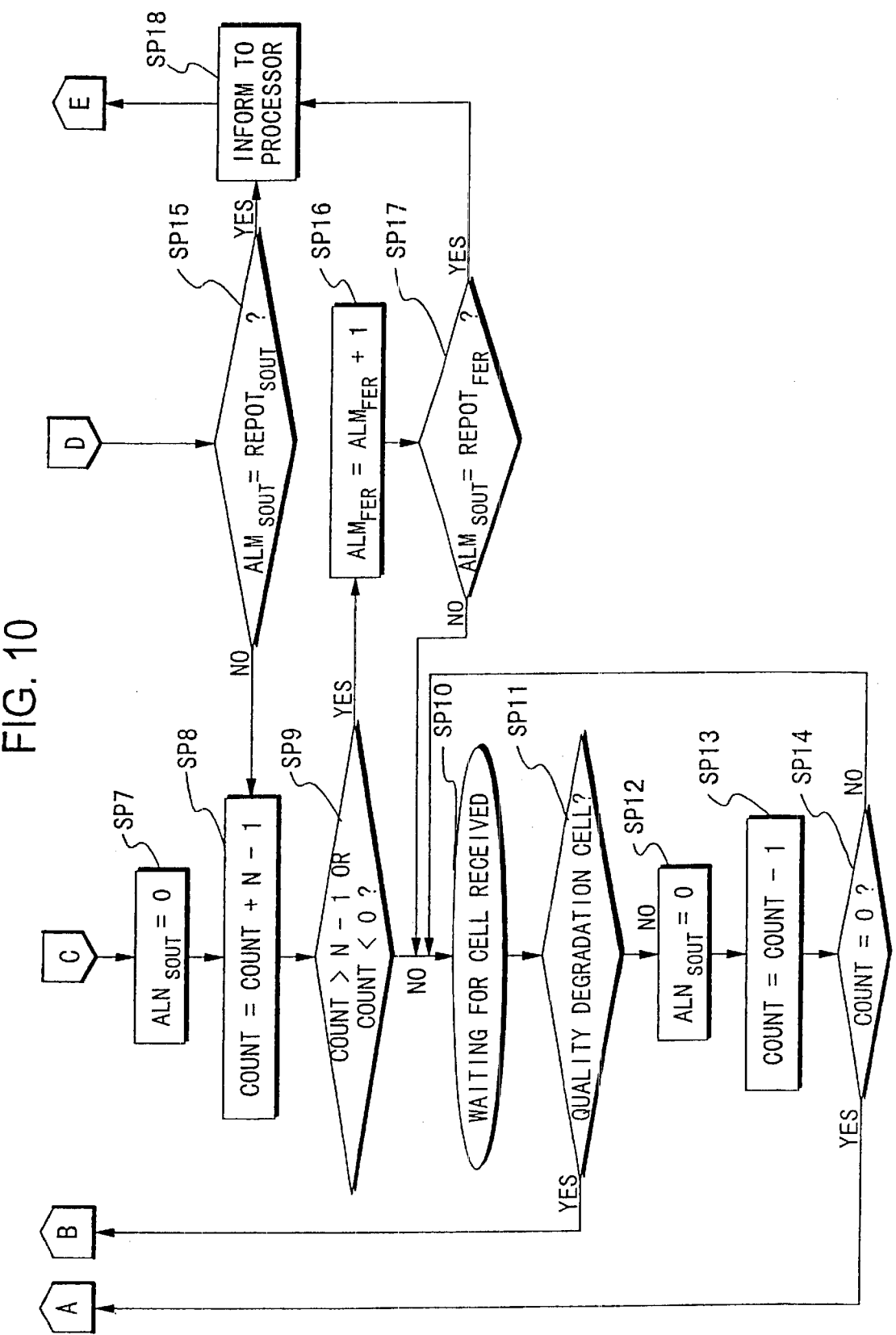

FIGS. 9 and 10 show flowcharts illustrating the steps of counting operation incorporating above consideration. $REPORT_{FER}$ is a threshold at which, when the counter counts the number of degraded frames in excess of a predetermined FER, and finds that the excess number reaches a certain value, it informs of the fact to PRC-M. This may be taken as a scale of protective steps which is required to reduce the announcements to PRC-M when a given signal consists of frequently degraded frames.

$REPORT_{SOUT}$ represents the number of out-of-sync frames occurring in succession. This may be taken as a scale of protective steps because only when the number of successive out-sync-frames after selection exceeds this scale, a notice warning the occurrence of out-of-sync frames is dispatched.

Although FIGS. 8–10 give a quality measurement based on the use of an up-counter, other methods may be used for the measurement and detection of quality and out-of-sync frames. For example, a window slide method can be mentioned where a window with a certain width is introduced and frames passing through the window are evaluated of their quality (in this case parameters necessary for quality evaluation may be implemented in a different manner than above.)

Next, an uplink frame deliverer 34-11 attaches network side connection identifiers to intra-MSC frames, and the intra-MSC frames to a service trunk. The intra-MSC frames are transmitted to service trunks according to services appropriate for the frames (for examples, when the frames carry speech information, they are transmitted to a high efficiency speech coder 35, or when the frames carry data, they are transmitted to a data service control system 36).

The intra-MSC frames, after having been processed in an appropriate service trunk, are transferred as relay frames to a relay network 12 by way of a relay network interface system 37, and routed to a target. However, when communication is made between different MSs, the service trunk may be bypassed as appropriate, in order to improve quality, delete delay, and minimize the consumption of trunk sources.

To add or remove branches engaged in diversity handover, MSC processor 32 informs DHT controller 34-1 of the connection identifiers of branches to be added or removed. Then, DHT controller 34-1 informs internal functional elements involved in the matter of the connection identifiers of branches to be added or removed. Through this action, processing in DHT is updated. The uplink frame analyzer 34-10 resets the previous result of quality evaluation and restarts quality measurement.

Throughout the foregoing explanations regarding downlink frame processing, downlink FN slide processing, uplink frame processing and uplink FN slide processing, the timing of frame transmission or reception at the BS which acts as a sync reference is set to "0" or "15" for the simplicity of explanation, but, needless to say, the timing may be set freely at will without interfering with the frame sync control described above. The operator of a communication system, by setting the timing to "0" or "15", or at random, or deliberately according to a certain order, can distribute load evenly to involved systems, or routes evenly to involved stations, thereby achieving a statistically significant multiple route efficiency.

2.7. Handover Control

Below explanation will be given of handover applied in mobile communication based on the use of diversity handover trunk 34.

Handover is classified from three aspects: (a) control range, (b) frequency, and (c) handover branches, and it will be explained from these aspects.

(a) Classification in Terms of Control Range

Figure 22:
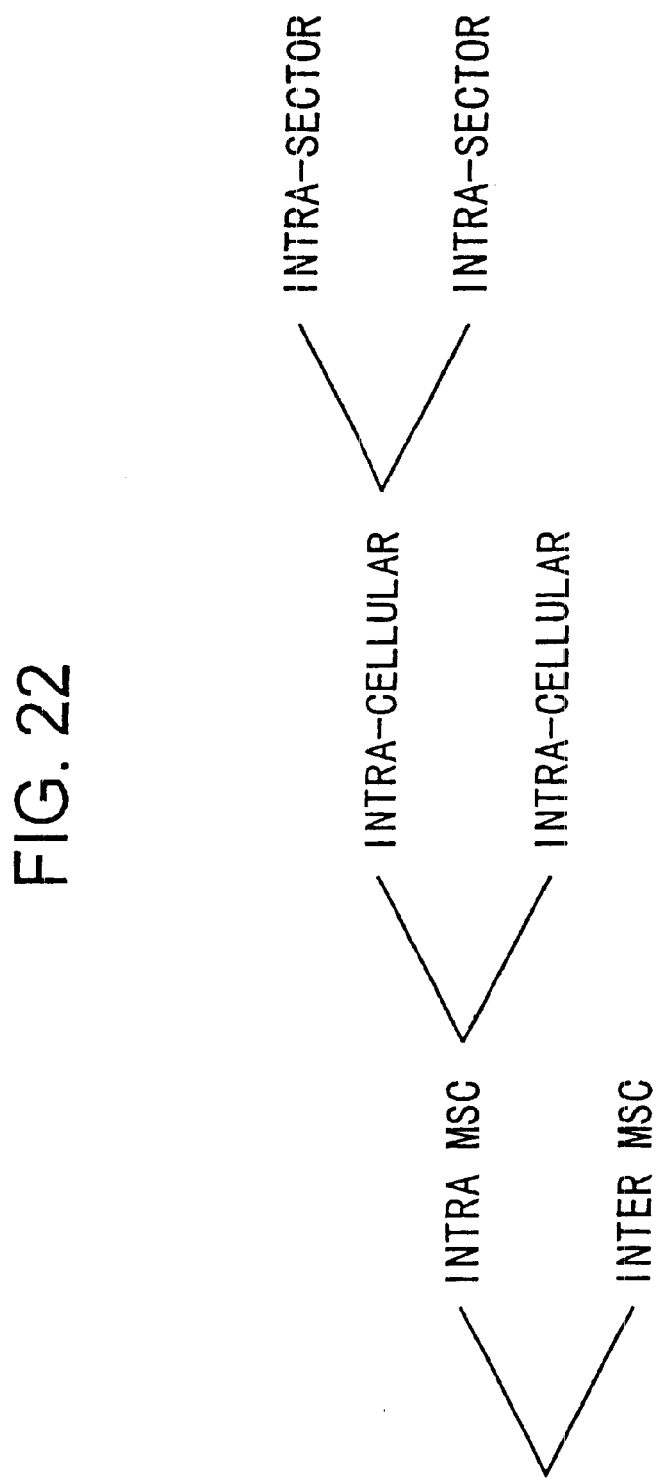
FIG. 22 shows a classification of handover techniques in terms of control range.
Figure 24A:
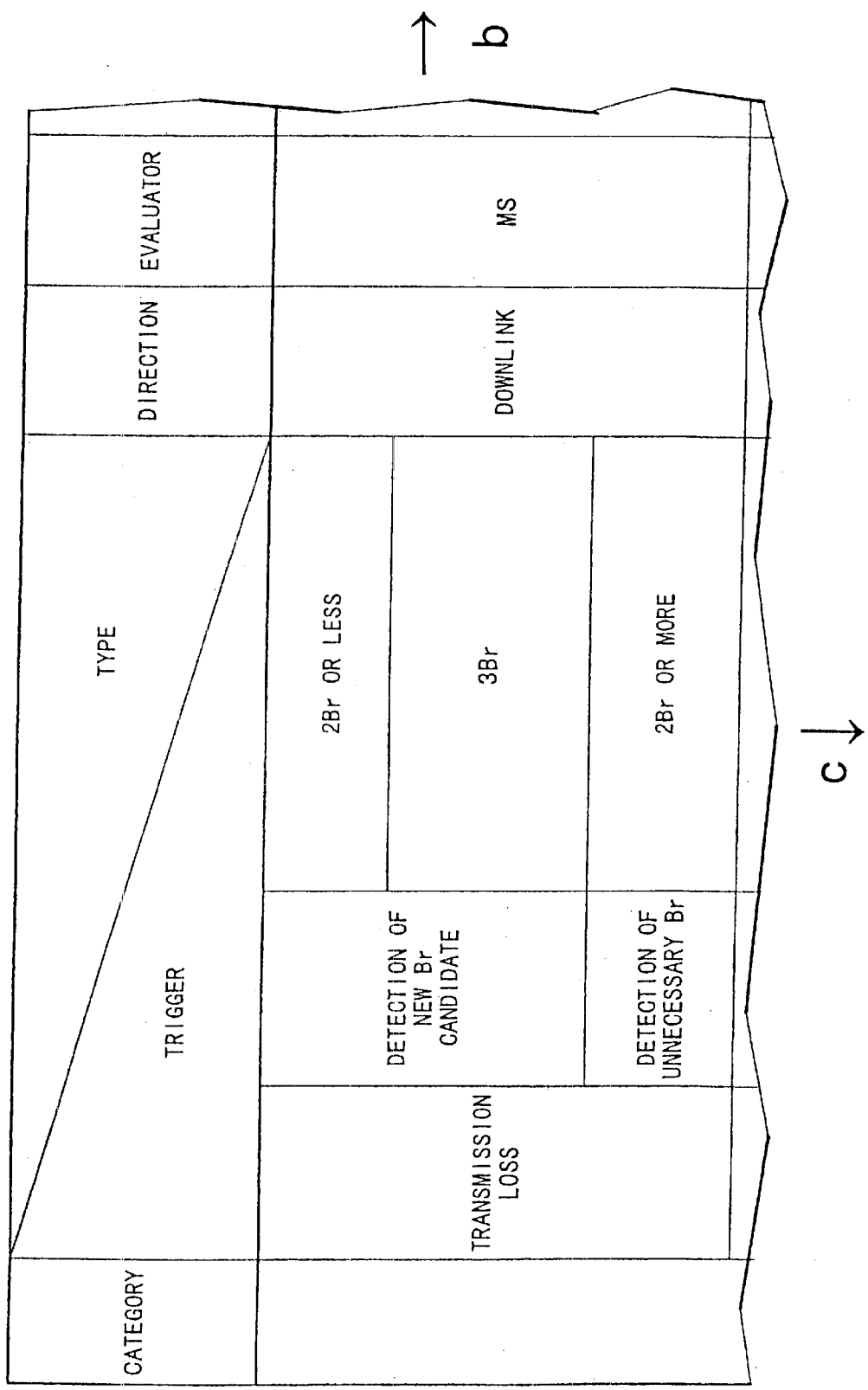
Figure 24B:
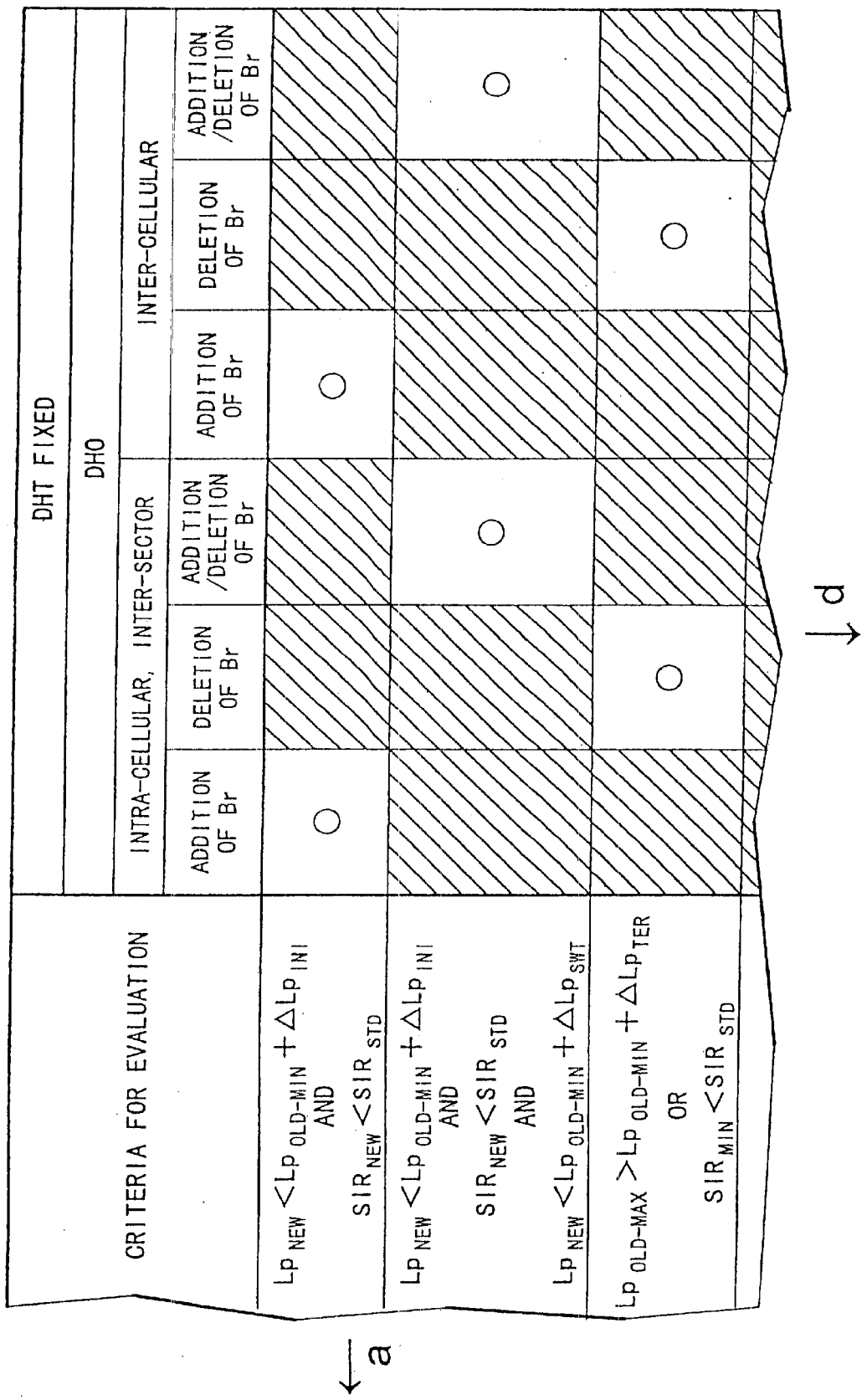
Figure 24C:
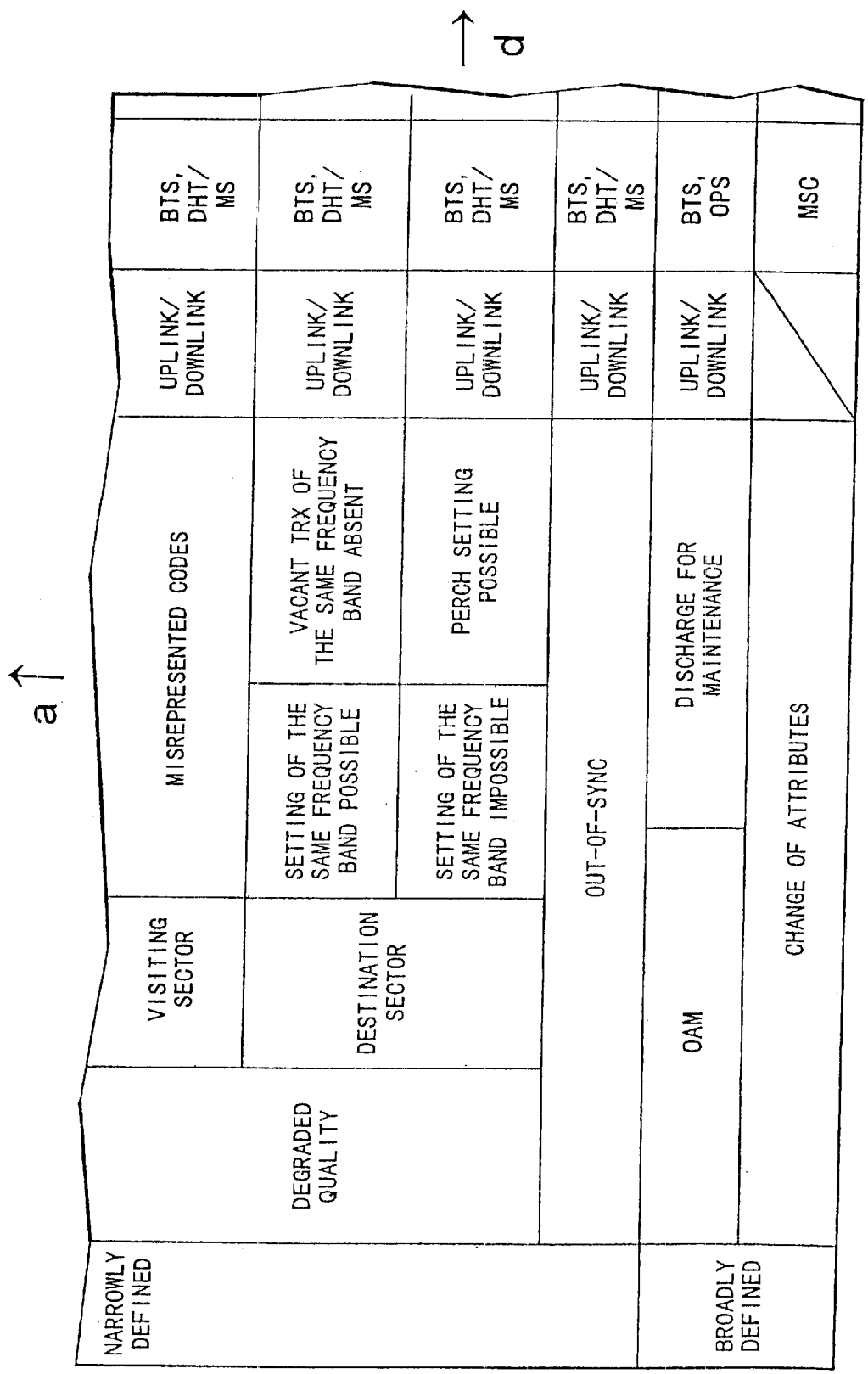
Figure 24D:
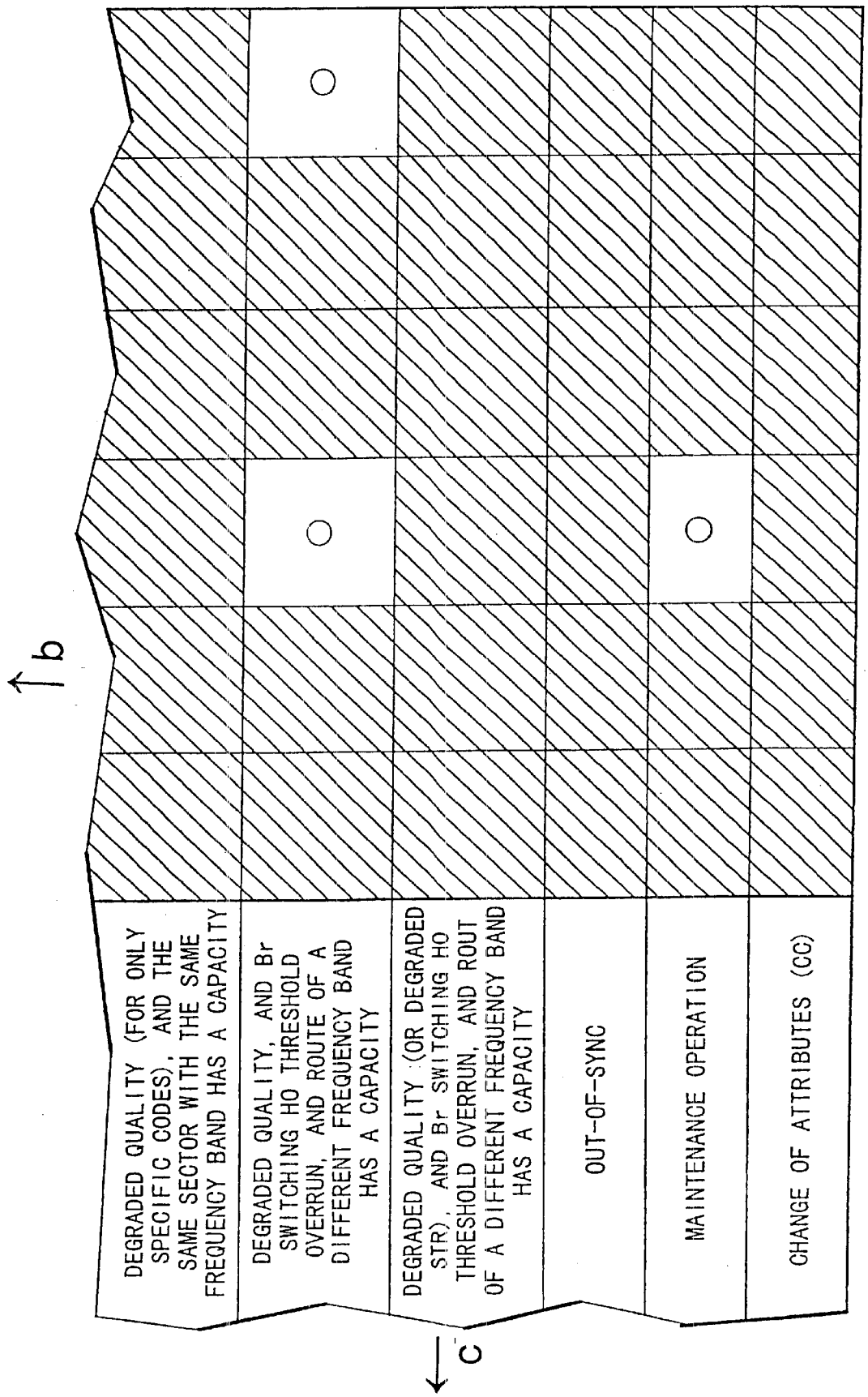
Figure 25A:
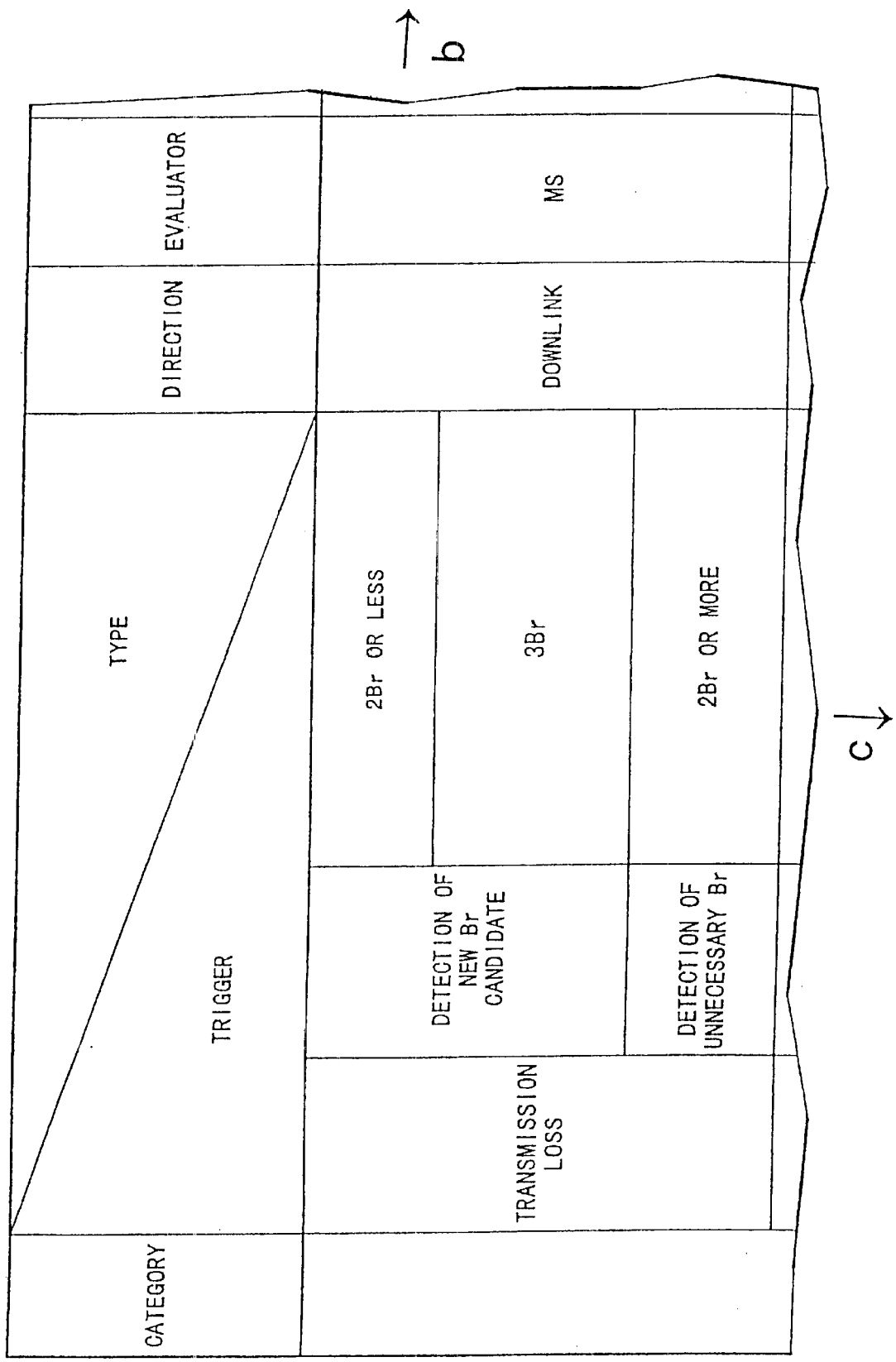
Figure 25B:
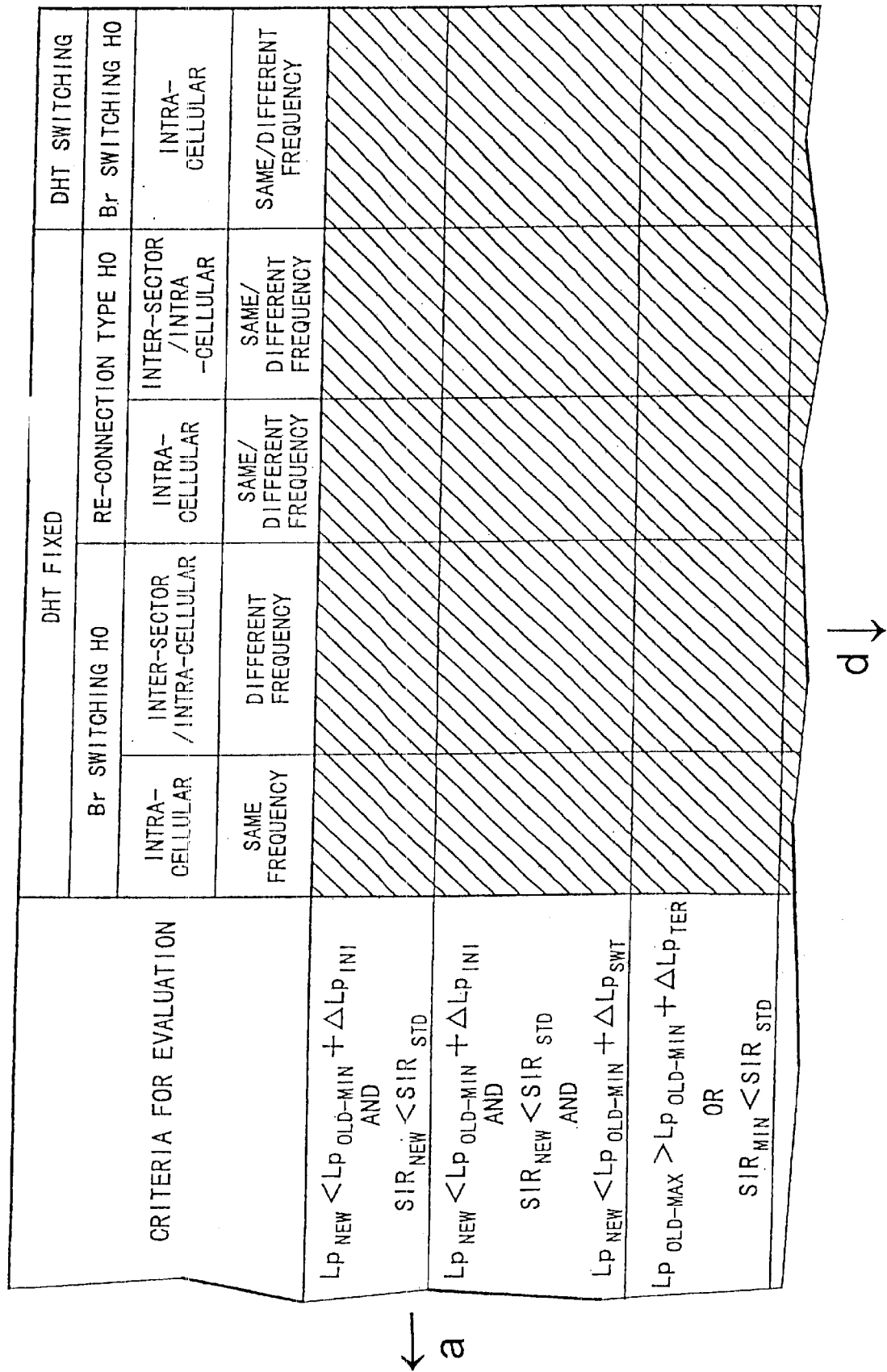
Figure 25C:
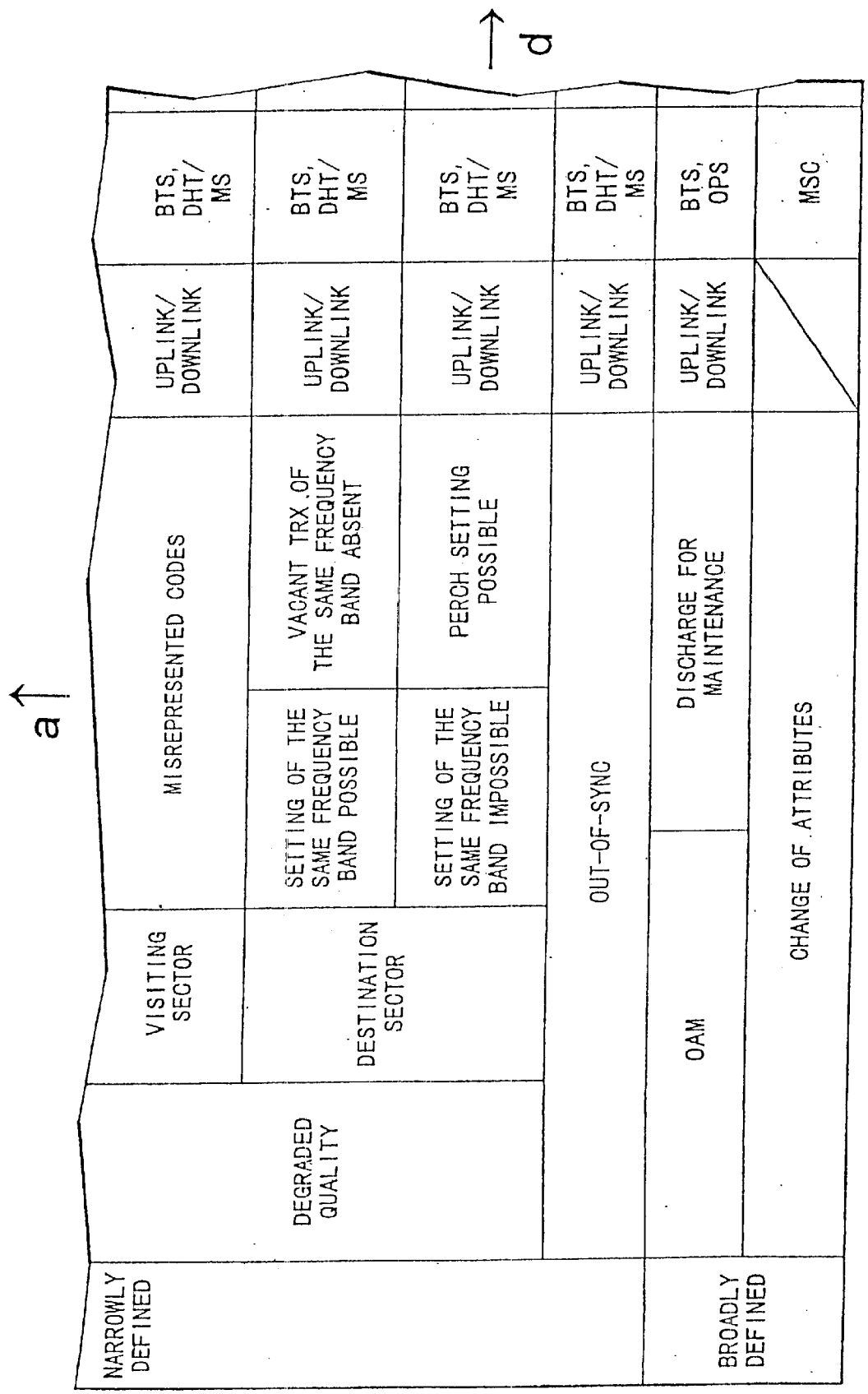
Figure 25D:
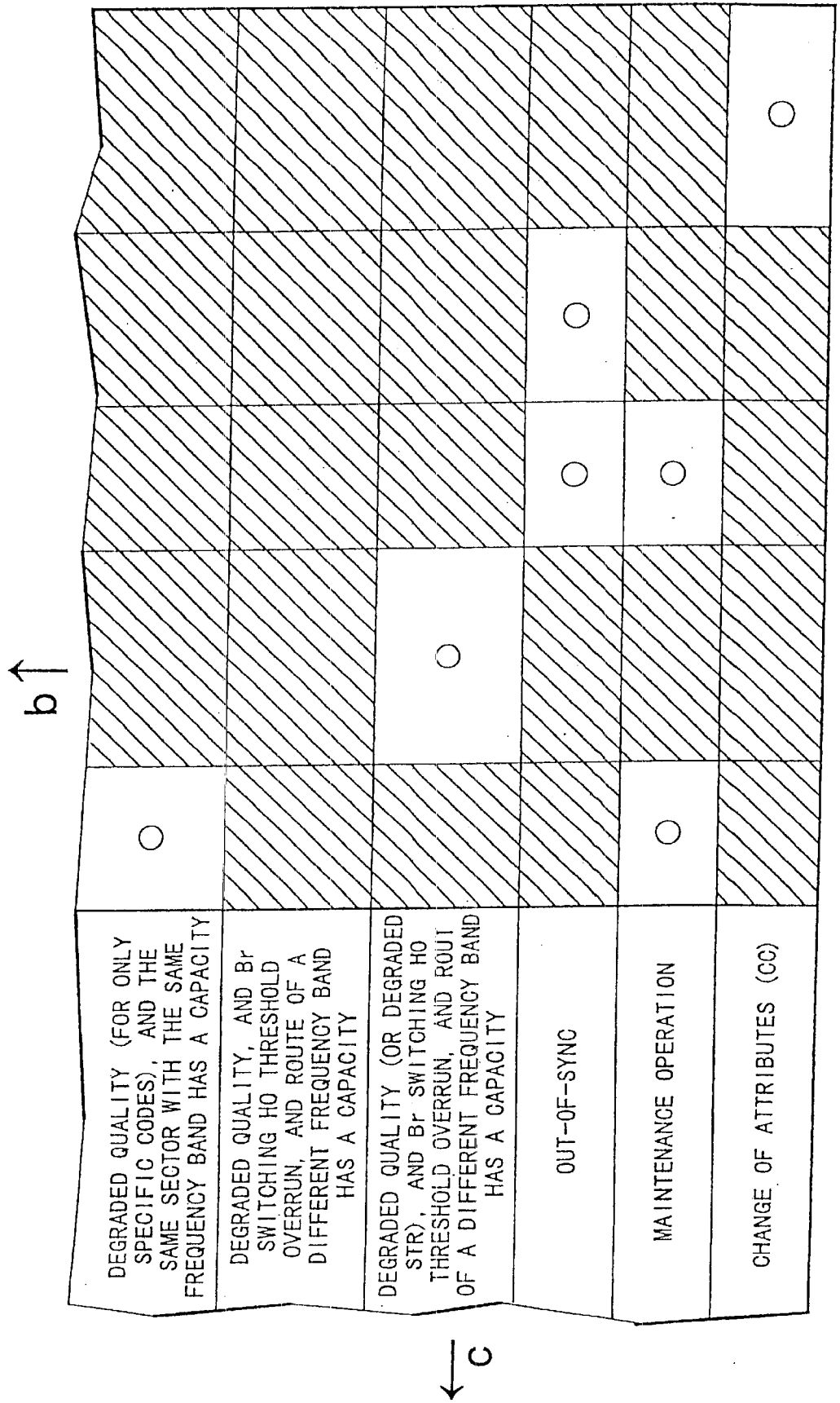

Handover classification in terms of control range is given in FIG. 22.

Referring to FIG. 22, handover is roughly divided into two categories: handover practiced in one MSC, and handover practiced between different MSCs (inter MSC handover).

The former handover or intra MSC handover is further divided into intra-cellular handover which is closed in one BS (or cell) and intercellular handover which covers different BSs (between different cells). The intracellular handover is further divided, when BS of interest has a plurality of sectors, into intra-sector handover and inter-sector handover.

Figure 20:
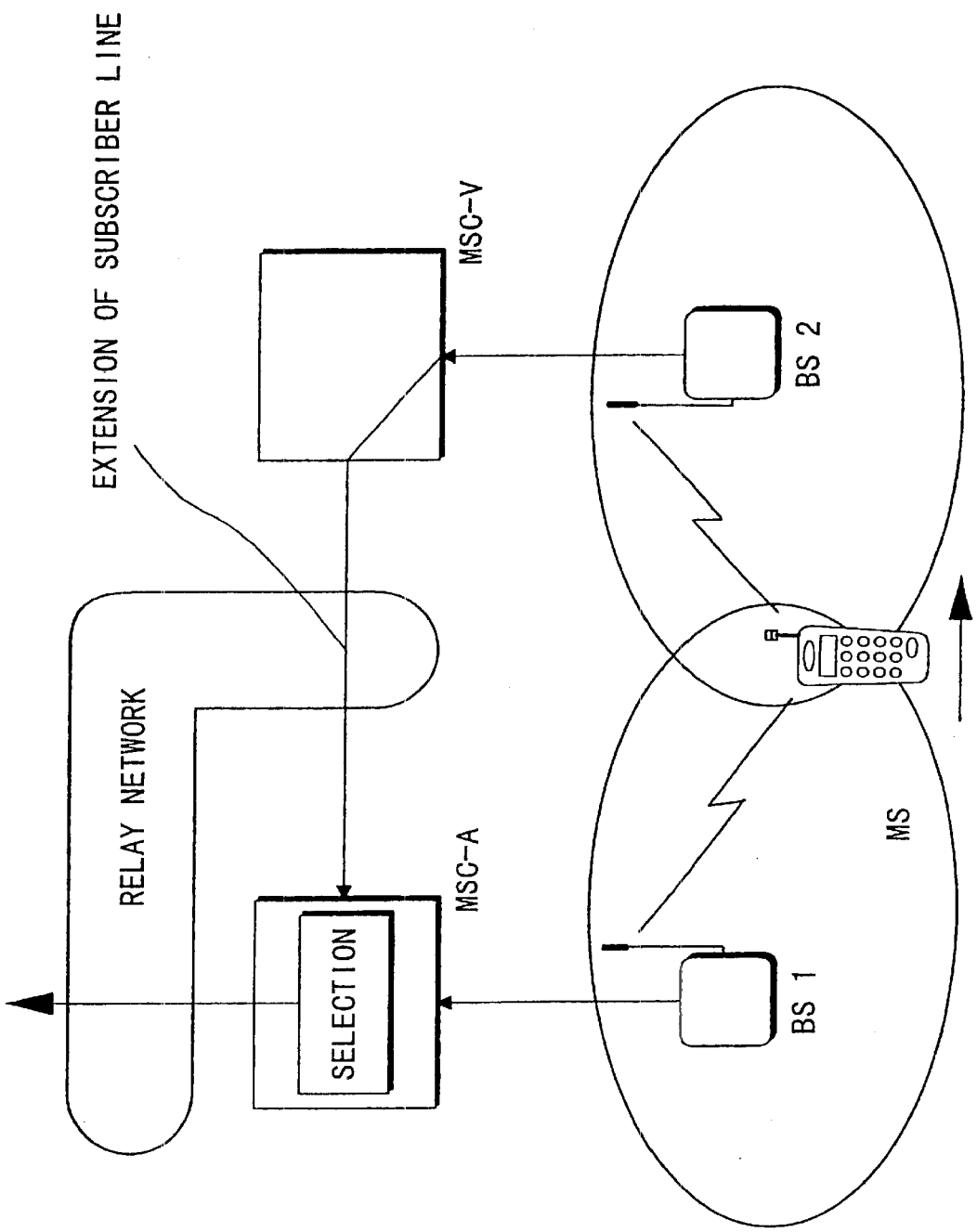
FIG. 20 is a diagram illustrating the operation of inter-MSC diversity handover.

Handover between different MSCs or inter MSC handover is classified to inter sector handover. As seen from the network arrangement in FIG. 20, a peripheral MSC (MSC-V) is connected through an extended subscriber line to an anchor MSC (MSC-A), and diversity selection of frames is executed by MSC-A.

As shown in FIG. 38, when inter MSC handover is practiced, and communication between different MSCs is put into effect, delay in transmission is lengthened, and it becomes highly likely for the delay to exceed the fluctuation delay absorbing capacity of DHT. In this case, DHT executes above-described FN slide processing to recover sync of frames.

(b) Handover Classification in Terms of Frequency

Same frequency handover: handover of frames having the same frequency

Different frequency handover: handover of frames having different frequencies (c) Handover Classification in Terms of Handover Branches Involved Diversity handover (DHO): handover with diversity state maintained (addition, deletion and addition/deletion of branches)

Branch switching handover: handover where all involved handover branches are disconnected, and after a brief pause, a new set of handover branches are entered for a renewed handover.

Figure 23:
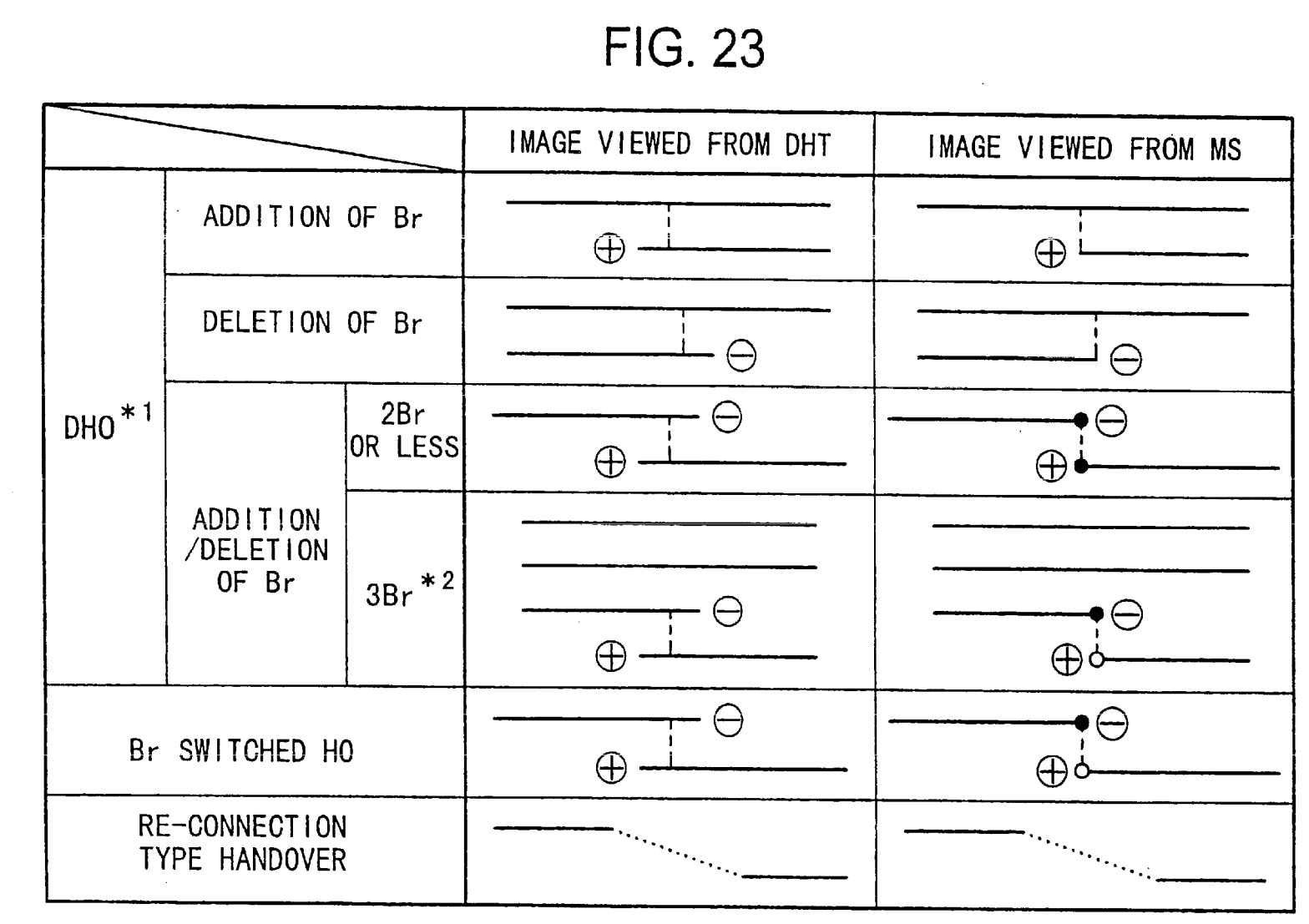

Re-connection type handover: frames from all involved handover branches become out-of-sync, and after a brief interruption of communication, a new set of branches are entered for a renewed sync handover Handover branch state classified by handover branch control is given in FIG. 23.

One can identify a given handover by following, of the categories (a)–(c), which one it takes. (Example: intracellular, inter-sector, different frequency using, and branch switching handover, or intercellular, addition/deletion capable DHO handover, etc.)

The re-connection type handover is a mode by which, when communication between MS and BS suffers out-ofsync, the network side reserves relay lines for a certain length of time, and the mobile station side searches for a BS which may reestablish lost sync. Thus, when the mobile station finds the announcement channel from a new BS (or a BS which it communicated previously) which may recover lost sync within that length of time, that mobile station is connected to the relay line reserved thus long.

Recall handover may be employed for the attainment of the same purpose. In this mode, the mobile station dispatches a recall including information regarding previous communication state to a BS which can recover promptly the previous communication state based on this information.

FIGS. 24 and 25 are tables comparing handover triggers evoked in mobile communication, and handover types.

Three kinds of trigger assigned to big categories of narrow classification in the left column of FIGS. 24 and 25 will be explained below with respect to this example.

(1) DHO Trigger Due to Transmission Loss Measurement

Transmission loss is measured by MS for downlink frames. MS computes transmission loss by comparing the output power of its own sector and of adjacent sectors which is provided through perch channels of sectors engaged in communication, and the input power of signals received by Ms. Then it arranges sectors in the ascending of transmission loss, converts the information into a cell condition report/ handover trigger, and sends it to MSC. (It adjusts announcement timing according to the timing difference of sectors.)

As described earlier, DHO is a handover where site diversity is maintained with base handover lines being kept closed and peripheral handover lines with the same frequency bands being newly set while MS moves over radio communication zones. It is possible to increase the capacity of radio communication between adjacent sectors, by distributing extra energy gained by improved quality of communication due to site diversity to transmission.

Addition/deletion of DHO branches may be determined according to the threshold which is set for the difference between the transmission loss of branches engaged in communication, and the corresponding value of branches to be added/removed. (The threshold includes a threshold for DHO addition (DHO_ADD), DHO deletion (DHO_DEL), and branch switching handover (BHO_INI).)

Accordingly, diversity handover area is determined according to the transmission loss between MS and BS as shown in FIG. 31.

If an MSC has an uplink frame interference level exceeding an allowable limit, it can safely executes handover, because then the power necessary for transmitting uplink frames remains unchanged. However, if a downlink frame interference level exceeds an allowable limit (maximal transmission power permitted to BS), MSC can not execute handover.

In such case, MS does not execute handover, proceeds to an area where handover candidates reside, and causes degradation in communication of other BSs existing in the same area. To avoid frequent occurrence of such situation, it is necessary to limit the acceptance of calls to a certain level so that the capacity for handover calls may be kept sufficient. Later, MS passes through a diversity handover area, and moves outside the zone where communication is in progress. When communication quality is so degraded that it exceeds a threshold for BHO_INI, MS will execute BHO as will be described later.

(2) Branch Switching Handover Trigger

Branch switching handover is a handover where, when communication degradation intervenes, or MS passes a DHO area without resorting to DHO, and its communication quality is so degraded as to exceed a threshold for BHO_INI, base handover lines are opened while peripheral handover lines are newly set. In the foregoing explanation of the triggering of base handover lines with reference to FIGS. 24 and 25, both the outbreak of quality degradation and quality degradation sufficiently large to exceed a threshold for BHO_INI are said to be necessary for the execution of handover, but either one of the two requirements may occur for the execution of handover.

Quality degradation measurement is executed by diversity handover trunk 34 for uplink frames while it is done by MS for downlink frames. Below quality degradation measurement performed by diversity handover trunk 34 will be described.

Diversity handover trunk 34 statistically calculates the incidence of NGs by checking CRC of user frames after diversity selection, and when it finds that the measured FEF exceeds a threshold FER, it sends an alarm signal telling quality degradation to MSC processor 32, which starts handover using the signal as a trigger.

To cite an example, branch switching handover is introduced when lines allocated for the same frequency band are in short of capacity, and lines allocated for a different frequency band has a sufficient capacity for acceptance (acceptable in terms of capacity and available resources), and otherwise squelch interruption of speech, or line opening is executed. Limits of branch switching handover are determined as shown in FIG. 31.

To cite another example, when MS in a diversity area finds no vacant communication channels (TRX) in BSs in its moving direction, MS does not execute diversity handover. When it finds a blank communication channel newly opened, it promptly starts diversity handover, but the frames it handles exceed a limit of branch switching handover, it executes branch switching handover.

When MS finds that BSs in its moving direction has no communication channels having the same frequency with that of the frames MS handles, it does not request diversity handover, but the frames it handles exceed a limit of branch switching handover, it executes branch switching handover.

Further, when MS remains in a certain zone and finds the capacity of transmission lines of all BSs involved in that zone fully saturated (transmission power for downlink frames is maximal or the transmission power for uplink frames exceeds an allowable limit), it can execute branch switching handover even if the frames it handles does not exceed a limit of branch switching handover.

(3) Re-Connection Type Handover Trigger or Disconnection Due to Detection of Out-of-Sync Communication When a station continues to make a communication with quality being degraded, and degradation proceeds so much for a certain length of time (detection of out-of-sync state), disconnection of communication ensues. When the user of station insists continuing the communication, re-connection type handover is set in. Re-connection type handover is a control consisting of switching radio links, while holding the same call.

Detection of out-of-sync communication is performed by diversity handover trunk 34 for uplink frames while the same is done by MS 1 for downlink frames. Below, how out-of-sync uplink frames are detected by diversity handover trunk 34 will be described.

Each involved BS, whenever it detects out-of-sync radio frames in its radio route, informs MSC 3 of the out-of-sync state as soon as the out-of-sync state surpasses protective steps. This information is given in the form of radio frame out-of-sync evaluation bit contained in the reliability data of user frames.

Diversity handover trunk 34 monitors radio frame out-of-sync evaluation bits, and each time it finds that the occurrence of radio frame out-of-syncs exceeds REPORT$_{SOUT}$, it sends an alarm signal warning the occurrence of out-of-sync communication to MSC processor 32. MSC processor 32 starts re-connection type handover using the alarm as a trigger, or disconnects the call.

For appropriate handover to be set in various situations as described above, BS and MS have following functions.

BS constantly monitors the interference level of uplink frames and the total power consumed for transmission, and inserts, into broadcast informations, their values together with their comparisons with corresponding thresholds. BS sets thresholds separately for handover and receipt/transmission of signals, because it respects handover more than originating and terminating of calls. The thresholds for originating and terminating of calls are preferably set to a sterner levels than that given to handover.

MS is provided with a function to monitor incoming broadcast information during waiting or communicating, and can determine by itself whether it is possible to currently execute originating and terminating of calls or handover. MS receives a signal from an adjacent perch channel having the same frequency band with that used for the communication in progress. Then, regarding a interference level to uplink, it computes transmission loss on the basis of the transmission power through the perch channel which is derived from the broadcast information, and of receiving field level of the perch channel. Then, MS communicates with a BS which gives the least transmission loss. Furthermore, MS compares transmission losses with interference levels to uplink frames in communications with adjacent BSs, and determines a zone to which it moves.

Figure 11:
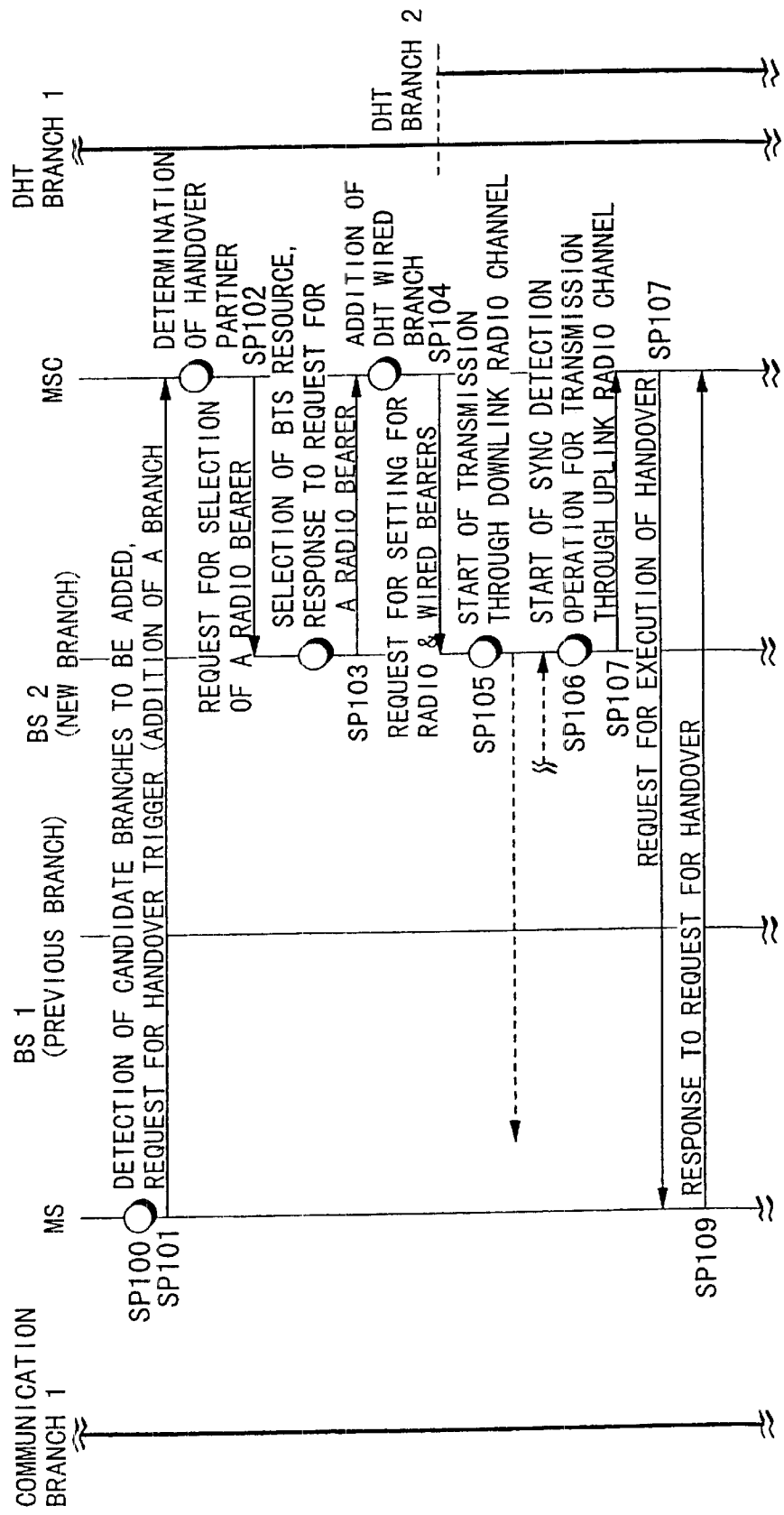
FIGS. 11 and 12 cooperate to form a sequence diagram representing a diversity handover procedure.
Figure 12:
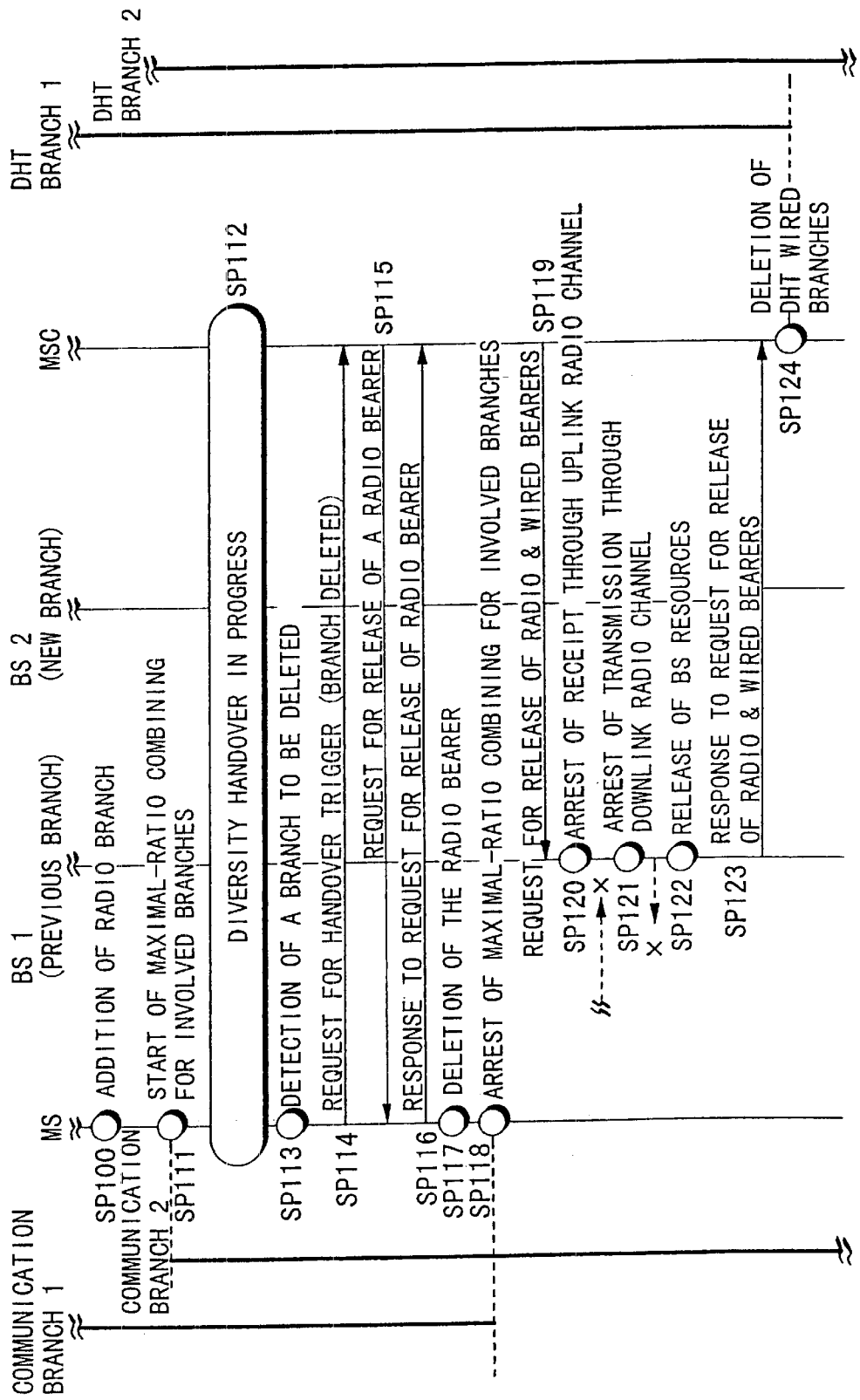
Figure 13:
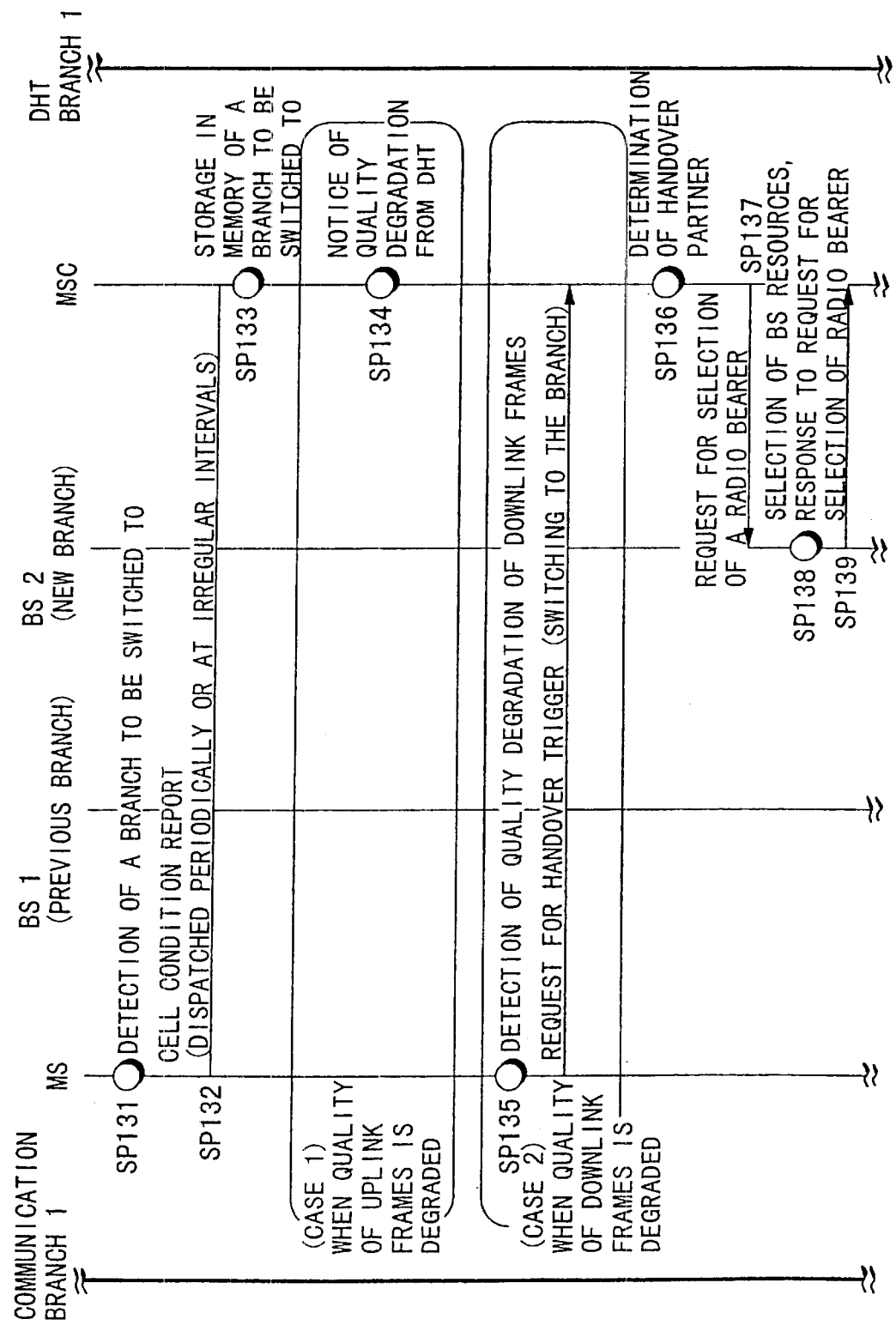
FIGS. 13 and 14 cooperate to form a sequence diagram representing a branch switching handover procedure.
Figure 14:
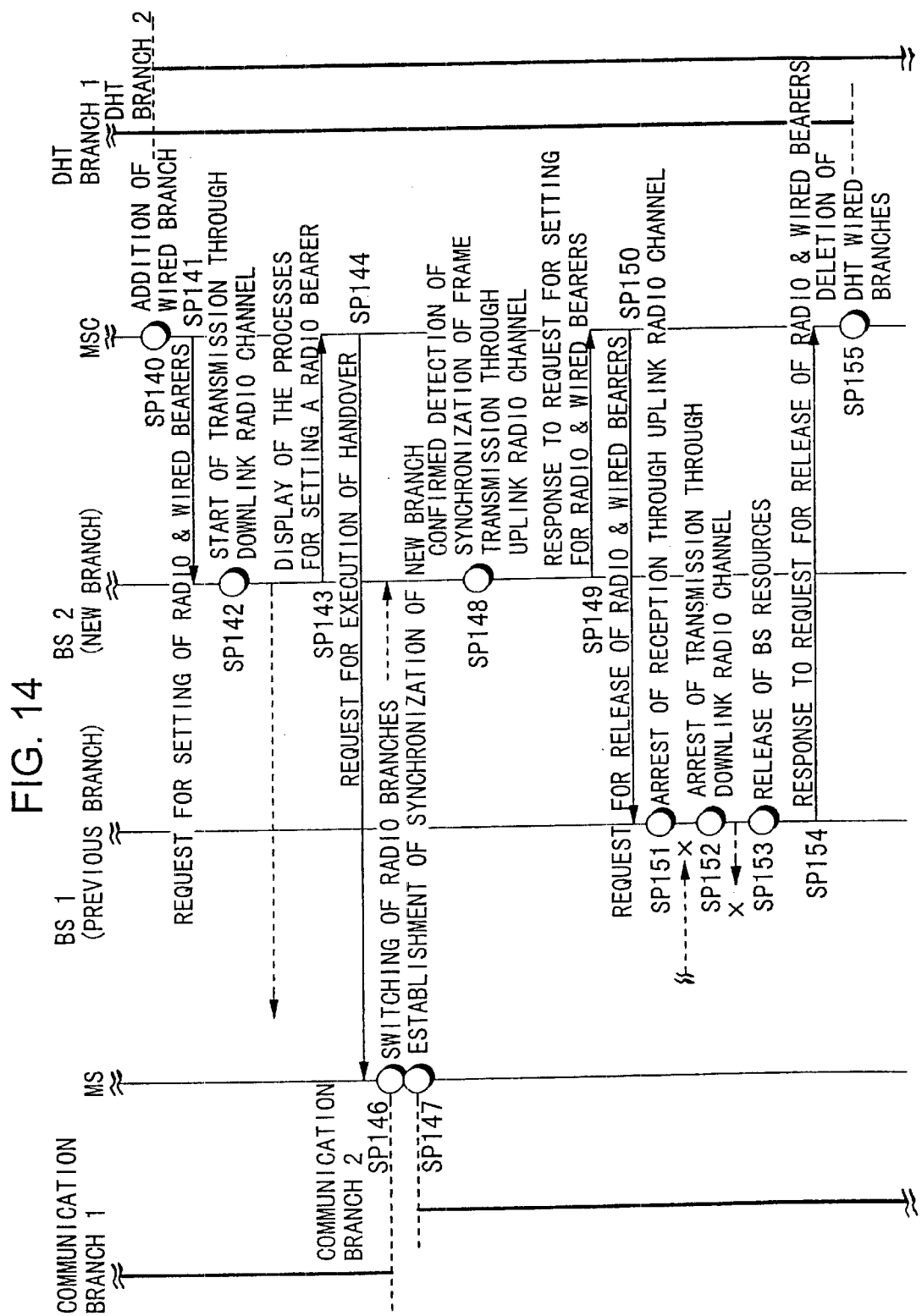

The sequence of steps necessary for diversity handover control processing is shown in FIGS. 11 and 12, and the sequence of steps necessary for branch switching handover control processing is shown in FIGS. 13 and 14. Firstly, the sequence of steps necessary for diversity handover control processing will be described. This is to ensure execution of handover such that communication remains uninterrupted even when MS moves from a zone governed by BS 2 (BS 1) to a zone governed by BS 4 (BS 2).

Addition of Branches
(1) When MS detects a branch (or branches) with a low transmission loss, it measures the sync phase difference between radio frames received by the reference branch or MS in communication, and radio frames received by the branch to be added, and dispatches a request for addition of a branch to MSC 3.
(2) MSC 3 determines an appropriate one out of candidate branches, asks BS 4 (BS 2) which governs the branch to be added whether the branch has a sufficient resource such as radio routes and others, and receives an affirmative answer. This step may be conglomerated with the step (4).
(3) MSC processor 32 informs diversity handover trunk 34 of a request for addition of a branch, and sets diversity handover trunk to be responsive to the request.
(4) MSC 3 instructs BS 4 (BS 2) to set properly wired links between MSC 3 and BS 4, and radio links.
(5) BS 4 sets properly wired links, starts to transmission through the downlink and to receives uplink frames, and returns a response to MSC 3. At this stage, however, frames handled by BS 4 do not always have a sync relation with frames handled by MS (this is particularly true when the control of power for transmission uplink frames by MS is directed to a BS other than BS 4).
(6) MSC 3 instructs MS to add a new branch.
(7) MS returns, to MSC 3, response to the instruction for addition of a new branch.
(8) MS adds the branch in question on a maximal-ratio combining basis, and enters diversity handover. The steps (7) and (8) may be exchanged in order.

Deletion of Branch
(9) When MS detects a branch (or branches) which does not contribute to the maximal-ratio combining, it sends a request for deletion of the branch to MSC 3.
(10) MSC 3 instructs MS to delete the branch.
(11) MS execute deletion of the branch.
(12) MSC 3 instructs BS 2 (BS 1) to delete previous radio and wired routes.
(13) BS 2 opens radio and wired routes, and informs of it to MSC.
(14) MSC 3 informs of the order of branch deletion to diversity handover trunk 34.

Next, explanation will be given of the sequence of steps necessary for branch switching handover (FIGS. 13 and 14).

This is to ensure execution of handover with an interruption, when MS moves from an area governed by BS 2 to another area governed by BS 4, and during the movement it does not resort to handover for some reason and thus suffers degradation in communication, or degraded communication exceeds a BHO threshold.
(1) When BS detects a branch with a low transmission loss, or a branch (or branches) to which communication may be switched, it measures the sync phase difference of loss of that branch from the corresponding one of a referential branch, and informs of the result as a report of cell condition to MSC 3 periodically or at intervals whenever the state changes. MSC 3 memorizes the report.
(2) When BS or diversity handover trunk 34 detects degraded communication, handover destination branch is determined according to the cell conditions of MS stored in the memory of MSC 3.
(3) MSC 3 asks BS 4 which governs the branch to be switched to whether the branch has a sufficient resource such as radio links and others, and receives an affirmative answer. This step may be conglomerated with the step (5).
(4) MSC processor 32 informs diversity handover trunk 34 of a request for addition of a branch, and sets diversity handover trunk 34 to be responsive to the request.
(5) MSC 3 instructs BS 4 to set properly wired links between MSC 3 and BS 4, and radio links.
(6) BS 4 sets properly wired links, starts to deliver uplink frames through a radio link, and returns a response to MSC 3.
(7) MSC 3 instructs MS to execute switching of branches.
(8) MS disconnects communication with a previous branch and starts to communicate with a new branch.
(9) BS 4 checks that communication is established between MS and the new branch, and informs MSC 3 that a synchronization state has been established in the communication between MS and the new branch.
(10) When MSC 3 receives the report from BS 4 that a sync state has been established in the new communication, it instructs BS 2 to release previous radio and wired links.
(11) BS 2 releases the previous radio and wired roots in question, and informs of it to MSC 3.
(13) MSC 3 informs of the order of branch deletion to diversity handover trunk 34.

Figure 16:
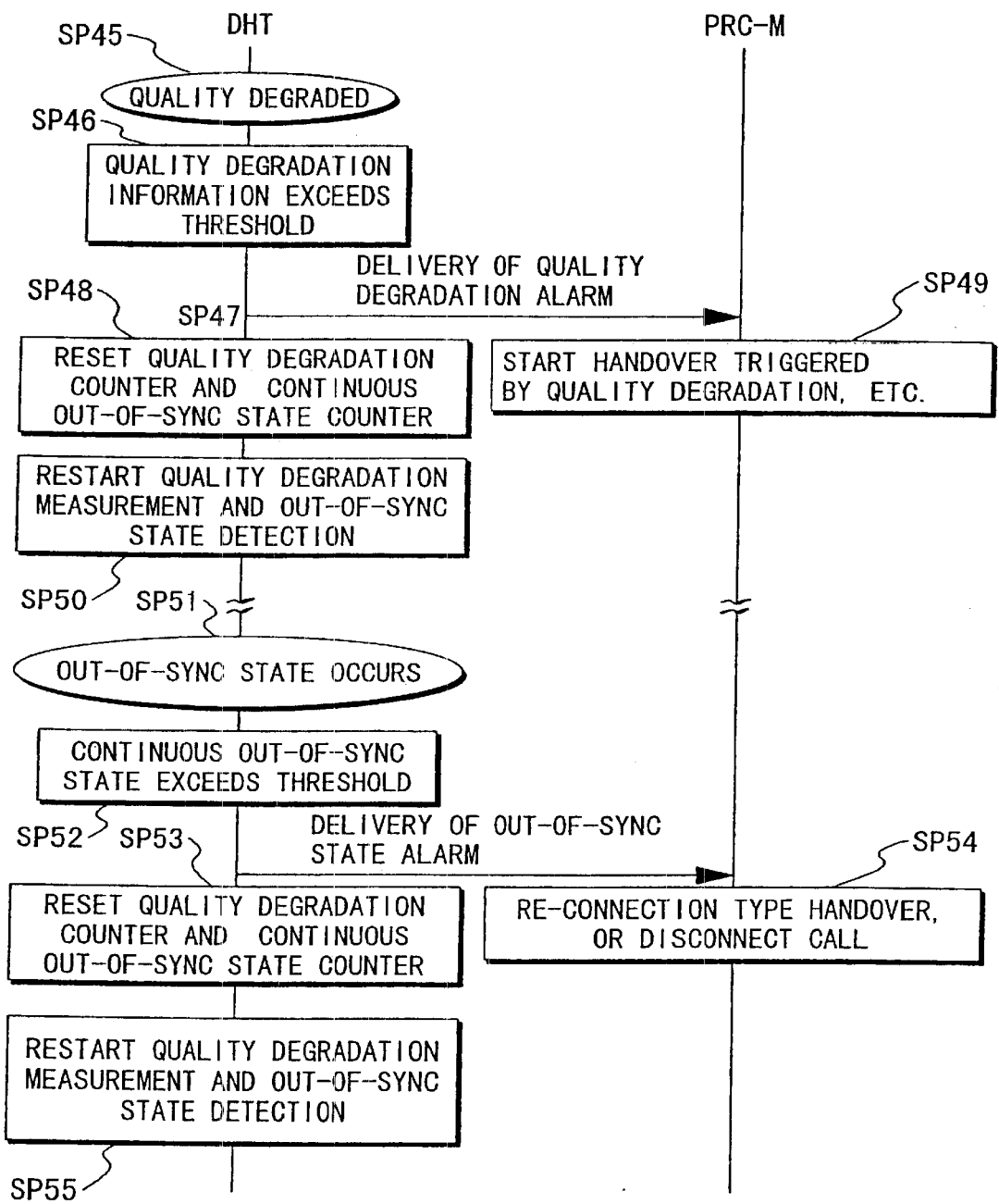

In the sequence of steps depicted in FIGS. 11–14, commands for branch addition and deletion is exchanged between MSC processor 32 and diversity handover trunk 34. Information exchanged between the two elements during the onset/end of communication and receipt/dispatch of a report informing degraded communication/outbreak of out-of-sync state is shown in FIGS. 15 and 16.

Information flow during onset of communication will be firstly described.

MSC processor 32, when it receives a call, (1) recognizes the type of service, (2) determines the connection identifier, (3) computes timing correction parameters, (4) determines quality degradation measurement parameters, (5) determines out-of-sync state detection parameters, (6) analyzes traffic information, and informs the parameters obtained in the steps (2)–(6) to DHT together with a DHT setting instruction command.

The diversity handover trunk 34 sets various inner condition according to the commands and parameters supplied thereto, and starts diversity handover operation.

Next, information flow during the onset of handover will be described.

MSC 32, during addition or deletion of a wired branch, (7) determines DHO connection identifier of the branch to be added or deleted, and informs of the result to diversity handover trunk 34 together with a command instructing addition or deletion of a branch.

Diversity handover trunk 34 updates the state in system according to the command and parameter it has received, and initiates a renewed diversity handover with the new branch added.

To disconnect a given call, MSC processor 32 sends an instruction for opening the involved route to diversity handover trunk 34.

When degraded communication or out-of-sync state arises, diversity handover trunk 34 dispatches an alarm signal to MSC processor 32 which executes an appropriate treatment according to the content delivered by the signal.

3. Advantages of Embodiment

Based on features as detailed above, this embodiment will bring following advantages.

(1) In this embodiment, a common synchronization timing is ensured in communication between MSs, BSs and MSCs. Frame identification information is exchanged only between BS and MSC, and delays of frame transmission different from one BS to another are nullified by MSC and BS involved. Further, MS can receive radio frames from different BSs at a synchronization timing, it manages communication with a small capacity buffer. As frame identification information is exchanged only between MSC and BS, and is not exchanged through radio links, an efficient use of the radio transmission capacity is ensured.

(2) In this embodiment, during the onset of communication, a communication controller informs of a rightly measured transmission delay to a frame receiving system, and a frame extraction controller extracts frames according to the type of service involved. Thus, it is possible to achieve communication with a properly set transmission delay according to the type of service.

(3) In this embodiment, when the frame extractor detects an out-of-sync state of received frames, it shifts the timing of extracting frames as appropriate according to the period of frames, and, by so doing, recovers a synchronization state for subsequent frames. Thus, it is possible to continue communication without disconnection.

(4) In this embodiment, quality degradation is evaluated after selection process, and hence it is possible to activate handover using the quality degradation as a trigger. This contributes to improvement of communication quality.

(5) In this embodiment, each BS informs of an out-of-sync state to a diversity handover trunk through a communication link, and allows the diversity handover trunk to evaluate the out-of-sync state and then to dispatch the result to an involved processor. Thus, it is possible to reduce the amount of signals required when an out-of-sync notice is directly dispatched to the processor as in a conventional system, and thus load imposed on the processor.

4. Variations or Modifications

The present invention can be put into practice in various forms without encroaching the spirit or principal characteristics inherent thereto. Thus, the aforementioned embodiment is only illustrative in any respect, and should not be taken as restrictive of the present invention. The scope of the present invention is only limited by what is defined by attached claims, and is never restricted by any description contained in the text of Specification. Further, variations and modifications equivalent to any claim are of course within the scope of the present invention.

For example, in above embodiment, clock errors and fluctuations in transmission delay of individual nodes are assumed to be known. The present invention, however, can be applied to various cases: a case where the clocks of transmitter and receiver are not synchronized, a case where a fluctuation in transmission delay arising as a result of signals passing through a transmitter and receiver remains unknown, etc.

The operations according to above situations will be described below. In FIG. 37, a transceiver 100 has a clock circuit 101 to generate clock pulses CL1, and a receiver 120 has a clock circuit 102 to generate clock pulses CL2. The clock pulses CL1 and CL2 are not synchronized. Furthermore, the maximal delay due to fluctuations during the passage of signals between the transmitter and receiver 100 and 120 is assume to be unknown. The technique will be described, in which the receiver 120 synchronizes the frames transmitted by transmitter 100.

First, transmitter 100 attaches the phase of clock pulses CL1 to frames as the radio frame number FN, before it transmits those frames. Receiver 120 receives those frames, reads frame numbers FN attached to the frames, calculates the phase difference of a given frame number from a corresponding clock signal CL2. This calculation was repeated one or more times for frames transmitted by a previous transmitter, the maximal difference was obtained, and a safety factor was added thereto to give a correction value which was then stored in a memory. From frames coming thereafter, the receiver extracts appropriate frames according to clock pulses CL2 and the correction value. This correction value can be changed any time, if necessary, according to the current history of communication.

Next, operation of the above modification will be explained.

Transmitter 100 is going to send, for example, a frame when the clock signal CL1 has a phase FN of "55," and attaches the radio frame number FN of "55" to the frame. If the receiver 120 finds that the corresponding CL2 is at "60" of the clock signal, then the difference is 5 (60−55=5). In the same manner, if the phase FN of clock signal CL1 is "62" when a frame is transmitted, and clock signal CL2 is at "5" when the frame is received, the difference is 7 (64+5−62=7), because radio frame numbers FN change in a cyclic manner between "0" to "63".

If the safety factor is assumed to be "2", then the largest difference "7" of the two measurements is added with "2", and the correction value "9" is obtained. In the subsequent process, the receiver 120 extracts frames according to the correction value. For a third example, when a frame of interest is received by receiver 120 at "6" of clock signal CL2, the difference is 61 (6−9+64=61). Thus, a frame having FN=61 is extracted. For a fourth example where a frame of interest is received by receiver 120 at "7" of clock signal CL2, a frame having FN=62 is extracted. In this way it is possible to maintain a synchronization state of frames between transmitter 100 and receiver 120.

In above embodiment, various trunks are put together and distributed to a single MSC as shown in FIG. 39 (case 1). The present invention can also be applied to case 2 in the same figure where MSCs are assigned to several blocks, and trunks are separately distributed to those blocks. In the example depicted in the figure, MSC is composed of MSC-1 and MSC-2. In this case, further, the number and location of MSCs-1 are not limited by any specific requirements: they may be located close to BSs, and a plurality of MSCs-1 may be connected to a single MSC-2.

What is claimed is:

1. In a method for handover utilizing a first transmission route which connects a diversity handover trunk with a mobile station by way of a first base station, and a second transmission route which connects the diversity handover trunk with the mobile station by way of a second base station, the method characterized by comprising the steps of:

generating a first out-of-synchronization notice, when an out-of-synchronization state is detected in a signal provided by the mobile station to the first base station; and generating a second out-of-synchronization notice, when an out-of-synchronization state is detected in another signal provided by the mobile station to the second base station;

whereby re-connection type handover is executed to a base station which the mobile station finds after searching among neighboring base stations, as a target base station for handover, on the condition that both of the first and second out-of-synchronization notices have been generated.

2. In a method for handover utilizing a first transmission route which connects a diversity handover trunk with a mobile station by way of a first base station, and a second transmission route which connects the diversity handover trunk with the mobile station by way of a second base station, the method characterized by comprising the steps of:

generating a first out-of-synchronization notice, when an out-of-synchronization state is detected in a signal provided by the mobile station to the first base station; and generating a second out-of-synchronization notice, when an out-of-synchronization state is detected in another signal provided by the mobile station to the second base station;

whereby recall type handover is executed for a base station which the mobile station finds after searching among neighboring base stations, as a target base station for handover, on the condition that both of the first and second out-of-synchronization notices have been generated.

* * * * *